United States Patent
Lin et al.

(10) Patent No.: US 11,201,708 B2
(45) Date of Patent: Dec. 14, 2021

(54) METHOD AND APPARATUS FOR CHANNEL STATE INFORMATION REPORT FOR BEAM OPERATION IN A WIRELESS COMMUNICATION SYSTEM

(71) Applicant: ASUSTek Computer Inc., Taipei (TW)

(72) Inventors: Ko-Chiang Lin, Taipei (TW); Ming-Che Li, Taipei (TW); Richard Lee-Chee Kuo, Taipei (TW)

(73) Assignee: ASUSTek Computer Inc., Taipei (TW)

(*) Notice: Subject to any disclaimer, the term of this patent is extended or adjusted under 35 U.S.C. 154(b) by 0 days.

(21) Appl. No.: 15/663,689

(22) Filed: Jul. 28, 2017

(65) Prior Publication Data

US 2018/0034612 A1 Feb. 1, 2018

Related U.S. Application Data

(60) Provisional application No. 62/368,415, filed on Jul. 29, 2016.

(51) Int. Cl.
*H04L 5/00* (2006.01)
*H04B 17/345* (2015.01)
(Continued)

(52) U.S. Cl.
CPC ......... *H04L 5/0048* (2013.01); *H04B 7/0626* (2013.01); *H04B 17/345* (2015.01);
(Continued)

(58) Field of Classification Search
CPC . H04L 5/0048; H04L 5/0057; H04L 25/0224; H04B 17/345; H04B 7/0626;
(Continued)

(56) References Cited

U.S. PATENT DOCUMENTS 9,106,386 B2 * 8/2015 Etemad ................. H04W 76/16
10,333,650 B2 * 6/2019 Chen ..................... H04L 1/0027
(Continued)

FOREIGN PATENT DOCUMENTS

CN 104303477 A 1/2015
EP 2882217 A1 6/2015
(Continued)

OTHER PUBLICATIONS

Office Action from Taiwan Intellectual Property Office in the corresponding TW Application No. 106125535, dated May 15, 2018.
(Continued)

*Primary Examiner* — Jeffrey M Rutkowski
*Assistant Examiner* — Jasper Kwoh
(74) *Attorney, Agent, or Firm* — Cooper Legal Group, LLC

(57) ABSTRACT

A method and apparatus are disclosed, from the perspective of the UE, for reporting channel state information (CSI). In one embodiment, the method includes a UE being configured with at least two CSI-RS (Channel State Information-Reference Signal) resources. In addition, the method includes the UE performing measurements on the at least two CSI-RS resources. The method also includes the UE generating multiple CSIs according to measurements on the at least two CSI-RS resources, wherein at least one CSI corresponds to measurements on more than one CSI-RS resource. The method further includes the UE reporting at least one of the generated CSIs.

20 Claims, 24 Drawing Sheets

(51) Int. Cl.
*H04B 7/06* (2006.01)
*H04L 25/02* (2006.01)
*H04B 7/024* (2017.01)
*H04B 7/0408* (2017.01)

(52) U.S. Cl.
CPC ........ *H04L 5/0057* (2013.01); *H04L 25/0224* (2013.01); *H04B 7/024* (2013.01); *H04B 7/0408* (2013.01)

(58) Field of Classification Search
CPC .... H04B 7/024; H04B 7/0408; H04B 7/0617; H04B 7/0456; H04W 72/00
See application file for complete search history.

(56) References Cited

U.S. PATENT DOCUMENTS

| | | | |
|---|---|---|---|
| 2012/0039199 A1 | 2/2012 | Chen et al. | |
| 2013/0039203 A1* | 2/2013 | Fong | H04B 7/024 370/252 |
| 2013/0182594 A1* | 7/2013 | Kim | H04W 24/10 370/252 |
| 2013/0242773 A1* | 9/2013 | Wernersson | H04B 7/024 370/252 |
| 2013/0242902 A1* | 9/2013 | Liu | H04B 7/0619 370/329 |
| 2013/0301454 A1 | 11/2013 | Seol et al. | |
| 2014/0079146 A1* | 3/2014 | Kim | H04B 7/0478 375/260 |
| 2014/0112173 A1* | 4/2014 | Hammarwall | H04L 1/0026 370/252 |
| 2015/0003359 A1* | 1/2015 | Hoshino | H04W 24/08 370/329 |
| 2015/0063287 A1* | 3/2015 | Mazzarese | H04W 24/10 370/329 |
| 2015/0131563 A1* | 5/2015 | Guo | H04B 7/0626 370/329 |
| 2015/0200757 A1* | 7/2015 | Wu | H04B 7/0456 370/329 |
| 2015/0222340 A1* | 8/2015 | Nagata | H04W 16/28 375/267 |
| 2015/0288474 A1* | 10/2015 | Fujishiro | H04J 11/0053 370/252 |
| 2016/0112177 A1* | 4/2016 | Zheng | H04L 5/0051 370/330 |
| 2016/0134352 A1 | 5/2016 | Stirling-Gallacher | |
| 2016/0156401 A1* | 6/2016 | Onggosanusi | H04B 7/0478 370/329 |
| 2016/0227429 A1 | 8/2016 | Park et al. | |
| 2017/0048037 A1 | 2/2017 | Yen et al. | |
| 2018/0063826 A1* | 3/2018 | Kim | H04B 7/0413 |
| 2018/0262252 A1* | 9/2018 | Oh | H04B 7/0636 |
| 2018/0262938 A1* | 9/2018 | Liu | H04W 24/10 |

FOREIGN PATENT DOCUMENTS

| | | |
|---|---|---|
| WO | 2012124552 | 9/2012 |
| WO | 2016056970 | 4/2016 |
| WO | 2016056970 A1 | 4/2016 |

OTHER PUBLICATIONS

European Search Report from corresponding EP Application No. 17183720.6, dated Nov. 21, 2017.
Motorola Mobility, CQI Definition for CoMP [online], 3GPP TSG-RAN WG1#70 R1-123791, Aug. 5, 2012, pp. 1-8, [Search date: Sep. 27, 2018], Internet <URL: http://www.3gpp.org/ftp/tsg_ran/WG1_RL1/TSGR1_70/Docs/R1-123791.zip>.
Office Action from Japan Patent Office in corresponding JP Application No. 2017-146454, dated Oct. 9, 2018.
Office Action from Korean Intellectual Property Office in corresponding KR Application No. 10-2017-0096524, dated Jul. 4, 2019.
European Office Action from corresponding EP Application No. 17183720.6 dated Apr. 29, 2020, 8 pgs.
Indian Office Action from corresponding IN Application No. 201744026865 dated Jul. 6, 2020. English Translation.
Alcatel-Lucent, Alcatel-Lucent Shanghai Bell, "PDSCH rate matching behaviour for ZP-CSI-RS resources IMRs", 3GPP TSG RAN WG1 Meeting #71, R1-124862, Agenda Item 6.2.2.2, Document for Discussion and Decision, Nov. 12-16, 2012, New Orleans, USA.
Corresponding Korean Patent Application No. 10-2021-0033458, Office Action dated May 28, 2021. English Translation.

* cited by examiner

| Value of codebookConfig | $g(\cdot)$ |
|---|---|
| 1 | {0,4,8,10} |
| 2 | {0,16,32,48} |
| 3 | {0,16,32,48} |
| 4 | {0,16,32,48} |

FIG. 5 (PRIOR ART)

| Spatial differential CQI value | Offset level |
|---|---|
| 0 | 0 |
| 1 | 1 |
| 2 | 2 |
| 3 | $\geq 3$ |
| 4 | $\leq -4$ |
| 5 | -3 |
| 6 | -2 |
| 7 | -1 |

FIG. 6 (PRIOR ART)

| Value of CSI request field | Description |
|---|---|
| '00' | No aperiodic CSI report is triggered |
| '01' | Aperiodic CSI report is triggered for serving cell $c$ |
| '10' | Aperiodic CSI report is triggered for a 1st set of serving cells configured by higher layers |
| '11' | Aperiodic CSI report is triggered for a 2nd set of serving cells configured by higher layers |

FIG. 7 (PRIOR ART)

| Value of CSI request field | Description |
|---|---|
| '00' | No aperiodic CSI report is triggered |
| '01' | Aperiodic CSI report is triggered for a set of CSI process(es) configured by higher layers for serving cell $c$ |
| '10' | Aperiodic CSI report is triggered for a 1st set of CSI process(es) configured by higher layers |
| '11' | Aperiodic CSI report is triggered for a 2nd set of CSI process(es) configured by higher layers |

FIG. 8 (PRIOR ART)

|  | | PMI Feedback Type | | |
|---|---|---|---|---|
|  | | No PMI | Single PMI | Multiple PMI |
| PUSCH CQI Feedback Type | Wideband (wideband CQI) | Mode 1-0 | Mode 1-1 | Mode 1-2 |
| | UE Selected (subband CQI) | Mode 2-0 | | Mode 2-2 |
| | Higher Layer-configured (subband CQI) | Mode 3-0 | Mode 3-1 | Mode 3-2 |

FIG. 9 (PRIOR ART)

| Differential CQI value | Offset level |
|---|---|
| 0 | ≤1 |
| 1 | 2 |
| 2 | 3 |
| 3 | ≥4 |

FIG. 10 (PRIOR ART)

| System Bandwidth $N_{RB}^{DL}$ | Subband Size k (RBs) | M |
|---|---|---|
| 6 – 7 | NA | NA |
| 8 – 10 | 2 | 1 |
| 11 – 26 | 2 | 3 |
| 27 – 63 | 3 | 5 |
| 64 – 110 | 4 | 6 |

FIG. 11 (PRIOR ART)

| | | PMI Feedback Type | |
|---|---|---|---|
| | | No PMI | Single PMI |
| PUCCH CQI Feedback Type | Wideband (wideband CQI) | Mode 1-0 | Mode 1-1 |
| | UE Selected (subband CQI) | Mode 2-0 | Mode 2-1 |

FIG. 12 (PRIOR ART)

| $I_{CQI/PMI}$ | Value of $N_{pd}$ | Value of $N_{OFFSET,CQI}$ |
|---|---|---|
| $0 \leq I_{CQI/PMI} \leq 1$ | 2 | $I_{CQI/PMI}$ |
| $2 \leq I_{CQI/PMI} \leq 6$ | 5 | $I_{CQI/PMI} - 2$ |
| $7 \leq I_{CQI/PMI} \leq 16$ | 10 | $I_{CQI/PMI} - 7$ |
| $17 \leq I_{CQI/PMI} \leq 36$ | 20 | $I_{CQI/PMI} - 17$ |
| $37 \leq I_{CQI/PMI} \leq 76$ | 40 | $I_{CQI/PMI} - 37$ |
| $77 \leq I_{CQI/PMI} \leq 156$ | 80 | $I_{CQI/PMI} - 77$ |
| $157 \leq I_{CQI/PMI} \leq 316$ | 160 | $I_{CQI/PMI} - 157$ |
| $I_{CQI/PMI} = 317$ | Reserved | |
| $318 \leq I_{CQI/PMI} \leq 349$ | 32 | $I_{CQI/PMI} - 318$ |
| $350 \leq I_{CQI/PMI} \leq 413$ | 64 | $I_{CQI/PMI} - 350$ |
| $414 \leq I_{CQI/PMI} \leq 541$ | 128 | $I_{CQI/PMI} - 414$ |
| $542 \leq I_{CQI/PMI} \leq 1023$ | Reserved | |

FIG. 13 (PRIOR ART)

| $I_{RI}$ | Value of $M_{RI}$ | Value of $N_{OFFSET,RI}$ |
|---|---|---|
| $0 \leq I_{RI} \leq 160$ | 1 | $-I_{RI}$ |
| $161 \leq I_{RI} \leq 321$ | 2 | $-(I_{RI} - 161)$ |
| $322 \leq I_{RI} \leq 482$ | 4 | $-(I_{RI} - 322)$ |
| $483 \leq I_{RI} \leq 643$ | 8 | $-(I_{RI} - 483)$ |
| $644 \leq I_{RI} \leq 804$ | 16 | $-(I_{RI} - 644)$ |
| $805 \leq I_{RI} \leq 965$ | 32 | $-(I_{RI} - 805)$ |
| $966 \leq I_{RI} \leq 1023$ | Reserved | |

FIG. 14 (PRIOR ART)

| $I_{CQI/PMI}$ | Value of $N_{pd}$ | Value of $N_{OFFSET,CQI}$ |
|---|---|---|
| $I_{CQI/PMI} = 0$ | 1 | $I_{CQI/PMI}$ |
| $1 \leq I_{CQI/PMI} \leq 5$ | 5 | $I_{CQI/PMI} - 1$ |
| $6 \leq I_{CQI/PMI} \leq 15$ | 10 | $I_{CQI/PMI} - 6$ |
| $16 \leq I_{CQI/PMI} \leq 35$ | 20 | $I_{CQI/PMI} - 16$ |
| $36 \leq I_{CQI/PMI} \leq 75$ | 40 | $I_{CQI/PMI} - 36$ |
| $76 \leq I_{CQI/PMI} \leq 155$ | 80 | $I_{CQI/PMI} - 76$ |
| $156 \leq I_{CQI/PMI} \leq 315$ | 160 | $I_{CQI/PMI} - 156$ |
| $316 \leq I_{CQI/PMI} \leq 1023$ | Reserved ||

FIG. 15 (PRIOR ART)

| $I_{CRI}$ | Value of $M_{CRI}$ |
|---|---|
| 0 | 1 |
| 1 | 2 |
| 2 | 4 |
| 3 | 8 |
| 4 | 16 |
| 5 | 32 |
| 6 | 64 |
| 7 | 128 |
| $7 < I_{CRI} \leq 1023$ | Reserved |

FIG. 16 (PRIOR ART)

| $I_{CRI}$ | Value of $M_{CRI}$ | Value of $N_{OFFSET,CRI}$ |
|---|---|---|
| $0 \leq I_{CRI} \leq 160$ | 1 | $-I_{CRI}$ |
| $161 \leq I_{CRI} \leq 321$ | 2 | $-(I_{CRI} - 161)$ |
| $322 \leq I_{CRI} \leq 482$ | 4 | $-(I_{CRI} - 322)$ |
| $483 \leq I_{CRI} \leq 643$ | 8 | $-(I_{CRI} - 483)$ |
| $644 \leq I_{CRI} \leq 804$ | 16 | $-(I_{CRI} - 644)$ |
| $805 \leq I_{CRI} \leq 965$ | 32 | $-(I_{CRI} - 805)$ |
| $966 \leq I_{CRI} \leq 1023$ | Reserved | |

FIG. 17 (PRIOR ART)

| System Bandwidth $N_{RB}^{DL}$ | Subband Size $k$ (RBs) | Bandwidth Parts ($J$) |
|---|---|---|
| 6 – 7 | NA | NA |
| 8 – 10 | 4 | 1 |
| 11 – 26 | 4 | 2 |
| 27 – 63 | 6 | 3 |
| 64 – 110 | 8 | 4 |

FIG. 18 (PRIOR ART)

| PUCCH Reporting Type | Reported | Mode State | PUCCH Reporting Modes | | | |
|---|---|---|---|---|---|---|
| | | | Mode 1-1 (bits/BP') | Mode 2-1 (bits/BP') | Mode 1-0 (bits/BP') | Mode 2-0 (bits/BP') |
| 1 | Sub-band CQI | RI = 1 | NA | 4+L | NA | 4+L |
| | | RI > 1 | NA | 7+L | NA | 4+L$^1$ 7+L$^2$ |
| 1a | Sub-band CQI / second PMI | 8 antenna ports or 8/12/16 antenna ports with codebookConfig={2,3,4}, RI = 1 | NA | 8+L | NA | NA |
| | | 8 antenna ports or 8/12/16 antenna ports with codebookConfig={2,3,4}, 1 < RI < 5 | NA | 9+L | NA | NA |
| | | 8 antenna ports or 8/12/16 antenna ports with codebookConfig={1,2,3,4} RI > 4 | NA | 7+L | NA | NA |
| | | 8/12/16 antenna ports with codebookConfig=1, RI = 1 | NA | 6+L | NA | NA |
| | | 8/12/16 antenna ports with codebookConfig=1, RI = 2 | NA | 9+L | NA | NA |
| | | 8/12/16 antenna ports with codebookConfig=1, 2<RI<5 | NA | 8+L | NA | NA |
| | | 4 antenna ports RI=1 | NA | 8+L | NA | NA |
| | | 4 antenna ports 1<RI≤4 | NA | 9+L | NA | NA |
| 2 | Wideband CQI/PMI | 2 antenna ports RI = 1 | 6 | 6 | NA | NA |
| | | 4 antenna ports RI = 1, Note$^5$ | 8 | 8 | NA | NA |
| | | 2 antenna ports RI > 1 | 8 | 8 | NA | NA |
| | | 4 antenna ports RI > 1, Note$^5$ | 11 | 11 | NA | NA |
| | | 4 antenna ports RI = 1, Note$^6$ | 7 | 7 | NA | NA |
| | | 4 antenna ports RI = 2, Note$^6$ | 10 | 10 | NA | NA |
| | | 4 antenna ports RI = 3, Note$^6$ | 9 | 9 | NA | NA |
| | | 4 antenna ports RI = 4, Note$^6$ | 8 | 8 | NA | NA |
| | | 8 antenna ports RI = 1 | 8 | 8 | NA | NA |
| | | 8 antenna ports 1<RI<4 | 11 | 11 | NA | NA |
| | | 8 antenna ports RI = 4 | 10 | 10 | NA | NA |
| | | 8 antenna ports RI > 4 | 7 | 7 | NA | NA |

FIG. 19A (PRIOR ART)

| PUCCH Reporting Type | Reported | Mode State | PUCCH Reporting Modes | | | |
|---|---|---|---|---|---|---|
| | | | Mode 1-1 (bits/BP') | Mode 2-1 (bits/BP') | Mode 1-0 (bits/BP') | Mode 2-0 (bits/BP') |
| 2a | Wideband first PMI | 8 antenna ports RI < 3 | NA | 4 | NA | NA |
| | | 8 antenna ports 2 < RI < 8 | NA | 2 | NA | NA |
| | | 8 antenna ports RI = 8 | NA | 0 | NA | NA |
| | | 4 antenna ports 1≤RI≤2 | NA | 4 | NA | NA |
| | | 4 antenna ports 2≤RI≤4 | NA | NA | NA | NA |
| | | 8/12/16 antenna ports with codebookConfig=1, 1≤RI≤8 | Note[3] | Note[3] | NA | NA |
| | | 8/12/16 antenna ports with codebookConfig={2,3,4} | Note[4] | Note[4] | NA | NA |
| 2b | Wideband CQI / second PMI | 8 antenna ports or 8/12/16 antenna ports with codebookConfig = {2,3,4}, RI = 1 | 8 | 8 | NA | NA |
| | | 8 antenna ports or 8/12/16 antenna ports with codebookConfig = {2,3,4}, 1 < RI < 4 | 11 | 11 | NA | NA |
| | | 8 antenna ports or 8/12/16 antenna ports with codebookConfig = {2,3,4}, RI = 4 | 10 | 10 | NA | NA |
| | | 8 antenna ports or 8/12/16 antenna ports with codebookConfig = {1,2,3,4}, RI > 4 | 7 | 7 | NA | NA |
| | | 4 antenna ports RI=1 | 8 | 8 | NA | NA |
| | | 4 antenna port 1<RI≤4 | 11 | 11 | NA | NA |
| | | 8/12/16 antenna ports with codebookConfig=1, RI = 1 | 6 | 6 | NA | NA |
| | | 8/12/16 antenna ports with codebookConfig=1, RI = 2 | 9 | 9 | NA | NA |
| | | 8/12/16 antenna ports with codebookConfig=1, 2<RI<5 | 8 | 8 | NA | NA |
| 2c | Wideband CQI / first PMI / second PMI | 8 antenna ports RI = 1 | 8 | NA | NA | NA |
| | | 8 antenna ports 1 < RI ≤ 4 | 11 | NA | NA | NA |
| | | 8 antenna ports 4 < RI ≤ 7 | 9 | NA | NA | NA |
| | | 8 antenna ports RI = 8 | 7 | NA | NA | NA |
| | | 4 antenna ports RI=1 | 8 | NA | NA | NA |
| | | 4 antenna port 1<RI≤4 | 11 | NA | NA | NA |

FIG. 19B (PRIOR ART)

| PUCCH Reporting Type | Reported | Mode State | PUCCH Reporting Modes | | | |
|---|---|---|---|---|---|---|
| | | | Mode 1-1 (bits/BP') | Mode 2-1 (bits/BP') | Mode 1-0 (bits/BP') | Mode 2-0 (bits/BP') |
| 3 | RI | 2/4 antenna ports, 2-layer spatial multiplexing | 1 | 1 | 1 | 1 |
| | | 8 antenna ports, 2-layer spatial multiplexing | 1 | NA | NA[1] $1^2$ | NA[1] $1^2$ |
| | | 4 antenna ports, 4-layer spatial multiplexing | 2 | 2 | 2 | 2 |
| | | 8 antenna ports, 4-layer spatial multiplexing | 2 | NA | NA[1] $2^2$ | NA[1] $2^2$ |
| | | 8-layer spatial multiplexing | 3 | NA | NA[1] $3^2$ | NA[1] $3^2$ |
| | | 12/16 antenna ports, 2-layer spatial multiplexing | 1 | NA | NA | NA |
| | | 12/16 antenna ports, 4-layer spatial multiplexing | 2 | NA | NA | NA |
| | | 12/16 antenna ports, 8-layer spatial multiplexing | 3 | NA | NA | NA |
| 4 | Wideband CQI | RI = 1 or RI>1, without PMI/RI reporting | NA | NA | 4 | 4 |
| | | RI = 1 without PMI reporting | NA | NA | 4 | 4 |
| | | RI>1 without PMI reporting | NA | NA | 7 | 7 |
| 5 | RI/ first PMI | 8 antenna ports, 2-layer spatial multiplexing | 4 | NA | NA | NA |
| | | 8 antenna ports, 4 and 8-layer spatial multiplexing | 5 | | | |
| | | 4 antenna ports, 2-layer spatial multiplexing | 4 | | | |
| | | 4 antenna ports, 4-layer spatial multiplexing | 5 | | | |
| 6 | RI/PTI | 8 antenna ports, 2-layer spatial multiplexing | NA | 2 | NA | NA |
| | | 8 antenna ports, 4-layer spatial multiplexing | NA | 3 | NA | NA |
| | | 8 antenna ports, 8-layer spatial multiplexing | NA | 4 | NA | NA |
| | | 4 antenna ports, 2-layer spatial multiplexing | NA | 2 | NA | NA |
| | | 4 antenna ports, 4-layer spatial multiplexing | NA | 3 | NA | NA |

FIG. 19C (PRIOR ART)

| PUCCH Reporting Type | Reported | Mode State | PUCCH Reporting Modes | | | |
|---|---|---|---|---|---|---|
| | | | Mode 1-1 (bits/BP*) | Mode 2-1 (bits/BP*) | Mode 1-0 (bits/BP*) | Mode 2-0 (bits/BP*) |
| 7 | CRI/RI | 2-layer spatial multiplexing | k+1 | k+1 | k+1 | k+1 |
| | | 4-layer spatial multiplexing | k+2 | k+2 | k+2 | k+2 |
| | | 8-layer spatial multiplexing | k+3 | k+3 | k+3 | k+3 |
| 8 | CRI/RI/first PMI | 2-layer spatial multiplexing | k+4 | NA | NA | NA |
| | | 4 and 8-layer spatial multiplexing | k+5 | NA | NA | NA |
| 9 | CRI/RI/PTI | 2-layer spatial multiplexing | NA | k+2 | NA | NA |
| | | 4-layer spatial multiplexing | NA | k+3 | NA | NA |
| | | 8-layer spatial multiplexing | NA | k+4 | NA | NA |
| 10 | CRI | Without PMI/RI reporting | NA | NA | k | k |

NOTE *: For wideband CQI reporting types, the stated payload size applies to the full bandwidth.
NOTE 1: Without PMI/RI reporting
NOTE 2: Without PMI reporting $k = \lceil \log_2(K) \rceil$ where $K$ is the number of configured CSI-RS resources
NOTE 3: Sum of Wideband first PMI i1,1 bit width and Wideband first PMI i1,2 bit width in Table 5.2.3.3.2-3B-1 of [4] with PTI=0
NOTE 4: Sum of Wideband first PMI i1,1 bit width and Wideband first PMI i1,2 bit width in Table 5.2.3.3.2-3B-2 of [4] with PTI=0
NOTE 5: Not configured with parameter *eMIMO-Type* by higher-layers
NOTE 6: Configured with parameter *eMIMO-Type* by higher-layers

FIG. 19D (PRIOR ART)

| Transmission mode | Transmission scheme of PDSCH |
|---|---|
| 1 | Single-antenna port, port 0 |
| 2 | Transmit diversity |
| 3 | Transmit diversity if the associated rank indicator is 1, otherwise large delay CDD |
| 4 | Closed-loop spatial multiplexing |
| 5 | Multi-user MIMO |
| 6 | Closed-loop spatial multiplexing with a single transmission layer |
| 7 | If the number of PBCH antenna ports is one, Single-antenna port, port 0; otherwise Transmit diversity |
| 8 | If the UE is configured without PMI/RI reporting: if the number of PBCH antenna ports is one, single-antenna port, port 0; otherwise transmit diversity<br><br>If the UE is configured with PMI/RI reporting: closed-loop spatial multiplexing |
| 9 | For a non-BL/CE UE, if the UE is configured without PMI/RI reporting: if the number of PBCH antenna ports is one, single-antenna port, port 0; otherwise transmit diversity<br><br>For a non-BL/CE UE, if the UE is configured with PMI/RI reporting or without PMI reporting: if the number of CSI-RS ports is one, single-antenna port, port 7; otherwise up to 8 layer transmission, ports 7-14 (see subclause 7.1.5B)<br><br>For a BL/CE UE: if the number of PBCH antenna ports is one, single-antenna port, port 0; otherwise transmit diversity |
| 10 | If a CSI process of the UE is configured without PMI/RI reporting: if the number of CSI-RS ports is one, single-antenna port, port7; otherwise transmit diversity<br><br>If a CSI process of the UE is configured with PMI/RI reporting or without PMI reporting: if the number of CSI-RS ports is one, single-antenna port, port 7; otherwise up to 8 layer transmission, ports 7-14 (see subclause 7.1.5B) |

FIG. 20 (PRIOR ART)

| CQI index | modulation | code rate x 1024 | efficiency |
|---|---|---|---|
| 0 | out of range | | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

FIG. 21 (PRIOR ART)

METHOD AND APPARATUS FOR CHANNEL STATE INFORMATION REPORT FOR BEAM OPERATION IN A WIRELESS COMMUNICATION SYSTEM

CROSS-REFERENCE TO RELATED APPLICATIONS

The present application claims the benefit of U.S. Provisional Patent Application Ser. No. 62/368,415 filed on Jul. 29, 2016, the entire disclosure of which is incorporated herein in their entirety by reference.

FIELD

This disclosure generally relates to wireless communication networks, and more particularly, to a method and apparatus for channel state information report for beam operation in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

A method and apparatus are disclosed, from the perspective of the UE, for reporting channel state information (CSI). In one embodiment, the method includes a UE being configured with at least two CSI-RS (Channel State Information-Reference Signal) resources. In addition, the method includes the UE performing measurements on the at least two CSI-RS resources. The method also includes the UE generating multiple CSIs according to measurements on the at least two CSI-RS resources, wherein at least one CSI corresponds to measurements on more than one CSI-RS resource. The method further includes the UE reporting at least one of the generated CSIs.

BRIEF DESCRIPTION OF THE DRAWINGS

FIG. 5 is a reproduction of Table 7.2-1g of 3GPP TS 36.213 v13.1.1.

FIG. 6 is a reproduction of Table 7.2-2 of 3GPP TS 36.213 v13.1.1.

FIG. 7 is a reproduction of Table 7.2.1-1A of 3GPP TS 36.213 v13.1.1.

FIG. 8 is a reproduction of Table 7.2.1-1B of 3GPP TS 36.213 v13.1.1.

FIG. 9 is a reproduction of Table 7.2.1-1 of 3GPP TS 36.213 v13.1.1.

FIG. 10 is a reproduction of Table 7.2.1-4 of 3GPP TS 36.213 v13.1.1.

FIG. 11 is a reproduction of Table 7.2.1-5 of 3GPP TS 36.213 v13.1.1.

FIG. 12 is a reproduction of Table 7.2.2-1 of 3GPP TS 36.213 v13.1.1.

FIG. 13 is a reproduction of Table 7.2.2-1A of 3GPP TS 36.213 v13.1.1.

FIG. 14 is a reproduction of Table 7.2.2-1B of 3GPP TS 36.213 v13.1.1.

FIG. 15 is a reproduction of Table 7.2.2-1C of 3GPP TS 36.213 v13.1.1.

FIG. 16 is a reproduction of Table 7.2.2-1D of 3GPP TS 36.213 v13.1.1.

FIG. 17 is a reproduction of Table 7.2.2-1E of 3GPP TS 36.213 v13.1.1.

FIG. 18 is a reproduction of Table 7.2.2-2 of 3GPP 36.213 v13.1.1.

FIGS. 19A-19D are a reproduction of Table 7.2.2-3 of 3GPP 36.213 v13.1.1.

FIG. 20 is a reproduction of Table 7.2.3-0 of 3GPP TS 36.213 v13.1.1.

FIG. 21 is a reproduction of Table 7.2.3-1 of 3GPP TS 36.213 v13.1.1.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, or some other modulation techniques.

In particular, the exemplary wireless communication systems devices described below may be designed to support one or more standards such as the standard offered by a consortium named "3rd Generation Partnership Project"

referred to herein as 3GPP, including: R2-162366, "Beam Forming Impacts", Nokia and Alcatel-Lucent; R2-163716, "Discussion on terminology of beamforming based high frequency NR", Samsung; R2-162709, "Beam support in NR", Intel; R2-162762, "Active Mode Mobility in NR: SINR drops in higher frequencies", Ericsson; RP-150465, "New SI proposal: Study on Latency reduction techniques for LTE", Ericsson and Huawei; and TS 36.213 v13.1.1, "E-UTRA Physical layer procedures (Release 13)." The standards and documents listed above are hereby expressly incorporated by reference in their entirety.

Figure 1:
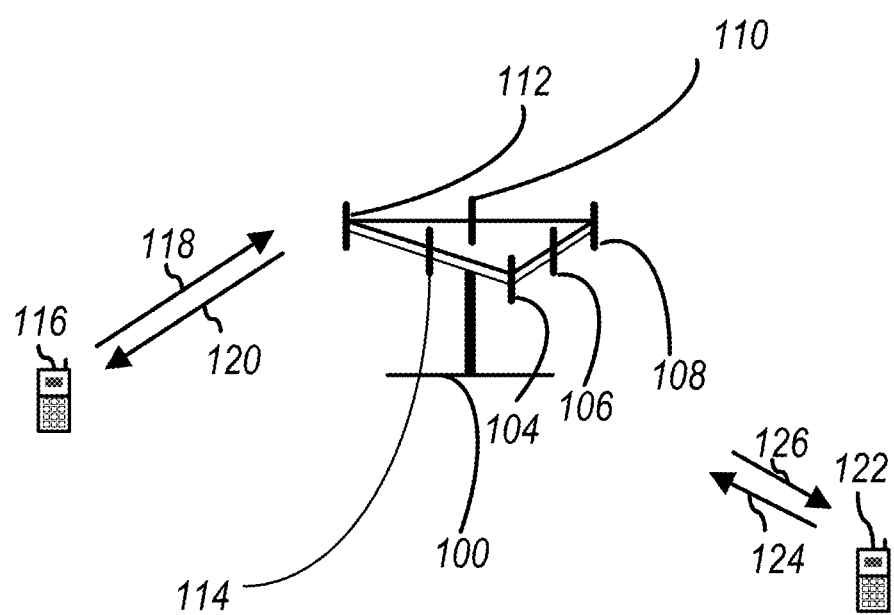
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an evolved Node B (eNB), or some other terminology. An access terminal (AT) may also be called user equipment (UE), a wireless communication device, terminal, access terminal or some other terminology.

Figure 2:
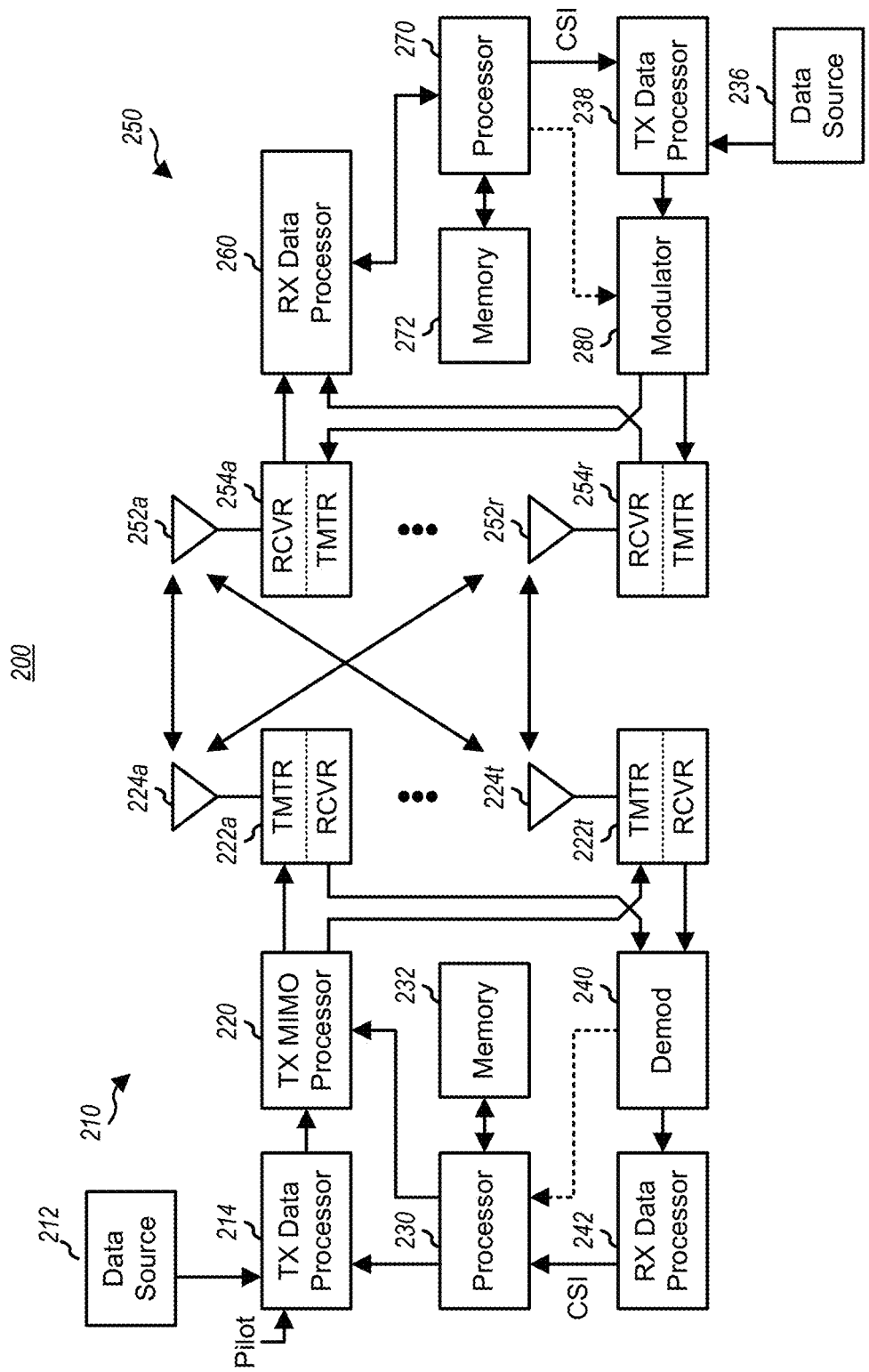
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
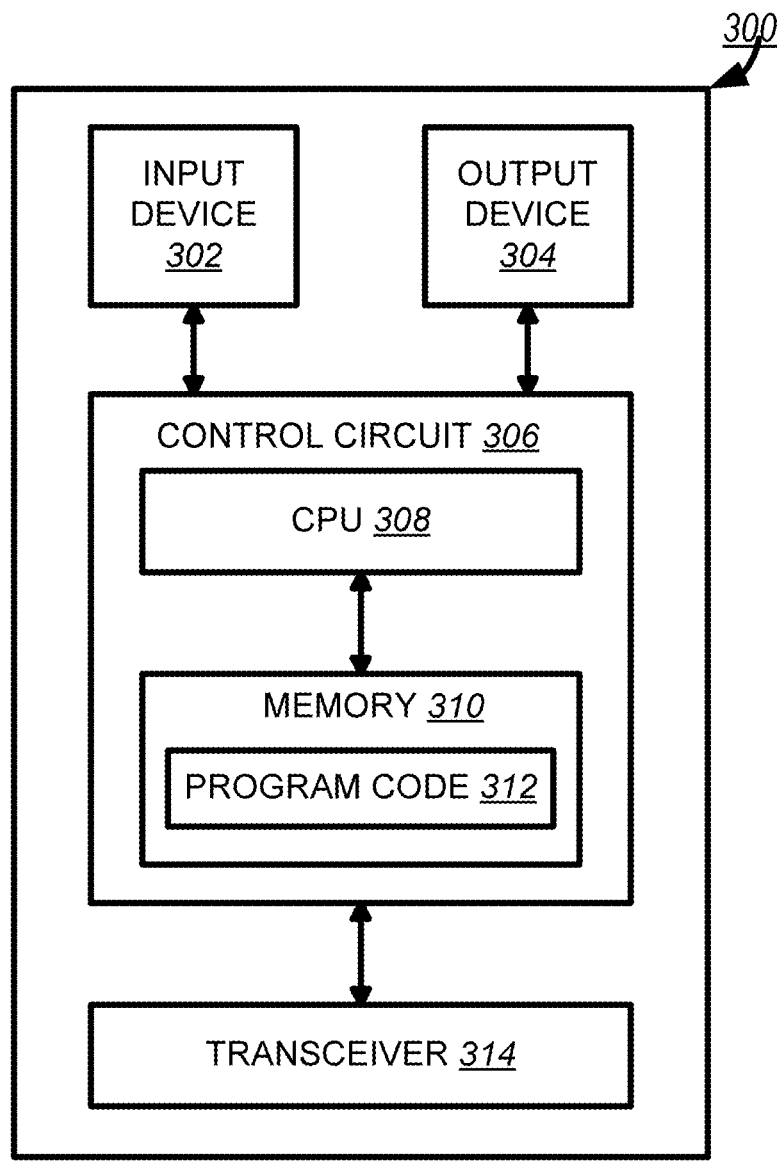
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1 or the base station (or AN) 100 in FIG. 1, and the wireless communications system is preferably the LTE system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
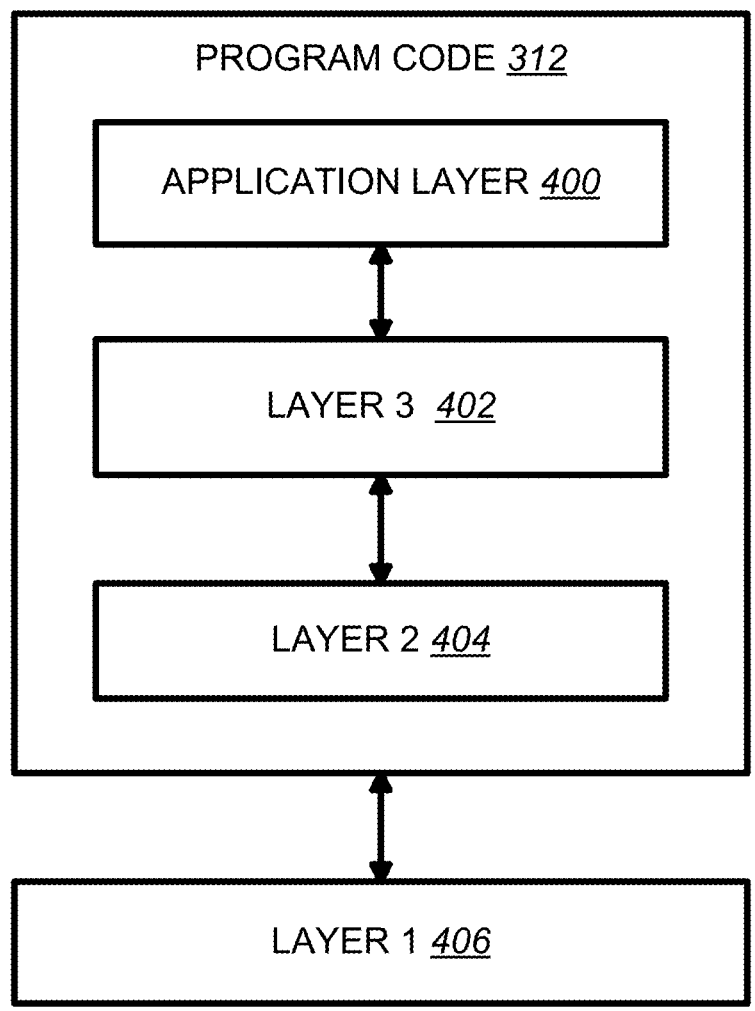
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

As described in 3GPP R2-162366, in lower frequency bands (e.g., current LTE bands<6 GHz) the required cell coverage may be provided by forming a wide sector beam for transmitting downlink common channels. However, utilizing wide sector beam on higher frequencies (>>6 GHz) the cell coverage is reduced with same antenna gain. Thus, in order to provide required cell coverage on higher frequency bands, higher antenna gain is needed to compensate the increased path loss. To increase the antenna gain over a wide sector beam, larger antenna arrays (number of antenna elements ranging from tens to hundreds) are used to form high gain beams.

As a consequence, the high gain beams are narrowly compared to a wide sector beam so multiple beams for transmitting downlink common channels are needed to cover the required cell area. The number of concurrent high gain beams that the access point is able to form may be limited by the cost and complexity of the utilized transceiver architecture. In practice, on higher frequencies, the number of concurrent high gain beams is much less than the total number of beams required to cover the cell area. In other words, the access point is able to cover only part of the cell area by using a subset of beams at any given time.

As described in 3GPP R2-163716, beamforming is a signal processing technique used in antenna arrays for directional signal transmission/reception. With beamforming, a beam can be formed by combining elements in a phased array of antennas in such a way that signals at particular angles experience constructive interference while others experience destructive interference. Different beams can be utilized simultaneously using multiple arrays of antennas.

Beamforming can be categorized into three types of implementation: digital beamforming, hybrid beamforming, and analog beamforming. For digital beamforming, the beam is generated on the digital domain, i.e. the weighting of each antenna element can be controlled by baseband (e.g., connected to a TXRU). Therefore it is very easy to tune the beam direction of each subband differently across the system bandwidth. Also, changing beam direction from time to time does not require any switching time between OFDM symbols. All beams whose directions cover the whole coverage can be generated simultaneously. However, this structure requires (almost) one-to-one mapping between TXRU (transceiver/RF chain) and antenna element and is quite complicated as the number of antenna element increases and system bandwidth increases (also heat problem exists).

Figure 22:
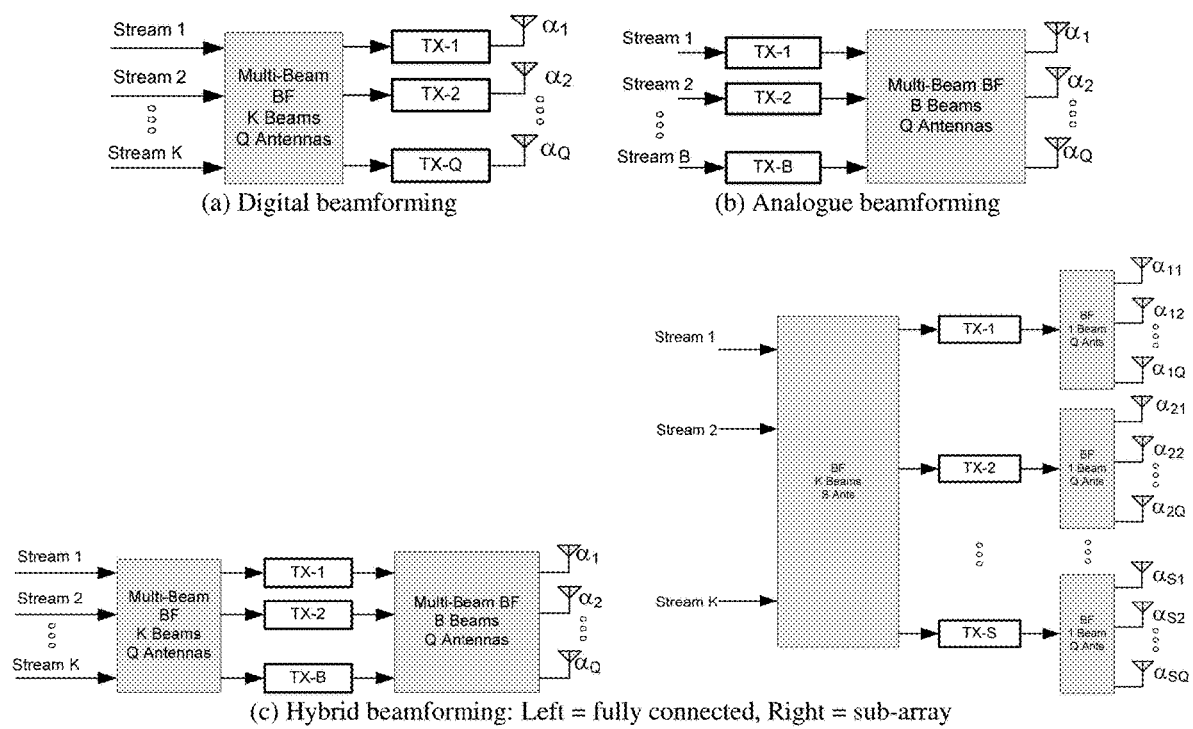
FIG. 22 is a diagram according to one exemplary embodiment of three types of beamforming.

For analog beamforming, the beam is generated on the analog domain, i.e., the weighting of each antenna element can be controlled by an amplitude/phase shifter in the RF (Radio Frequency) circuit. Since the weighing is purely controlled by the circuit, the same beam direction would apply on the whole system bandwidth. Also, if beam direction is to be changed, switching time is required. The number of beam generated simultaneous by an analog beamforming depends on the number of TXRU. Note that for a given size of array, the increase of TXRU may decrease the antenna element of each beam, such that wider beam would be generated. In short, analog beamforming could avoid the complexity and heat problem of digital beamforming, while is more restricted in operation. Hybrid beamforming can be considered as a compromise between analog and digital beamforming, where the beam can come from both analog and digital domain. The three types of beamforming is shown in FIG. 22.

As discussed in 3GPP R2-162709, a base station may have multiple TRPs (either centralized or distributed). Each TRP (Transmission/Reception Point) can form multiple beams. The number of beams and the number of simultaneous beams in the time/frequency domain depend on the number of antenna array elements and the RF at the TRP. Potential mobility types for NR can be listed as follows:
Intra-TRP mobility
Inter-TRP mobility
Inter-NR eNB mobility As discussed in 3GPP R2-162762, reliability of a system that purely relies on beamforming and operates in higher frequencies might be challenging, since the coverage might be more sensitive to both time and space variations. As a consequence, the SINR (Signal to Interference and Noise Ratio) of that narrow link can drop much quicker than in the case of LTE.

Using antenna arrays at access nodes with the number of elements in the hundreds, fairly regular grid-of-beams coverage patterns with tens or hundreds of candidate beams per node may be created. The coverage area of an individual beam from such array may be small, down to the order of some tens of meters in width. As a consequence, channel quality degradation outside the current serving beam area is quicker than in the case of wide area coverage, as provided by LTE.

Besides, some discussion has been made regarding how to derive channel state information for multiple antennas scheme in new radio (NR), also known as 5G. CSI acquisition and corresponding reference signal design also need to be studied as follows:
In NR multi-antenna schemes, studies on CSI acquisition framework include
CSI reporting schemes
Implicit CSI feedback
Parameters indicating channel quality based on a set of transmission and receiving hypotheses associated with one particular UE, e.g. CQI, PMI, RI, CRI Explicit CSI feedback: for both quantized and unquantized/analog CSI feedback
    Parameters representing channel coefficients or some reduced-space representation thereof
Reciprocity-based feedback
    For example, take into account interference and/or receiver hypothesis can be included
    Note: including aperiodic, periodic and semi-persistent, and single/wide band and sub-band feedback
    Mixed feedback is not precluded
Interference measurement
FFS: CSI measurement and/or reporting and/or triggering can be 'self-contained' in at least time domain
In NR multi-antenna schemes, studies on RS design and CSI acquisition considering following use cases
Non-UE-specific RS use case for CSI measurement
UE-specific RS use case for CSI measurement
    Note: functionally may be analogous e.g.: to R13/14 UE-specific beamformed CSI-RS (with dynamic beamforming)
    Note: maybe relevant to UE receiving beam sweeping
Use of a joint operation among multiple RS from the same or different use cases
RS for interference measurement use cases
RS for channel reciprocity use cases
Note: including measurement over aperiodic/periodic/semi-persistent RS
Note: Subband RS is not precluded
Study aperiodic CSI reporting in conjunction possibly with aperiodic RS (e.g. one-shot, multi-shot RS) transmission
    Aperiodic RS can be used for CSI measurement including channel measurement (e.g. using CSI-RS) and/or interference measurement (e.g. using IMR)
    Study on demand UE measurement/reports and TRP RS transmission for CSI measurement only when needed
    Study aperiodic CSI procedure to support CSI triggering, CSI measurement and CSI feedback in certain time interval(s). These three steps can happen in the same or different time interval.
    Study aperiodic CSI procedure using RS for CSI measurement e.g. CSI-RS, demodulation RS.

With the support of beam operation and TRP, a cell may have multiple choices to schedule a UE. For example, there may be multiple beams from a TRP transmitting the same data to the UE, which can provide more reliability for the transmission. Alternatively, multiple beams from multiple TRPs transmit the same data to the UE. To increase the throughput, it is also possible for a single TRP to transmit different data on different beams for the UE. Also, multiple TRPs can transmit different data on different beams to the UE.

Channel state information may comprise channel quality indicator (CQI), PMI (Precoding Matrix Indicator), RI (Rank Indicator). As can be seen from the below quotations, CQI is an indicator of affordable modulation and coding scheme under certain assumptions, e.g., error rate target, channel condition, which is a kind of implicit feedback for the channel, which can be determined by, e.g. signal to interference and noise ratio (SINR) of certain signal. Alternatively, CQI can also be used to indicate real channel coefficient, with possible quantization. PMI is an indicator of preferred precoding matrix in the antenna domain, which can be used to enlarge the signal quality (beamforming gain), or reduce the interference between multiple streams (layers) from different antennas to a given UE. RI is an indicator of the preferred or affordable number of streams (layers) to the UE. More detail information can be found in 3GPP TS 36.213 as follows:

7.2 UE Procedure for Reporting Channel State Information (CSI)

If the UE is configured with a PUCCH-SCell, the UE shall apply the procedures described in this clause for both primary PUCCH group and secondary PUCCH group unless stated otherwise When the procedures are applied for the primary PUCCH group, the terms 'secondary cell', 'secondary cells', 'serving cell', and 'serving cells' in this clause refer to secondary cell, secondary cells, serving cell or serving cells belonging to the primary PUCCH group respectively unless stated otherwise.

When the procedures are applied for secondary PUCCH group, the terms 'secondary cell', 'secondary cells', 'serving cell' and 'serving cells' in this clause refer to secondary cell, secondary cells (not including the PUCCH-SCell), serving cell, serving cells belonging to the secondary PUCCH group respectively unless stated otherwise. The term 'primary cell' in this clause refers to the PUCCH-SCell of the secondary PUCCH group.

The time and frequency resources that can be used by the UE to report CSI which consists of Channel Quality Indicator (CQI), precoding matrix indicator (PMI), precoding type indicator (PTI), CSI-RS resource indicator (CRI), and/or rank indication (RI) are controlled by the eNB. For spatial multiplexing, as given in [3], the UE shall determine a RI corresponding to the number of useful transmission layers. For transmit diversity as given in [3], RI is equal to one.

A non-BL/CE UE in transmission mode 8 or 9 is configured with or without PMI/RI reporting by the higher layer parameter pmi-RI-Report.

A UE in transmission mode 8 or 9 is configured with or without PMI/RI reporting by the higher layer parameter pmi-RI-Report.

A UE in transmission mode 10 can be configured with one or more CSI processes per serving cell by higher layers.

For a UE in transmission mode 10,
    If a UE is not configured with higher layer parameter eMIMO-Type, each CSI process is associated with a CSI-RS resource (defined in subclause 7.2.5) and a CSI-interference measurement (CSI-IM) resource (defined in subclause 7.2.6). A UE can be configured with up to two CSI-IM resources for a CSI process if the UE is configured with CSI subframe sets $c_{CSI,0}$ and $c_{CSI,1}$ by the higher layer parameter csi-SubFramePattern-Config-r12 for the CSI process.
    If the UE is configured with higher layer parameter eMIMO-Type, and eMIMO-Type is set to 'CLASS A', each CSI process is associated with a CSI-RS resource (defined in subclause 7.2.5) and a CSI-interference measurement (CSI-IM) resource (defined in subclause 7.2.6). A UE can be configured with up to two CSI-IM resources for a CSI process if the UE is configured with CSI subframe sets $c_{CSI,0}$ and $c_{CSI,1}$ by the higher layer parameter csi-SubFramePatternConfig-r12 for the CSI process.
    If the UE is configured with higher layer parameter eMIMO-Type, and eMIMO-Type is set to 'CLASS B', each CSI process is associated with one or more CSI-RS resource (defined in subclause 7.2.5) and one or more CSI-interference measurement (CSI-IM) resource (defined in subclause 7.2.6). Each CSI-RS resource is associated with a CSI-IM resource by higher layers. For a CSI process with one CSI-RS resource, a UE can be configured with CSI-IM resource for each CSI subframe sets if the UE is configured with CSI subframe sets $c_{CSI,0}$ and $c_{CSI,1}$ by the higher layer parameter csi-SubFramePatternConfig-r12 for the CSI process.

For a UE in transmission mode 10, a CSI reported by the UE corresponds to a CSI process configured by higher layers. Each CSI process can be configured with or without PMI/RI reporting by higher layer signalling.

For UE in transmission mode 9 and the UE configured with higher layer parameter eMIMO-Type, the term 'CSI process' in this subclause refers to the CSI configured for the UE.

For a UE in transmission mode 9, and if the UE is configured with higher layer parameter eMIMO-Type, and,
eMIMO-Type is set to 'CLASS A', each CSI process is associated with a CSI-RS resource (defined in subclause 7.2.5).
eMIMO-Type is set to 'CLASS B', each CSI process is associated with one or more CSI-RS resource (defined in subclause 7.2.5).

For a CSI process, and if a UE is configured in transmission mode 9 or 10, and UE is not configured with higher layer parameter pmi-RI-Report, and UE is configured with higher layer parameter eMIMO-Type, and eMIMO-Type is set to 'CLASS B', and the number of CSI-RS antenna ports in at least one of the one or more configured CSI-RS resource is more than one, the UE is considered to be configured without PMI reporting.

A UE is configured with resource-restricted CSI measurements if the subframe sets $c_{CSI,0}$ and $c_{CSI,1}$ are configured by higher layers.

For a serving cell with frame structure type 1, a UE is not expected to be configured with csi-SubframePatternConfig-r12.

CSI reporting is periodic or aperiodic.

A BL/CE UE configured with CEModeB is not expected to be configured with either aperiodic CSI or periodic CSI reporting.

If the UE is configured with more than one serving cell, it transmits CSI for activated serving cell(s) only.

If a UE is not configured for simultaneous PUSCH and PUCCH transmission, it shall transmit periodic CSI reporting on PUCCH as defined hereafter in subframes with no PUSCH allocation.

If a UE is not configured for simultaneous PUSCH and PUCCH transmission, it shall transmit periodic CSI reporting on PUSCH of the serving cell with smallest ServCellIndex as defined hereafter in subframes with a PUSCH allocation, where the UE shall use the same PUCCH-based periodic CSI reporting format on PUSCH.

A UE shall transmit aperiodic CSI reporting on PUSCH if the conditions specified hereafter are met. For aperiodic CQI/PMI reporting, RI reporting is transmitted only if the configured CSI feedback type supports RI reporting.

Table 7.2-1: Void

In case both periodic and aperiodic CSI reporting would occur in the same subframe, the UE shall only transmit the aperiodic CSI report in that subframe.

If the higher layer parameter altCQI-Table-r12 is configured and is set to allSubframes-r12,
the UE shall report CQI according to Table 7.2.3-2.
Else if the higher layer parameter altCQI-Table-r12 is configured and is set to csi-SubframeSet1-r12 or csi-SubframeSet2-r12, the UE shall report CQI according to Table 7.2.3-2 for the corresponding CSI subframe set configured by altCQI-Table-r12
the UE shall report CQI for the other CSI subframe set according to Table 7.2.3-1.
Else
the UE shall report CQI according to Table 7.2.3-1.

For a non-BL/CE UE, when reporting RI the UE reports a single instance of the number of useful transmission layers. For each RI reporting interval when the UE is configured in transmission modes 4 or when the UE is configured in transmission mode 8, 9 or 10 with PMI/RI reporting, a UE shall determine a RI from the supported set of RI values as defined in subclause 5.2.2.6 of [4] and report the number in each RI report. For each RI reporting interval when the UE is configured in transmission mode 3, a UE shall determine RI as defined in subclause 5.2.2.6 of [4] in each reporting interval and report the detected number in each RI report to support selection between transmit diversity and large delay CDD.

For a UE configured in transmission mode 9 or 10, when reporting CRI the UE reports a single instance of a selected CSI-RS resource. For each CRI reporting interval when a UE is configured with higher layer parameter eMIMO-Type, and eMIMO-Type is set to 'CLASS B', and the number of configured CSI-RS resources is more than one for a CSI process, the UE shall determine a CRI from the supported set of CRI values as defined in subclause 5.2.2.6 of [4] and report the number in each CRI report.

For a non-BL/CE UE, when reporting PMI the UE reports either a single or a multiple PMI report. The number of RBs represented by a single UE PMI report can be $N_{RB}^{DL}$ or a smaller subset of RBs. The number of RBs represented by a single PMI report is semi-statically configured by higher layer signalling. A UE is restricted to report PMI, RI and PTI within a precoder codebook subset specified by one or more bitmap parameter(s) codebookSubsetRestriction, codebookSubsetRestriction-1, codebookSubsetRestriction-2, codebookSubsetRestriction-3 configured by higher layer signalling.

For a UE configured in transmission mode 10 and the UE not configured with higher layer parameter eMIMO-Type for a CSI process, or for a UE configured in transmission mode 9 or 10 and the UE configured with higher layer parameter eMIMO-Type, and eMIMO-Type is set to 'CLASS B', and one CSI-RS resource configured and except with higher layer parameter alternativeCodebookEnabledCLASSB_K1=TRUE configured and except with higher layer parameter alternativeCodebookEnabledCLASSB_K1=TRUE configured for a CSI process, the bitmap parameter codebookSubsetRestriction is configured for each CSI process and each subframe sets (if subframe sets $c_{CSI,0}$ and $c_{CSI,1}$ are configured by higher layers) by higher layer signaling.

For a UE configured in transmission mode 9 or 10, and for a CSI process and UE configured with higher layer parameter eMIMO-Type, and eMIMO-Type is set to 'CLASS A', the bitmap parameters codebookSubsetRestriction-1, codebookSubsetRestriction-2 is configured for the CSI process and each subframe sets (if subframe sets $c_{CSI,0}$ and $c_{CSI,1}$ are configured by higher layers) by higher layer signaling.

For a UE configured in transmission mode 9 or 10, and for a CSI process and UE configured with higher layer parameter eMIMO-Type, and eMIMO-Type is set to 'CLASS B', and one CSI-RS resource configured, and higher layer parameter alternativeCodebookEnabledCLASSB_K1=TRUE, the bitmap parameter codebookSubsetRestriction-3 is configured for the CSI process and each subframe sets (if subframe sets $c_{CSI,0}$ and $c_{CSI,1}$ are configured by higher layers) by higher layer signaling.

For a UE configured in transmission mode 9 or 10, and for a CSI process and UE configured with higher layer parameter eMIMO-Type, and eMIMO-Type is set to 'CLASS B', and more than one CSI-RS resource configured, the bitmap parameter codebookSubsetRestriction is configured for each CSI-RS resource of the CSI process and each subframe sets (if subframe sets $c_{CSI,0}$ and $c_{CSI,1}$ are configured by higher layers) by higher layer signaling.

< . . . >

Table 7.2-1g of 3GPP TS 36.213 v13.1.1, Entitled "g(•) for a CSI Process with eMIMO-Type Set to 'CLASS A'", has been Reproduced as FIG. 5

For a non-BL/CE UE, the set of subbands (S) a UE shall evaluate for CQI reporting spans the entire downlink system bandwidth. A subband is a set of k contiguous PRBs where k is a function of system bandwidth. Note the last subband in set S may have fewer than k contiguous PRBs depending on $N_{RB}^{DL}$. The number of subbands for system bandwidth given by $N_{RB}^{DL}$ is defined by $N=\lceil N_{RB}^{DL}/k \rceil$. The subbands shall be indexed in the order of increasing frequency and non-increasing sizes starting at the lowest frequency.

For transmission modes 1, 2, 3 and 5, as well as transmission modes 8, 9 and 10 without PMI/RI reporting, transmission mode 4 with RI=1, transmission modes 8, 9 and 10 with PMI/RI reporting and RI=1, and transmission modes 9 and 10 without PMI reporting and RI=1, a single 4-bit wideband CQI is reported.

For transmission modes 3 and 4, as well as transmission modes 8, 9 and 10 with PMI/RI reporting, and transmission modes 9 and 10 without PMI reporting, CQI is calculated assuming transmission of one codeword for RI=1 and two codewords for RI>1.

For RI>1 with transmission mode 4, as well as transmission modes 8, 9 and 10 with PMI/RI reporting, and transmission modes 9 and 10 without PMI reporting, PUSCH based triggered reporting includes reporting a wideband CQI which comprises:
A 4-bit wideband CQI for codeword 0
A 4-bit wideband CQI for codeword 1

For RI>1 with transmission mode 4, as well as transmission modes 8, 9 and 10 with PMI/RI reporting, and transmission modes 9 and 10 without PMI reporting, PUCCH based reporting includes reporting a 4-bit wideband CQI for codeword 0 and a wideband spatial differential CQI. The wideband spatial differential CQI value comprises:
A 3-bit wideband spatial differential CQI value for codeword 1 offset level
Codeword 1 offset level=wideband CQI index for codeword 0−wideband CQI index for codeword 1.
The mapping from the 3-bit wideband spatial differential CQI value to the offset level is shown in Table 7.2-2.

Table 7.2-2 of 3GPP TS 36.213 v13.1.1, Entitled "Mapping Spatial Differential CQI Value to Offset Level", is Reproduced as FIG. 6

7.2.1 Aperiodic CSI Reporting Using PUSCH

The term "UL/DL configuration" in this subclause refers to the higher layer parameter subframeAssignment unless specified otherwise.

A non-BL/CE UE shall perform aperiodic CSI reporting using the PUSCH in subframe n+k on serving cell c, upon decoding in subframe n either:
an uplink DCI format [4], or
a Random Access Response Grant,
for serving cell c if the respective CSI request field is set to trigger a report and is not reserved. A BL/CE UE shall perform aperiodic CSI reporting using the PUSCH upon decoding either:
an uplink DCI format [4], or
a Random Access Response Grant,
for serving cell c if the respective CSI request field is set to trigger a report and is not reserved. The subframe(s) in which the PUSCH carrying the corresponding aperiodic CSI reporting triggered by an UL DCI format is transmitted is determined according to subclause 8.0.

If the CSI request field is 1 bit and the UE is configured in transmission mode 1-9 and the UE is not configured with csi-SubframePatternConfig-r12 for any serving cell, a report is triggered for serving cell c, if the CSI request field is set to '1'.

If the CSI request field is 1 bit and the UE is configured in transmission mode 10 and the UE is not configured with csi-SubframePatternConfig-r12 for any serving cell, a report is triggered for a set of CSI process(es) for serving cell c corresponding to the higher layer configured set of CSI process(es) associated with the value of CSI request field of '01' in Table 7.2.1-1B, if the CSI request field is set to '1'.

If the CSI request field size is 2 bits and the UE is configured in transmission mode 1-9 for all serving cells and the UE is not configured with csi-SubframePatternConfig-r12 for any serving cell, a report is triggered according to the value in Table 7.2.1-1A corresponding to aperiodic CSI reporting.

If the CSI request field size is 2 bits and the UE is configured in transmission mode 10 for at least one serving cell and the UE is not configured with csi-SubframePatternConfig-r12 for any serving cell, a report is triggered according to the value in Table 7.2.1-1B corresponding to aperiodic CSI reporting.

If the CSI request field is 1 bit and the UE is configured with the higher layer parameter csi-SubframePatternConfig-r12 for at least one serving cell, a report is triggered for a set of CSI process(es) and/or {CSI process, CSI subframe set}-pair(s) for serving cell c corresponding to the higher layer configured set of CSI process(es) and/or {CSI process, CSI subframe set}-pair(s) associated with the value of CSI request field of '01' in Table 7.2.1-1C, if the CSI request field is set to '1'.

If the CSI request field size is 2 bits and the UE is configured with the higher layer parameter csi-SubframePatternConfig-r12 for at least one serving cell, a report is triggered according to the value in Table 7.2.1-1C corresponding to aperiodic CSI reporting.

If the CSI request field size is 3 bits and the UE is not configured with the higher layer parameter csi-SubframePatternConfig-r12 for any serving cell, a report is triggered according to the value in Table 7.2.1-1D corresponding to aperiodic CSI reporting.

If the CSI request field size is 3 bits and the UE is configured with the higher layer parameter csi-SubframePatternConfig-r12 for at least one serving cell, a report is triggered according to the value in Table 7.2.1-1E corresponding to aperiodic CSI reporting.

For a given serving cell, if the UE is configured in transmission modes 1-9, the "CSI process" in Table 7.2.1-1B, Table 7.2.1-1C, Table 7.2.1-1D, and Table 7.2.1-1E refers to the aperiodic CSI configured for the UE on the given serving cell. A UE is not expected to be configured by higher layers with more than 5 CSI processes in each of the $1^{st}$ and $2^{nd}$ set of CSI process(es) in Table 7.2.1-1B. A UE is not expected to be configured by higher layers with more than 5 CSI processes and/or {CSI process, CSI subframe set}-pair(s) in each of the $1^{st}$ and $2^{nd}$ set of CSI process(es) and/or {CSI process, CSI subframe set}-pair(s) in Table 7.2.1-1C. A UE is not expected to be configured by higher layers with more than one instance of the same CSI process in each of the higher layer configured sets associated with the value of CSI request field of '01', '10', and '11' in Table 7.2.1-1B and Table 7.2.1-1C respectively. A UE is not expected to be configured by higher layers with more than 32 CSI processes in each of the $1^{st}$ to $6^{th}$ set of CSI process(es) in Table 7.2.1-1D. A UE is not expected to be configured by higher layers with more than 32 CSI processes and/or {CSI process, CSI subframe set}-pair(s) in each of the $1^{st}$ to $6^{th}$ set of CSI process(es) and/or {CSI process, CSI subframe set}-pair(s) in Table 7.2.1-1E. A UE is not expected to be configured by higher layers with more than one instance of the same CSI process in each of the higher layer configured sets associated with the value of CSI request field of '001', '010', '011', '100', '101', '110' and '111' in Table 7.2.1-1D and Table 7.2.1-1E respectively.

A UE is not expected to receive more than one aperiodic CSI report request for a given subframe.

If a UE is configured with more than one CSI process for a serving cell, the UE on reception of an aperiodic CSI report request triggering a CSI report according to Table 7.2.1-1B is not expected to update CSI corresponding to the CSI reference resource (defined in subclause 7.2.3) for all CSI processes except the max($N_x-N_u$, 0) lowest-indexed CSI processes for the serving cell associated with the request when the UE has $N_u$ unreported CSI processes associated with other aperiodic CSI requests for the serving cell, where a CSI process associated with a CSI request shall only be counted as unreported in a subframe before the subframe where the PUSCH carrying the corresponding CSI is transmitted, and $N_{CSI-P}$ is the maximum number of CSI processes supported by the UE for the serving cell and:

for FDD serving cell $N_x=N_{CSI-P}$;
for TDD serving cell
  if the UE is configured with four CSI processes for the serving cell, $N_x=N_{CSI-P}$
  if the UE is configured with two or three CSI processes for the serving cell, $N_x=3$.

If more than one value of $N_{CSI-P}$ is included in the UE-EUTRA-Capability, the UE assumes a value of $N_{CSI-P}$ that is consistent with its CSI process configuration. If more than one consistent value of $N_{CSI-P}$ exists, the UE may assume any one of the consistent values.

If a UE is configured with multiple cell groups, and if the UE receives multiple aperiodic CSI report requests in a subframe for different cell groups triggering more than one CSI report, the UE is not required to update CSI for more than 5 CSI processes from the CSI processes corresponding to all the triggered CSI reports.

If a UE is configured with a PUCCH-SCell, and if the UE receives multiple aperiodic CSI report requests in a subframe for both the primary PUCCH group and the secondary PUCCH group triggering more than one CSI report, the UE is not required to update CSI for more than 5 CSI processes from the CSI processes corresponding to all the triggered CSI reports, in case the total number of serving cells in the primary and secondary PUCCH group is no more than 5. If a UE is configured with more than 5 serving cells, and if the UE receives aperiodic CSI report request in a subframe triggering more than $N_y$ CSI reports, the UE is not required to update CSI for more than $N_y$ CSI processes from the CSI processes corresponding to all the triggered CSI reports, where the value of $N_y$ is given by maxNumberUpdatedCSI-Proc-r13.

Table 7.2.1-1A of 3GPP TS 36.213 v13.1.1,
Entitled "CSI Request Field for PDCCH/EPDCCH
with Uplink DCI Format in UE Specific Search
Space", is Reproduced as FIG. 7

Table 7.2.1-1B of 3GPP TS 36.213 v13.1.1,
Entitled "CSI Request Field for PDCCH/EPDCCH
with Uplink DCI Format in UE Specific Search
Space", is Reproduced as FIG. 8

< . . . >

For a non-BL/CE UE, when the CSI request field from an uplink DCI format is set to trigger a report, for FDD k=4, and for TDD UL/DL configuration 1-6, k is given in Table 8-2. For TDD UL/DL configuration 0, if the MSB of the UL index is set to 1 and LSB of the UL index is set to 0, k is given in Table 8-2; or if MSB of the UL index is set to 0 and LSB of the UL index is set to 1, k is equal to 7; or if both MSB and LSB of the UL index is set to 1, k is given in Table 8-2.

For TDD, if a UE is configured with more than one serving cell and if the UL/DL configurations of at least two serving cells are different, or if the UE is configured with the parameter EIMTA-MainConfigServCell-r12 for at least one serving cell, or for FDD-TDD and serving cell frame structure type 2, the "TDD UL/DL Configuration" given in Table 8-2 refers to the UL-reference UL/DL configuration (defined in subclause 8.0).

For a non-BL/CE UE, when the CSI request field from a Random Access Response Grant is set to trigger a report and is not reserved, k is equal to $k_1$ if the UL delay field in subclause 6.2 is set to zero, where $k_1$ is given in subclause 6.1.1. The UE shall postpone aperiodic CSI reporting to the next available UL subframe if the UL delay field is set to 1.

For a BL/CE UE, when the CSI request field from a Random Access Response Grant is set to trigger a report and is not reserved, the subframe(s) in which the corresponding aperiodic CSI reporting is transmitted is determined according to subclause 6.1.1.

The minimum reporting interval for aperiodic reporting of CQI and PMI and RI and CRI is 1 subframe. The subband size for CQI shall be the same for transmitter-receiver configurations with and without precoding.

If a UE is not configured for simultaneous PUSCH and PUCCH transmission, when aperiodic CSI report with no transport block associated as defined in subclause 8.6.2 and positive SR is transmitted in the same subframe, the UE shall transmit SR, and, if applicable, HARQ-ACK, on PUCCH resources as described in subclause 10.1

A UE is semi-statically configured by higher layers to feed back CQI and PMI and corresponding RI and CRI on the same PUSCH using one of the following CSI reporting modes given in Table 7.2.1-1 and described below. For a BL/CE UE the UE shall not transmit the RI for any CSI reporting mode in Table 7.2.1-1.

Table 7.2.1-1 of 3GPP TS 36.213 v13.1.1, Entitled "CQI and PMI Feedback Types for PUSCH CSI Reporting Modes", is Reproduced as FIG. 9

For non-BL/CE UE and for each of the transmission modes defined in subclause 7.1, the following reporting modes are supported on PUSCH:
Transmission mode 1: Modes 2-0, 3-0, 1-0
Transmission mode 2: Modes 2-0, 3-0, 1-0
Transmission mode 3: Modes 2-0, 3-0, 1-0
Transmission mode 4: Modes 1-2, 2-2, 3-1, 3-2, 1-1
Transmission mode 5: Mode 3-1, 1-1
Transmission mode 6: Modes 1-2, 2-2, 3-1, 3-2, 1-1
Transmission mode 7: Modes 2-0, 3-0, 1-0
Transmission mode 8: Modes 1-2, 2-2, 3-1, 3-2, 1-1 if the UE is configured with PMI/RI reporting; modes 2-0, 3-0, 1-0 if the UE is configured without PMI/RI reporting
Transmission mode 9: Modes 1-2, 2-2, 3-1, 3-2, 1-1 if the UE is configured with PMI/RI reporting and number of CSI-RS ports>1; modes 2-0, 3-0, 1-0 if the UE is configured without PMI/RI reporting or without PMI reporting or number of CSI-RS ports=1 or the number of CSI-RS ports in each of one or more CSI-RS resources in a CSI process is one when CSI-Reporting-Type is set to 'CLASS B'.
Transmission mode 10: Modes 1-2, 2-2, 3-1, 3-2, 1-1 if the UE is configured with PMI/RI reporting and number of CSI-RS ports>1; modes 2-0, 3-0, 1-0 if the UE is configured without PMI/RI reporting or without PMI reporting or number of CSI-RS ports=1 or the number of CSI-RS ports in each of one or more CSI-RS resources in a CSI process is one when CSI-Reporting-Type is set to 'CLASS B'.
< . . . >

The aperiodic CSI reporting mode is given by the parameter cqi-ReportModeAperiodic which is configured by higher-layer signalling.

For a serving cell with $N_{RB}^{DL} \leq 7$, PUSCH reporting modes are not supported for that serving cell.

For a non-BL/CE UE, RI is only reported for transmission modes 3 and 4, as well as transmission modes 8, 9 and 10 with PMI/RI reporting, and transmission modes 9 and 10 without PMI reporting.

For a BL/CE UE, RI is not reported.

For serving cell c, a UE configured in transmission mode 10 with PMI/RI reporting or without PMI reporting for a CSI process can be configured with a 'RI-reference CSI process' for the CSI process. If the UE is configured with a 'RI-reference CSI process' for the CSI process, the reported RI for the CSI process shall be the same as the reported RI for the configured 'RI-reference CSI process'. The RI for the 'RI-reference CSI process' is not based on any other configured CSI process other than the 'RI-reference CSI process'. The UE is not expected to receive an aperiodic CSI report request for a given subframe triggering a CSI report including CSI associated with the CSI process and not including CSI associated with the configured 'RI-reference CSI process'. If the UE is configured with a 'RI-reference CSI process' for a CSI process and if subframe sets $c_{CSI,0}$ and $c_{CSI,1}$ are configured by higher layers for only one of the CSI processes then the UE is not expected to receive configuration for the CSI process configured with the subframe subsets that have a different set of restricted RIs with precoder codebook subset restriction between the two subframe sets. The UE is not expected to receive configurations for the CSI process and the 'RI-reference CSI process' that have a different:
Aperiodic CSI reporting mode, and/or
number of CSI-RS antenna ports, and/or
set of restricted RIs with precoder codebook subset restriction if subframe sets $c_{CSI,0}$ and $c_{CSI,1}$ are not configured by higher layers for both CSI processes, and/or
set of restricted RIs with precoder codebook subset restriction for each subframe set if subframe sets $c_{CSI,0}$ and $c_{CSI,1}$ are configured by higher layers for both CSI processes, and/or
set of restricted RIs with precoder codebook subset restriction if subframe sets $c_{CSI,0}$ and $c_{CSI,1}$ are configured by higher layers for only one of the CSI processes, and the set of restricted RIs for the two subframe sets are the same, and/or
number of CSI-RS antenna ports for any two CSI-RS resources for the two CSI processes, if a UE is configured with higher layer parameter eMIMO-Type, and eMIMO-Type is set to 'CLASS B', and the number of configured CSI-RS resources is more than one for at least one of the two CSI processes, and/or
set of restricted RIs with precoder codebook subset restriction for any two CSI-RS resources for the two CSI processes, if a UE is configured with higher layer parameter eMIMO-Type, and eMIMO-Type is set to 'CLASS B', and the number of configured CSI-RS resources is more than one for at least one of the two CSI processes and if subframe sets $c_{CSI,0}$ and $c_{CSI,1}$ are not configured by higher layers for both CSI processes, and/or
set of restricted RIs with precoder codebook subset restriction for each subframe set and for any two CSI-RS resources for the two CSI processes, if a UE is configured with higher layer parameter eMIMO-Type, and eMIMO-Type is set to 'CLASS B', and the number of configured CSI-RS resources is more than one for at least one of the two CSI processes and if subframe sets $c_{CSI,0}$ and $c_{CSI,1}$ are configured by higher layers for both CSI processes, and/or
set of restricted RIs with precoder codebook subset restriction for any two CSI-RS resources for the two CSI processes, if a UE is configured with higher layer parameter eMIMO-Type, and eMIMO-Type is set to 'CLASS B', and the number of configured CSI-RS resources is more than one for at least one of the two CSI processes and if subframe sets $c_{CSI,0}$ and $c_{CSI,1}$ are configured by higher layers for only one of the CSI processes, and the set of restricted RIs for the two subframe sets are the same.

For a non-BL/CE UE, a RI report for a serving cell on an aperiodic reporting mode is valid only for CQI/PMI report or CQI report without PMI reporting for that serving cell on that aperiodic reporting mode.

For a UE configured in transmission mode 9 or 10, and for a CSI process, if a UE is configured with parameter eMIMO-Type configured by higher layers, and eMIMO-Type is set to 'CLASS B' and the number of configured CSI-RS resources is more than one, and the total number of antenna ports across all configured CSI-RS resources is more than 15, the UE on reception of an aperiodic CSI report request triggering a CSI report in uplink subframe n is not expected to update CRI corresponding to the CSI process if CRI for the CSI process has been reported and updated on or after subframe n-5.

Wideband feedback

Mode 1-2 description:

For a UE configured in transmission mode 9 or 10, and for a CSI process, if a UE is configured with higher layer parameter eMIMO-Type, and eMIMO-Type is set to 'CLASS B', and the number of configured CSI-RS resources is more than one, the UE shall report one wideband CRI which is calculated assuming transmission on set S subbands.

For each subband a preferred precoding matrix is selected from the codebook subset assuming transmission only in the subband A UE shall report one wideband CQI value per codeword which is calculated assuming the use of the corresponding selected precoding matrix in each subband and transmission on set S subbands. The UE shall report the selected precoding matrix indicator for each set S subband except with 8 CSI-RS ports configured for transmission modes 9 and 10 or with alternativeCodeBookEnabledFor4TX-r12=TRUE configured for transmission modes 8, 9 and 10, in which case a first precoding matrix indicator $i_1$ is reported for the set S subbands and a second precoding matrix indicator $i_2$ is reported for each set S subband, if the UE is not configured with higher layer parameter eMIMO-Type, or UE reports CRI, or UE is configured in transmission mode 9 or 10, and with higher layer parameter eMIMO-Type, and eMIMO-Type is set to 'CLASS B', and one CSI-RS resource configured, and except with higher layer parameter alternativeCodebookEnabledCLASSB_K1=TRUE configured.

UE is configured in transmission mode 9 or 10, and with higher layer parameter eMIMO-Type, and eMIMO-Type is set to 'CLASS A', in which case a first precoding matrix indicator $i_1$ is reported for the set S subbands and a second precoding matrix indicator $i_2$ is reported for each set S subband.

Subband size is given by Table 7.2.1-3.

For transmission modes 4, 8, 9 and 10, the reported PMI and CQI values are calculated conditioned on the reported RI. For other transmission modes they are reported conditioned on rank 1. If CRI is reported, the reported PMI, CQI, and RI values are calculated conditioned on the reported CRI.

Mode 1-1 description:

A single precoding matrix is selected from the codebook subset assuming transmission on set S subbands A UE shall report a wideband CQI value per codeword which is calculated assuming the use of the single precoding matrix in all subbands and transmission on set S subbands The UE shall report the selected single precoding matrix indicator except with 8 CSI-RS ports configured for transmission modes 9 and 10 or with alternativeCodeBookEnabledFor4TX-r12=TRUE configured for transmission modes 8, 9 and 10, in which case a first and second precoding matrix indicator are reported corresponding to the selected single precoding matrix.

For transmission modes 4, 8, 9 and 10, the reported PMI and CQI values are calculated conditioned on the reported RI. For other transmission modes they are reported conditioned on rank 1.

Mode 1-0 description:

A UE shall report a wideband CQI value which is calculated assuming transmission on set S subbands The wideband CQI represents channel quality for the first codeword, even when RI>1.

For transmission mode 3 the reported CQI value is calculated conditioned on the reported RI. For other transmission modes they are reported conditioned on rank 1.

< . . . >

UE-selected subband feedback

< . . . >

Mode 2-2 description:

For a UE configured in transmission mode 9 or 10, and for a CSI process, if a UE is configured with higher layer parameter eMIMO-Type, and eMIMO-Type is set to 'CLASS B', and the number of configured CSI-RS resources is more than one, the UE shall report one wideband CRI which is calculated assuming transmission on set S subbands.

The UE shall perform joint selection of the set of M preferred subbands of size k within the set of subbands S and a preferred single precoding matrix selected from the codebook subset that is preferred to be used for transmission over the M selected subbands.

The UE shall report one CQI value per codeword reflecting transmission only over the selected M preferred subbands and using the same selected single precoding matrix in each of the M subbands.

A single precoding matrix is selected from the codebook subset assuming transmission on set S subbands A UE shall report a wideband CQI value per codeword which is calculated assuming the use of the single precoding matrix in all subbands and transmission on set S subbands The UE shall report the selected single precoding matrix indicator preferred for the M selected subbands and the selected single precoding matrix indicator for all set S subbands except with, 8 CSI-RS ports configured for transmission modes 9 and 10 or with alternativeCodeBookEnabledFor4TX-r12=TRUE configured for transmission modes 8, 9 and 10, in which case the UE shall report a first precoding matrix indicator for all set S subbands, a second precoding matrix indicator for all set S subbands and another second precoding matrix indicator for the M selected subbands, if the UE is not configured with higher layer parameter eMIMO-Type, or UE reports CRI, or UE is configured in transmission mode 9 or 10, and with higher layer parameter eMIMO-Type, and eMIMO-Type is set to 'CLASS B', and one CSI-RS resource configured, and except with higher layer parameter alternativeCodebookEnabledCLASSB_K1=TRUE configured.

UE is configured in transmission mode 9 or 10, and with higher layer parameter eMIMO-Type, and eMIMO-Type is set to 'CLASS A', in which case the UE shall report a first precoding matrix indicator $i_1$ for all set S subbands, a second precoding matrix indicator $i_2$ for all set S subbands and another second precoding matrix indicator $i_2$ for or the M selected subbands.

For transmission modes 4, 8, 9 and 10, the reported PMI and CQI values are calculated conditioned on the reported RI. For other transmission modes they are reported conditioned on rank 1. If CRI is reported, the reported PMI, CQI, and RI values are calculated conditioned on the reported CRI.

For all UE-selected subband feedback modes the UE shall report the positions of the M selected subbands using a combinatorial index r defined as $$r = \sum_{i=0}^{M-1} \binom{N - s_i}{M - i}$$

where the set $\{s_i\}_{i=0}^{M-1}$, ($1 \le s_i \le N$, $s_i < s_{i+1}$) contains the M sorted subband indices and $$\binom{x}{y} = \begin{cases} \binom{x}{y} & x \ge y \\ 0 & x < y \end{cases}$$

is the extended binomial coefficient, resulting in unique label $$r \in \left\{ 0, \cdots, \binom{N}{M} - 1 \right\}.$$

The CQI value for the M selected subbands for each codeword is encoded differentially using 2-bits relative to its respective wideband CQI as defined by Differential CQI offset level=M selected subbands CQI index−wideband CQI index The mapping from the 2-bit differential CQI value to the offset level is shown in Table 7.2.1-4.

Table 7.2.1-4 of 3GPP TS 36.213 v13.1.1, Entitled "Mapping Differential CQI Value to Offset Level", is Reproduced as FIG. 10

Supported subband size k and M values include those shown in Table 7.2.1-5. In Table 7.2.1-5 the k and M values are a function of system bandwidth.

The number of bits to denote the position of the M selected subbands is $$L = \left\lceil \log_2 \binom{N}{M} \right\rceil$$

< . . . >

Table 7.2.1-5 of 3GPP TS 36.213 v13.1.1., Entitled "Subband Size (k) and Number of Subbands (M) in S Vs. Downlink System Bandwidth", is Reproduced as FIG. 11

< . . . >

7.2.2 Periodic CSI Reporting Using PUCCH

A UE is semi-statically configured by higher layers to periodically feed back different CSI components (CQI, PMI, PTI, CRI, and/or RI) on the PUCCH using the reporting modes given in Table 7.2.2-1 and described below. A UE in transmission mode 10 can be configured by higher layers for multiple periodic CSI reports corresponding to one or more CSI processes per serving cell on PUCCH.

A BL/CE UE configured with CEModeB is not expected to be configured with periodic CSI report.

Table 7.2.2-1 of 3GPP TS 36.213 v13.1.1., Entitled "CQI and PMI Feedback Types for PUCCH CSI Reporting Modes", is Reproduced as FIG. 12

For a non-BL/CE UE and for each of the transmission modes defined in subclause 7.1, the following periodic CSI reporting modes are supported on PUCCH:

Transmission mode 1: Modes 1-0, 2-0
Transmission mode 2: Modes 1-0, 2-0
Transmission mode 3: Modes 1-0, 2-0
Transmission mode 4: Modes 1-1, 2-1
Transmission mode 5: Modes 1-1, 2-1
Transmission mode 6: Modes 1-1, 2-1
Transmission mode 7: Modes 1-0, 2-0
Transmission mode 8: Modes 1-1, 2-1 if the UE is configured with PMI/RI reporting; modes 1-0, 2-0 if the UE is configured without PMI/RI reporting
Transmission mode 9: Modes 1-1, 2-1 if the UE is configured with PMI/RI reporting and number of CSI-RS ports>1; modes 1-0, 2-0 if the UE is configured without PMI/RI reporting or without PMI reporting or number of CSI-RS ports=1 or the number of CSI-RS ports in each of one or more CSI-RS resources in a CSI process is one when CSI-Reporting-Type is set to be 'CLASS B'.
Transmission mode 10: Modes 1-1, 2-1 if the UE is configured with PMI/RI reporting and number of CSI-RS ports>1; modes 1-0, 2-0 if the UE is configured without PMI/RI reporting or without PMI reporting or number of CSI-RS ports=1 or the number of CSI-RS ports in each of one or more CSI-RS resources in a CSI process is one when CSI-Reporting-Type is set to be 'CLASS B'.

< . . . >

For a UE configured in transmission mode 1-9, one periodic CSI reporting mode for each serving cell is configured by higher-layer signalling.

For a UE configured in transmission mode 10, one or more periodic CSI reporting modes for each serving cell are configured by higher-layer signalling.

For UE in transmission mode 9 and the UE configured with higher layer parameter eMIMO-Type, the term 'CSI process' in this subclause refers to the CSI configured for the UE.

For a UE configured with transmission mode 9 or 10, and with 8 CSI-RS ports, if the UE is not configured with parameter eMIMO-Type by higher layers, or UE is configured with parameter eMIMO-Type by higher layers, and eMIMO-Type is set to 'CLASS B', and one CSI-RS resource configured, and except with higher layer parameter alternativeCodebookEnabledCLASSB_K1=TRUE configured, or UE is configured with parameter eMIMO-Type by higher layers, and eMIMO-Type is set to 'CLASS B', and more than one CSI-RS resource configured, and at least one CSI-RS resource with 8 CSI-RS ports, mode 1-1 is configured to be either submode 1 or submode 2 via higher-layer signaling using the parameter PUCCH_format1-1_CSI_reporting_mode.

For a UE configured with transmission mode 8, 9 or 10, and with alternativeCodeBookEnabledFor4TX-r12=TRUE configured, if the UE is not configured with higher layer parameter eMIMO-Type, or UE is configured with parameter eMIMO-Type by higher layers, and eMIMO-Type is set to 'CLASS B', and one CSI-RS resource configured, and except with higher layer parameter alternativeCodebookEnabledCLASSB_K1=TRUE configured, or UE is configured with parameter eMIMO-Type by higher layers, and eMIMO-Type is set to 'CLASS B', and more than one CSI-RS resource configured, and at least one CSI-RS resource with 4 CSI-RS ports, mode 1-1 is configured to be either submode 1 or submode 2 via higher-layer signaling using the parameter PUCCH_format1-1_CSI reporting mode.

For the UE-selected subband CQI, a CQI report in a certain subframe of a certain serving cell describes the channel quality in a particular part or in particular parts of the bandwidth of that serving cell described subsequently as bandwidth part (BP) or parts. The bandwidth parts shall be indexed in the order of increasing frequency and non-increasing sizes starting at the lowest frequency.

For each serving cell
  There are a total of N subbands for a serving cell system bandwidth given by $N_{RB}^{DL}$ where $\lfloor N_{RB}^{DL}/k \rfloor$ subbands are of size k. If $\lceil N_{RB}^{DL}/k \rceil - \lfloor N_{RB}^{DL}/k \rfloor > 0$ then one of the subbands is of size $N_{RB}^{DL} - k \cdot \lfloor N_{RB}^{DL}/k \rfloor$.
  A bandwidth part j is frequency-consecutive and consists of $N_j$ subbands where J bandwidth parts span S or $N_{RB}^{DL}$ as given in Table 7.2.2-2. If J=1 then $N_j$ is $\lceil N_{RB}^{DL}/k/J \rceil$. If J>1 then N is either $\lceil N_{RB}^{DL}/k/J \rceil$ or $\lceil N_{RB}^{DL}/k/j \rceil - 1$, depending on $N_{RB}^{DL}$, k and J.
  Each bandwidth part j, where $0 \leq j \leq J-1$, is scanned in sequential order according to increasing frequency.
  For UE selected subband feedback a single subband out of $N_j$ subbands of a bandwidth part is selected along with a corresponding L-bit label indexed in the order of increasing frequency, where $L = \lceil \log_2 \lceil N_{RB}^{DL}/k/J \rceil \rceil$.

The CQI and PMI payload sizes of each PUCCH CSI reporting mode are given in Table 7.2.2-3.

The following CQI/PMI and RI reporting types with distinct periods and offsets are supported for the PUCCH CSI reporting modes given in Table 7.2.2-3:

Type 1 report supports CQI feedback for the UE selected sub-bands

Type 1a report supports subband CQI and second PMI feedback

Type 2, Type 2b, and Type 2c report supports wideband CQI and PMI feedback

Type 2a report supports wideband PMI feedback

Type 3 report supports RI feedback

Type 4 report supports wideband CQI

Type 5 report supports RI and wideband PMI feedback

Type 6 report supports RI and PTI feedback

Type 7 report support CRI and RI feedback

Type 8 report supports CRI, RI and wideband PMI feedback

Type 9 report supports CRI, RI and PTI feedback

Type 10 report supports CRI feedback

For a UE configured in transmission mode 1-9 and for each serving cell, or for a UE configured in transmission mode 10 and for each CSI process in each serving cell, the periodicity $N_{pd}$ (in subframes) and offset $N_{OFFSET,CQI}$ (in subframes) for CQI/PMI reporting are determined based on the parameter cqi-pmi-ConfigIndex ($I_{CQI/PMI}$) given in Table 7.2.2-1A for FDD or for FDD-TDD with primary cell frame structure 1 and Table 7.2.2-1C for TDD or for FDD-TDD and primary cell frame structure type 2. The periodicity $M_{RI}$ and relative offset $N_{OFFSET,RI}$ for RI reporting are determined based on the parameter ri-ConfigIndex ($I_{RI}$) given in Table 7.2.2-1B. For a UE configured in transmission mode 9 and for each serving cell, or for a UE configured in transmission mode 10 and for each CSI process in each serving cell, if the UE is configured with parameter eMIMO-Type by higher layers, and eMIMO-Type is set to 'CLASS B', and the number of configured CSI-RS resources is more than one, when RI reporting is configured, the periodicity $M_{CRI}$ for CRI reporting is determined based on the parameter cri-ConfigIndex ($I_{CRI}$) given in Table 7.2.2-1D. When the number of antenna ports in each configured CSI-RS resource is one, the periodicity $M_{CRI}$ and relative offset $N_{OFFSET,CRI}$ for CRI reporting are determined based on the parameter cri-ConfigIndex ($I_{CRI}$) given in Table 7.2.2-1E. The parameters cqi-pmi-ConfigIndex, ri-ConfigIndex, and cri-ConfigIndex are configured by higher layer signalling. The relative reporting offset for RI $N_{OFFSET,RI}$ takes values from the set $\{0, -1, \ldots, -(N_{pd}-1)\}$. If a UE is configured to report for more than one CSI subframe set then parameter cqi-pmi-ConfigIndex, ri-ConfigIndex and cri-ConfigIndex respectively correspond to the CQI/PMI, RI, and CRI periodicity and relative reporting offset for subframe set 1 and cqi-pmi-ConfigIndex2, ri-ConfigIndex2 and cri-ConfigIndex2 respectively correspond to the CQI/PMI, RI, and CRI periodicity and relative reporting offset for subframe set 2. For a UE configured with transmission mode 10, the parameters cqi-pmi-ConfigIndex, ri-ConfigIndex, cri-ConfigIndex, cqi-pmi-ConfigIndex2, ri-ConfigIndex2, and cri-ConfigIndex2 can be configured for each CSI process. A BL/CE UE is not expected to be configured with the parameter ri-ConfigIndex.

In the case where wideband CQI/PMI reporting is configured:

The reporting instances for wideband CQI/PMI are subframes satisfying $(10 \times n_f + \lfloor n_s/2 \rfloor - N_{OFFSET,CQI}) \bmod (N_{pd}) = 0$.

For a UE configured in transmission mode 9 or 10, and UE configured with the parameter eMIMO-Type by higher layers, and eMIMO-Type set to 'CLASS A', the reporting interval of wideband first PMI reporting is an integer multiple H' of period $N_{pd}$ (in subframes).

The reporting instances for wideband first PMI are subframes satisfying $(10 \times n_f + \lfloor n_s/2 \rfloor - N_{OFFSET,CQI}) \bmod (H' \cdot N_{pd}) = 0$.

In case RI reporting is configured, the reporting interval of the RI reporting is an integer multiple $M_{RI}$ of period $N_{pd}$ (in subframes).

The reporting instances for RI are subframes satisfying $(10 \times n_f + \lfloor n_s/2 \rfloor - N_{OFFSET,CQI} - N_{OFFSET,CRI}) \bmod (N_{pd} \cdot M_{RI}) = 0$.

In case CRI reporting is configured,
if the number of antenna ports in each configured CSI-RS resource is one,
the reporting interval of the CRI reporting is an integer multiple $M_{CRI}$ of period $N_{pd}$ (in subframes)
The reporting instances for CRI are subframes satisfying $(10 \times n_f + \lfloor n_s/2 \rfloor - N_{OFFSET,CQI} - N_{OFFSET,CRI}) \bmod (N_{pd} \cdot M_{CRI}) = 0$.
otherwise
the reporting interval of the CRI reporting is an integer multiple $M_{CRI}$ of period $N_{pd} \cdot M_{RI}$ (in subframes).
The reporting instances for CRI are subframes satisfying $(10 \times n_f + \lfloor n_s/2 \rfloor - N_{OFFSET,CQI} - N_{OFFSET,RI}) \bmod (N_{pd} \cdot M_{RI} \cdot M_{CRI}) = 0$.

In the case where both wideband CQI/PMI and subband CQI (or subband CQI/second PMI for transmission modes 9 and 10) reporting are configured:

The reporting instances for wideband CQI/PMI and subband CQI (or subband CQI/second PMI for transmission modes 9 and 10) are subframes satisfying $(10 \times n_f + \lfloor n_s/2 \rfloor - N_{OFFSET,CQI}) \bmod N_{pd} = 0$.

When PTI is not transmitted (due to not being configured) or the most recently transmitted PTI is equal to 1 for a UE configured in transmission modes 8 and 9, or for a UE configured in transmission mode 10 without a 'RI-reference CSI process' for a CSI process, or the transmitted PTI is equal to 1 reported in the most recent RI reporting instance for a CSI process when a UE is configured in transmission mode 10 with a 'RI-reference CSI process' for the CSI process, or the transmitted PTI is equal to 1 for a 'RI-reference CSI process' reported in the most recent RI reporting instance for a CSI process when a UE is configured in transmission mode 10 with the 'RI-reference CSI process' for the CSI process, and the most recent type 6 report for the CSI process is dropped:

The wideband CQI/wideband PMI (or wideband CQI/wideband second PMI for transmission modes 8, 9 and 10) report has period $H \cdot N_{pd}$, and is reported on the subframes satisfying $(10 \times n_f + \lfloor n_s/2 \rfloor - N_{OFFSET,CQI}) \bmod (H \cdot N_{pd}) = 0$. The integer H is defined as $H = J \cdot K + 1$, where J is the number of bandwidth parts.

Between every two consecutive wideband CQI/wideband PMI (or wideband CQI/wideband second PMI for transmission modes 8, 9 and 10) reports, the remaining J·K reporting instances are used in sequence for subband CQI (or subband CQI/second PMI for transmission modes 9 and 10) reports on K full cycles of bandwidth parts except when the gap between two consecutive wideband CQI/PMI reports contains less than J·K reporting instances due to a system frame number transition to 0, in which case the UE shall not transmit the remainder of the subband CQI (or subband CQI/second PMI for transmission modes 9 and 10) reports which have not been transmitted before the second of the two wideband CQI/wideband PMI (or wideband CQI/wideband second PMI for transmission modes 8, 9 and 10) reports. Each full cycle of bandwidth parts shall be in increasing order starting from bandwidth part 0 to bandwidth part J-1. The parameter K is configured by higher-layer signalling.

When the most recently transmitted PTI is 0 for a UE configured in transmission modes 8 and 9 or for a UE configured in transmission mode 10 without a 'RI-reference CSI process' for a CSI process, or the transmitted PTI is 0 reported in the most recent RI reporting instance for a CSI process when a UE is configured in transmission mode 10 with a 'RI-reference CSI process' for the CSI process, or the transmitted PTI is 0 for a 'RI-reference CSI process' reported in the most recent RI reporting instance for a CSI process when a UE is configured in transmission mode 10 with the 'RI-reference CSI process' for the CSI process, and the most recent type 6 report for the CSI process is dropped:

The wideband first precoding matrix indicator report has period $H' \cdot N_{pd}$, and is reported on the subframes satisfying $(10 \times n_f + \lfloor n_s/2 \rfloor - N_{OFFSET,CQI}) \bmod (H' \cdot N_{pd}) = 0$, where H' is signalled by higher layers.

Between every two consecutive wideband first precoding matrix indicator reports, the remaining reporting instances are used for a wideband second precoding matrix indicator with wideband CQI as described below In case RI reporting is configured, the reporting interval of RI is $M_{RI}$ times the wideband CQI/PMI period $H \cdot N_{pd}$, and RI is reported on the same PUCCH cyclic shift resource as both the wideband CQI/PMI and subband CQI reports.

The reporting instances for RI are subframes satisfying $(10 \times n_f + \lfloor n_s/2 \rfloor - N_{OFFSET,CQI} - N_{OFFSET,RI}) \bmod (H \cdot N_{pd} \cdot M_{RI}) = 0$ In case CRI reporting is configured,
if the number of antenna ports in each configured CSI-RS resource is one,
the reporting interval of the CRI reporting is $M_{CRI}$ times the wideband CQI/PMI period $H \cdot N_{pd}$, The reporting instances for CRI are subframes satisfying $(10 \times n_f + \lfloor n_s/2 \rfloor - N_{OFFSET,CQI} - N_{OFFSET,CRI}) \bmod(H \cdot N_{pd} \cdot M_{CRI}) = 0$.

otherwise the reporting interval of the CRI reporting is $M_{CRI}$ times the RI period $H \cdot N_{pd} \cdot M_{RI}$ (in subframes).

The reporting instances for CRI are subframes satisfying $(10 \times n_f + \lfloor n_s/2 \rfloor - N_{OFFSET,CQI} - N_{OFFSET,RI}) \bmod(H \cdot N_{pd} \cdot M_{RI} \cdot M_{CRI}) = 0$

< . . . >

Table 7.2.2-1A of 3GPP TS 36.213 v13.1.1, Entitled "Mapping of $I_{CQI/PMI}$ to $N_{pd}$ and $N_{OFFSET,CQI}$ for FDD or for FDD-TDD and Primary Cell Frame Structure Type 1", is Reproduced as FIG. 13

Table 7.2.2-1B of 3GPP TS 36.213 v13.1.1, Entitled "Mapping of $I_{RI}$ to $M_{RI}$ and $N_{OFFSET,RI}$", is Reproduced as FIG. 14

Table 7.2.2-1C of 3GPP TS 36.213 v13.1.1, Entitled "Mapping of $I_{CQI/PMI}$ to $N_{pd}$ and $N_{OFFSET,CQI}$ for TDD or for FDD-TDD and Primary Cell Frame Structure Type 2", is Reproduced as FIG. 15

Table 7.2.2-1D of 3GPP TS 36.213 v13.1.1, Entitled "Mapping of $I_{CRI}$ to $M_{CRI}$ when RI Reporting is Configured", is Reproduced as FIG. 16

Table 7.2.2-1E of 3GPP TS 36.213 v13.1.1, Entitled "Mapping of $I_{CRI}$ to $M_{CRI}$ and $N_{OFFSET,CRI}$ when the Number of Antenna Ports in Each Configured CSI-RS Resource is One", is Reproduced as FIG. 17

For TDD or FDD-TDD and primary cell frame structure type 2 periodic CQI/PMI reporting, the following periodicity values apply for a serving cell c depending on the TDD UL/DL configuration of the primary cell [3], where the UL/DL configuration corresponds to the eimta-HARQ-ReferenceConfig-r12 for the primary cell if the UE is configured with the parameter EIMTA-MainConfigServCell-r12 for the primary cell:

The reporting period of $N_{pd}=1$ is applicable for the serving cell c only if TDD UL/DL configuration of the primary cell belongs to {0, 1, 3, 4, 6}, and where all UL subframes of the primary cell in a radio frame are used for CQI/PMI reporting.

The reporting period of $N_{pd}=5$ is applicable for the serving cell c only if TDD UL/DL configuration of the primary cell belongs to {0, 1, 2, 6}.

The reporting periods of $N_{pd}=\{10,20,40,80,160\}$ are applicable for the serving cell c for any TDD UL/DL configuration of the primary cell.

< . . . >

An CRI or RI or PTI or any precoding matrix indicator reported for a serving cell in a periodic reporting mode is valid only for CSI reports for that serving cell on that periodic CSI reporting mode.

For serving cell c, a UE configured in transmission mode 10 with PMI/RI reporting or without PMI reporting for a CSI process can be configured with a 'RI-reference CSI process'. The RI for the 'RI-reference CSI process' is not based on any other configured CSI process other than the 'RI-reference CSI process'. If the UE is configured with a 'RI-reference CSI process' for a CSI process and if subframe sets $c_{CSI,0}$ and $c_{CSI,1}$ are configured by higher layers for only one of the CSI processes then the UE is not expected to receive configuration for the CSI process configured with the subframe subsets that have a different set of restricted RIs with precoder codebook subset restriction between the two subframe sets. The UE is not expected to receive configurations for the CSI process and the 'RI-reference CSI process' that have a different:

periodic CSI reporting mode (including sub-mode if configured), and/or number of CSI-RS antenna ports, and/or set of restricted RIs with precoder codebook subset restriction if subframe sets $c_{CSI,0}$ and $c_{CSI,1}$ are not configured by higher layers for both CSI processes, and/or set of restricted RIs with precoder codebook subset restriction for each subframe set if subframe sets $c_{CSI,0}$ and $c_{CSI,1}$ are configured by higher layers for both CSI processes, and/or set of restricted RIs with precoder codebook subset restriction if subframe sets $c_{CSI,0}$ and $c_{CSI,1}$ are configured by higher layers for only one of the CSI processes, and the set of restricted RIs for the two subframe sets are the same, and/or number of CSI-RS antenna ports for any two CSI-RS resources for the two CSI processes, if a UE is configured with higher layer parameter eMIMO-Type, and eMIMO-Type is set to 'CLASS B', and the number of configured CSI-RS resources is more than one for at least one of the two CSI processes, and/or set of restricted RIs with precoder codebook subset restriction for any two CSI-RS resources for the two CSI processes, if a UE is configured with higher layer parameter eMIMO-Type, and eMIMO-Type is set to 'CLASS B', and the number of configured CSI-RS resources is more than one for at least one of the two CSI processes and if subframe sets $c_{CSI,0}$ and $c_{CSI,1}$ are not configured by higher layers for both CSI processes, and/or set of restricted RIs with precoder codebook subset restriction for each subframe set and for any two CSI-RS resources for the two CSI processes, if a UE is configured with higher layer parameter eMIMO-Type, and eMIMO-Type is set to 'CLASS B', and the number of configured CSI-RS resources is more than one for at least one of the two CSI processes and if subframe sets $c_{CSI,0}$ and $c_{CSI,1}$ are configured by higher layers for both CSI processes, and/or set of restricted RIs with precoder codebook subset restriction for any two CSI-RS resources for the two CSI processes, if a UE is configured with higher layer parameter eMIMO-Type, and eMIMO-Type is set to 'CLASS B', and the number of configured CSI-RS resources is more than one for at least one of the two CSI processes and if subframe sets $c_{CSI,0}$ and $c_{CSI,1}$ are configured by higher layers for only one of the CSI processes, and the set of restricted RIs for the two subframe sets are the same.

If a UE is configured for CRI reporting,

For the calculation of CQI/PMI/RI conditioned on the last reported CRI, in the absence of a last reported CRI the UE shall conduct the CQI/PMI/RI calculation conditioned on the lowest possible CRI. If reporting for more than one CSI subframe set is configured, CQI/PMI/RI is conditioned on the last reported CRI linked to the same subframe set as the CSI report.

For the calculation of CQI/PMI conditioned on the last reported RI and CRI, in the absence of a last reported RI and CRI, the UE shall conduct the CQI/PMI calculation conditioned on the lowest possible RI associated with the lowest possible CRI and as given by the bitmap parameter codebookSubsetRestriction and the parameter alternativeCodeBookEnabledFor4TX-r12 if configured. If reporting for more than one CSI subframe set is configured, CQI/PMI is conditioned on the last reported RI associated with the last reported CRI and linked to the same subframe set as the CSI report otherwise, For the calculation of CQI/PMI conditioned on the last reported RI, in the absence of a last reported RI the UE shall conduct the CQI/PMI calculation conditioned on the lowest possible RI as given by the bitmap parameter codebookSubsetRestriction and the parameter alternativeCodeBookEnabledFor4TX-r12 if configured. If reporting for more than one CSI subframe set is configured, CQI/PMI is conditioned on the last reported RI linked to the same subframe set as the CSI report.

For a non-BL/CE UE, the periodic CSI reporting modes are described as following:

< . . . >

Mode 2-1 description:
In the subframe where RI is reported for transmission mode 4, transmission mode 8 except with alternativeCodeBookEnabledFor4TX-r12=TRUE configured, transmission modes 9 and 10 with 2 CSI-RS ports, and transmission modes 9 and 10 with 4 CSI-RS ports except with alternativeCodeBookEnabledFor4TX-r12=TRUE configured, and for transmission modes 9 and 10 with higher layer parameter eMIMO-Type configured, eMIMO-Type set to 'CLASS B', one CSI-RS resource configured, with higher layer parameter alternativeCodebookEnabledCLASSB_K1=TRUE:
If a UE is configured with CRI reporting,
If a UE is configured in transmission mode 10 with a 'RI-reference CSI process' for a CSI process, the RI for the CSI process shall be the same as the RI in the most recent CSI report comprising RI for the configured 'RI-reference CSI process' irrespective of subframe sets if configured; otherwise, the UE shall determine a RI assuming transmission on set S subbands conditioned on the last reported periodic CRI.
otherwise,
If a UE is configured in transmission mode 10 with a 'RI-reference CSI process' for a CSI process, the RI for the CSI process shall be the same as the RI in the most recent CSI report comprising RI for the configured 'RI-reference CSI process' irrespective of subframe sets if configured; otherwise, the UE shall determine a RI assuming transmission on set S subbands.
The UE shall report a type 3 report consisting of one RI.
In the subframe where RI and PTI are reported, for transmission modes 9 and 10 with 8 CSI-RS ports configured and higher layer parameter eMIMO-Type not configured, or for transmission modes 9 and 10 with 8 CSI-RS ports or 4 CSI-RS ports with alternativeCodeBookEnabledFor4TX-r12=TRUE in the selected CSI-RS resource and UE is configured with CRI reporting, or for transmission modes 9 and 10 with 8 CSI-RS ports configured and UE is configured with higher layer parameter eMIMO-Type, and eMIMO-Type is set to 'CLASS B', and one CSI-RS resource configured, and except with higher layer parameter alternativeCodebookEnabledCLASSB_K1=TRUE configured, or for transmission modes 9 and 10 with higher layer parameter eMIMO-Type configured, and eMIMO-Type set to 'CLASS A', or for transmission modes 8, 9 and 10 with alternativeCodeBookEnabledFor4TX-r12=TRUE configured without CRI reporting then:
If a UE is configured with CRI reporting,
If a UE is configured in transmission mode 10 with a 'RI-reference CSI process' for a CSI process, the RI for the CSI process shall be the same as the RI in the most recent CSI report comprising RI for the configured 'RI-reference CSI process' irrespective of subframe sets if configured; otherwise, the UE shall determine a RI assuming transmission on set S subbands conditioned on the last reported periodic CRI.
If a UE is configured in transmission mode 10 with a 'RI-reference CSI process' for a CSI process, the PTI for the CSI process shall be the same as the PTI in the most recent type 6 report for the configured 'RI-reference CSI process'; otherwise, the UE shall determine a precoder type indication (PTI) conditioned on the last reported periodic CRI.
otherwise,
If a UE is configured in transmission mode 10 with a 'RI-reference CSI process' for a CSI process, the RI for the CSI process shall be the same as the RI in the most recent CSI report comprising RI for the configured 'RI-reference CSI process' irrespective of subframe sets if configured; otherwise, the UE shall determine a RI assuming transmission on set S subbands.
If a UE is configured in transmission mode 10 with a 'RI-reference CSI process' for a CSI process, the PTI for the CSI process shall be the same as the PTI in the most recent type 6 report for the configured 'RI-reference CSI process'; otherwise, the UE shall determine a precoder type indication (PTI).
The PTI for the CSI process shall be equal to 1 if the RI reported jointly with the PTI is greater than 2 for transmission modes 8, 9, 10 with alternativeCodeBookEnabledFor4TX-r12=TRUE configured.
The UE shall report a type 6 report consisting of one RI and the PTI.
In the subframe where RI and CRI is reported for transmission modes 9 and 10 with parameter eMIMO-Type configured by higher layers, and eMIMO-Type is set to 'CLASS B', and the number of configured CSI-RS resources is more than one:
A UE shall determine a CRI assuming transmission on set S subbands.
If a UE is configured in transmission mode 10 with a 'RI-reference CSI process' for a CSI process, the RI for the CSI process shall be the same as the RI in the most recent CSI report comprising RI for the configured 'RI-reference CSI process' irrespective of subframe sets if configured; otherwise, the UE shall determine a RI assuming transmission on set S subbands conditioned on the reported CRI for the CSI process.

If each of the maximum number of ports in the configured CSI-RS resources is 2, or 4 except with alternativeCodeBookEnabledFor4TX-r12=TRUE configured, The UE shall report a type 7 report consisting of one RI and one CRI.

otherwise,

If a UE is configured in transmission mode 10 with a 'RI-reference CSI process' for a CSI process, the PTI for the CSI process shall be the same as the PTI in the most recent type 6 report for the configured 'RI-reference CSI process'; otherwise, the UE shall determine a precoder type indication (PTI) conditioned on the reported CRI for the CSI process.

If the configured CSI-RS resource corresponding to the determined CRI comprises 2 CSI-RS ports or 4 CSI-RS ports except with alternativeCodeBookEnabledFor4TX-r12=TRUE configured, PTI is fixed to zero.

The PTI for the CSI process shall be equal to 1 if the RI reported jointly with the PTI is greater than 2 for transmission modes 9, 10 with alternativeCodeBookEnabledFor4TX-r12=TRUE configured.

The UE shall report a type 9 report consisting of one CRI, RI, and the PTI.

In the subframe where wideband CQI/PMI is reported for all transmission modes except with UE is configured with higher layer parameter eMIMO-Type, and eMIMO-Type is set to 'CLASS A', or 8 CSI-RS ports configured for transmission modes 9 and 10, or with alternativeCodeBookEnabledFor4TX-r12=TRUE configured for transmission modes 8, 9 and 10, if the UE is not configured with higher layer parameter eMIMO-Type, or UE is configured with CRI reporting, or UE is configured with higher layer parameter eMIMO-Type, and eMIMO-Type is set to 'CLASS B', and one CSI-RS resource configured, and except with higher layer parameter alternativeCodebookEnabledCLASSB_K1=TRUE configured:

A single precoding matrix is selected from the codebook subset assuming transmission on set S subbands.

A UE shall report a type 2 report on each respective successive reporting opportunity consisting of:
A wideband CQI value which is calculated assuming the use of a single precoding matrix in all subbands and transmission on set S subbands.
The selected single PMI (wideband PMI).
When RI>1, an additional 3-bit wideband spatial differential CQI, which is shown in Table 7.2-2.

If the UE is configured with CRI reporting,
If a UE is configured in transmission mode 10 with a 'RI-reference CSI process' for a CSI process, and the most recent type 3 report for the CSI process is dropped, and a type 3 report for the 'RI-reference CSI process' is reported in the most recent RI reporting instance for the CSI process, the PMI and CQI values for the CSI process are calculated conditioned on the reported periodic RI for the configured 'RI-reference CSI process' in the most recent RI reporting instance for the CSI process and the last reported periodic CRI for the CSI process; otherwise the PMI and CQI values are calculated conditioned on the last reported periodic RI and the last reported periodic CRI.

otherwise,
For transmission modes 4, 8, 9 and 10,
If a UE is configured in transmission mode 10 with a 'RI-reference CSI process' for a CSI process, and the most recent type 3 report for the CSI process is dropped, and a type 3 report for the 'RI-reference CSI process' is reported in the most recent RI reporting instance for the CSI process, the PMI and CQI values for the CSI process are calculated conditioned on the reported periodic RI for the configured 'RI-reference CSI process' in the most recent RI reporting instance for the CSI process; otherwise the PMI and CQI values are calculated conditioned on the last reported periodic RI.

For other transmission modes the PMI and CQI values are calculated conditioned on transmission rank 1.

In the subframe where the wideband first PMI is reported for transmission modes 9 and 10 with 8 CSI-RS ports configured and higher layer parameter eMIMO-Type not configured, or for transmission modes 9 and 10 with 8 CSI-RS ports or 4 CSI-RS ports with alternativeCodeBookEnabledFor4TX-r12=TRUE in the selected CSI-RS resource and UE is configured with CRI reporting, or for transmission modes 9 and 10 with 8 CSI-RS ports configured and UE is configured with higher layer parameter eMIMO-Type, and eMIMO-Type is set to 'CLASS B', and one CSI-RS resource configured, and except with higher layer parameter alternativeCodebookEnabledCLASSB_K1=TRUE configured, or for transmission modes 9 and 10 with higher layer parameter eMIMO-Type configured, and eMIMO-Type set to 'CLASS A', or for transmission modes 8, 9 and 10 with alternativeCodeBookEnabledFor4TX-r12=TRUE configured without CRI reporting:

A set of precoding matrices corresponding to the wideband first PMI is selected from the codebook subset assuming transmission on set S subbands.

A UE shall report a type 2a report on each respective successive reporting opportunity consisting of the wideband first PMI corresponding to the selected set of precoding matrices.

If the UE is configured with CRI reporting,
If a UE is configured in transmission mode 10 with a 'RI-reference CSI process' for a CSI process, and the most recent type 6 report for the CSI process is dropped, and a type 6 report for the 'RI-reference CSI process' with PTI=0 is reported in the most recent RI reporting instance for the CSI process, the wideband first PMI value for the CSI process is calculated conditioned on the reported periodic RI for the configured 'RI-reference CSI process' in the most recent RI reporting instance for the CSI process and the last reported periodic CRI for the CSI process; otherwise with the last reported PTI=0, the wideband first PMI value is calculated conditioned on the last reported periodic RI and the last reported periodic CRI.

otherwise,
If a UE is configured in transmission mode 10 with a 'RI-reference CSI process' for a CSI process, and the most recent type 6 report for the CSI process is dropped, and a type 6 report for the 'RI-reference CSI process' with PTI=0 is reported in the most recent RI reporting instance for the CSI process, the wideband first PMI value for the CSI process is calculated conditioned on the reported periodic RI for the configured 'RI-reference CSI process' in the most recent RI reporting instance for the CSI process; otherwise with the last reported PTI=0, the wideband first PMI value is calculated conditioned on the last reported periodic RI.

In the subframe where wideband CQI/second PMI is reported, for transmission modes 9 and 10 with 8 CSI-RS ports configured and higher layer parameter eMIMO-Type not configured, or for transmission modes 9 and 10 with 8 CSI-RS ports or 4 CSI-RS ports with alternativeCodeBookEnabledFor4TX-r12=TRUE in the selected CSI-RS resource and UE is configured with CRI reporting, or for transmission modes 9 and 10 with 8 CSI-RS ports configured and UE is configured with higher layer parameter eMIMO-Type, and eMIMO-Type is set to 'CLASS B', and one CSI-RS resource configured, and except with higher layer parameter alternativeCodebookEnabledCLASSB_K1=TRUE configured, or for transmission modes 9 and 10 with higher layer parameter eMIMO-Type configured, and eMIMO-Type set to 'CLASS A', or for transmission modes 8,9, and 10 with alternativeCodeBookEnabledFor4TX-r12=TRUE configured without CRI reporting:

A single precoding matrix is selected from the codebook subset assuming transmission on set S subbands.

A UE shall report a type 2b report on each respective successive reporting opportunity consisting of:
A wideband CQI value which is calculated assuming the use of the selected single precoding matrix in all subbands and transmission on set S subbands.
The wideband second PMI corresponding to the selected single precoding matrix.
When RI>1, an additional 3-bit wideband spatial differential CQI, which is shown in Table 7.2-2.

If the UE is configured with CRI reporting,
If a UE is configured in transmission mode 10 with a 'RI-reference CSI process' for a CSI process, and the most recent type 6 report for the CSI process is dropped, and a type 6 report for the 'RI-reference CSI process' with PTI=1 is reported in the most recent RI reporting instance for the CSI process,
The wideband second PMI value for the CSI process is calculated conditioned on the reported periodic RI for the configured 'RI-reference CSI process' in the most recent RI reporting instance for the CSI process and the last reported wideband first PMI for the CSI process and the last reported periodic CRI for the CSI process,
The wideband CQI value is calculated conditioned on the selected precoding matrix for the CSI process and the reported periodic RI for the configured 'RI-reference CSI process' in the most recent RI reporting instance for the CSI process and the last reported periodic CRI for the CSI process.

Otherwise, with the last reported PTI=1,
The wideband second PMI value is calculated conditioned on the last reported periodic RI and the wideband first PMI and the last reported periodic CRI.
The wideband CQI value is calculated conditioned on the selected precoding matrix and the last reported periodic RI and the last reported periodic CRI.

otherwise,
If a UE is configured in transmission mode 10 with a 'RI-reference CSI process' for a CSI process, and the most recent type 6 report for the CSI process is dropped, and a type 6 report for the 'RI-reference CSI process' with PTI=1 is reported in the most recent RI reporting instance for the CSI process,
The wideband second PMI value for the CSI process is calculated conditioned on the reported periodic RI for the configured 'RI-reference CSI process' in the most recent RI reporting instance for the CSI process and the last reported wideband first PMI for the CSI process,
The wideband CQI value is calculated conditioned on the selected precoding matrix for the CSI process and the reported periodic RI for the configured 'RI-reference CSI process' in the most recent RI reporting instance for the CSI process.

Otherwise, with the last reported PTI=1,
The wideband second PMI value is calculated conditioned on the last reported periodic RI and the wideband first PMI.
The wideband CQI value is calculated conditioned on the selected precoding matrix and the last reported periodic RI.

If the last reported first PMI was computed under an RI assumption that differs from the last reported periodic RI, or in the absence of a last reported first PMI, the conditioning of the second PMI value is not specified.

In the subframe where CQI for the selected subband is reported for all transmission modes except with
UE is configured with higher layer parameter eMIMO-Type, and eMIMO-Type is set to 'CLASS A', or
8 CSI-RS ports configured for transmission modes 9 and 10, or with alternativeCodeBookEnabledFor4TX-r12=TRUE configured for transmission modes 8, 9 and 10, if the UE is not configured with higher layer parameter eMIMO-Type, or UE is configured with CRI reporting, or UE is configured with higher layer parameter eMIMO-Type, and eMIMO-Type is set to 'CLASS B', and one CSI-RS resource configured, and except with higher layer parameter alternativeCodebookEnabledCLASSB_K1=TRUE configured:
The UE shall select the preferred subband within the set of $N_j$ subbands in each of the J bandwidth parts where J is given in Table 7.2.2-2.

The UE shall report a type 1 report per bandwidth part on each respective successive reporting opportunity consisting of:
  CQI value for codeword 0 reflecting transmission only over the selected subband of a bandwidth part determined in the previous step along with the corresponding preferred subband L-bit label.
  When RI>1, an additional 3-bit subband spatial differential CQI value for codeword 1 offset level
    Codeword 1 offset level=subband CQI index for codeword 0−subband CQI index for codeword 1.
    Assuming the use of the most recently reported single precoding matrix in all subbands and transmission on the selected subband within the applicable bandwidth part.
    The mapping from the 3-bit subband spatial differential CQI value to the offset level is shown in Table 7.2-2.
If the UE is configured with CRI reporting,
  If a UE is configured in transmission mode 10 with a 'RI-reference CSI process' for a CSI process, and the most recent type 3 report for the CSI process is dropped, and a type 3 report for the 'RI-reference CSI process' is reported in the most recent RI reporting instance for the CSI process, the subband selection and CQI values for the CSI process are calculated conditioned on the last reported periodic wideband PMI for the CSI process and the reported periodic RI for the configured 'RI-reference CSI process' in the most recent RI reporting instance for the CSI process and the last reported periodic CRI for the CSI process; otherwise the subband selection and CQI values are calculated conditioned on the last reported periodic wideband PMI, RI and CRI.
otherwise,
  For transmission modes 4, 8, 9 and 10,
    If a UE is configured in transmission mode 10 with a 'RI-reference CSI process' for a CSI process, and the most recent type 3 report for the CSI process is dropped, and a type 3 report for the 'RI-reference CSI process' is reported in the most recent RI reporting instance for the CSI process, the subband selection and CQI values for the CSI process are calculated conditioned on the last reported periodic wideband PMI for the CSI process and the reported periodic RI for the configured 'RI-reference CSI process' in the most recent RI reporting instance for the CSI process; otherwise the subband selection and CQI values are calculated conditioned on the last reported periodic wideband PMI and RI.
  For other transmission modes the subband selection and CQI values are calculated conditioned on the last reported PMI and transmission rank 1.
In the subframe where wideband CQI/second PMI is reported, for transmission modes 9 and 10 with 8 CSI-RS ports configured and higher layer parameter eMIMO-Type not configured, or for transmission modes 9 and 10 with 8 CSI-RS ports configured and UE is configured with CRI reporting, or for transmission modes 9 and 10 with 8 CSI-RS ports or 4 CSI-RS ports with alternativeCodeBookEnabledFor4TX-r12=TRUE in the selected CSI-RS resource and UE is configured with higher layer parameter eMIMO-Type, and eMIMO-Type is set to 'CLASS B', and one CSI-RS resource configured, and except with higher layer parameter alternativeCodebookEnabledCLASSB_K1=TRUE configured, or for transmission modes 9 and 10 with higher layer parameter eMIMO-Type configured, and eMIMO-Type set to 'CLASS A', or for transmission modes 8, 9 and 10 with alternativeCodeBookEnabledFor4TX-r12=TRUE configured without CRI reporting:
  A single precoding matrix is selected from the codebook subset assuming transmission on set S subbands.
The UE shall report a type 2b report on each respective successive reporting opportunity consisting of:
  A wideband CQI value which is calculated assuming the use of the selected single precoding matrix in all subbands and transmission on set S subbands.
  The wideband second PMI corresponding to the selected single precoding matrix.
  When RI>1, an additional 3-bit wideband spatial differential CQI, which is shown in Table 7.2-2.
If the UE is configured with CRI reporting,
  If a UE is configured in transmission mode 10 with a 'RI-reference CSI process' for a CSI process, and the most recent type 6 report for the CSI process is dropped, and a type 6 report for the 'RI-reference CSI process' with PTI=0 is reported in the most recent RI reporting instance for the CSI process,
    The wideband second PMI value for the CSI process is calculated conditioned on the reported periodic RI for the configured 'RI-reference CSI process' in the most recent RI reporting instance for the CSI process and the last reported wideband first PMI for the CSI process and the last reported periodic CRI for the CSI process.
    The wideband CQI value is calculated conditioned on the selected precoding matrix for the CSI process and the reported periodic RI for the configured 'RI-reference CSI process' in the most recent RI reporting instance for the CSI process and the last reported periodic CRI for the CSI process.
  otherwise, with the last reported PTI=0,
    The wideband second PMI value is calculated conditioned on the last reported periodic RI and the wideband first PMI and the last reported periodic CRI.
    The wideband CQI value is calculated conditioned on the selected precoding matrix and the last reported periodic RI process and the last reported periodic CRI.
otherwise,
  If a UE is configured in transmission mode 10 with a 'RI-reference CSI process' for a CSI process, and the most recent type 6 report for the CSI process is dropped, and a type 6 report for the 'RI-reference CSI process' with PTI=0 is reported in the most recent RI reporting instance for the CSI process,
    The wideband second PMI value for the CSI process is calculated conditioned on the reported periodic RI for the configured 'RI-reference CSI process' in the most recent RI reporting instance for the CSI process and the last reported wideband first PMI for the CSI process.

The wideband CQI value is calculated conditioned on the selected precoding matrix for the CSI process and the reported periodic RI for the configured 'RI-reference CSI process' in the most recent RI reporting instance for the CSI process.

Otherwise, with the last reported PTI=0,

The wideband second PMI value is calculated conditioned on the last reported periodic RI and the wideband first PMI.

The wideband CQI value is calculated conditioned on the selected precoding matrix and the last reported periodic RI.

If the last reported first PMI was computed under an RI assumption that differs from the last reported periodic RI, or in the absence of a last reported first PMI, the conditioning of the second PMI value is not specified.

In the subframe where subband CQI/second PMI for the selected subband is reported, for transmission modes 9 and 10 with 8 CSI-RS ports or 4 CSI-RS ports with alternativeCodeBookEnabledFor4TX-r12=TRUE in the selected CSI-RS resource and higher layer parameter eMIMO-Type not configured, or for transmission modes 9 and 10 with 8 CSI-RS ports configured and UE is configured with CRI reporting, or for transmission modes 9 and 10 with 8 CSI-RS ports configured and UE is configured with higher layer parameter eMIMO-Type, and eMIMO-Type is set to 'CLASS B', and one CSI-RS resource configured, and except with higher layer parameter alternativeCodebookEnabledCLASSB_K1=TRUE configured, or for transmission modes 9 and 10 with higher layer parameter eMIMO-Type configured, and eMIMO-Type set to 'CLASS A', or for transmission modes 8, 9 and 10 with alternativeCodeBookEnabledFor4TX-r12=TRUE configured without CRI reporting:

The UE shall select the preferred subband within the set of $N_j$ subbands in each of the J bandwidth parts where J is given in Table 7.2.2-2.

The UE shall report a type 1a report per bandwidth part on each respective successive reporting opportunity consisting of:

CQI value for codeword 0 reflecting transmission only over the selected subband of a bandwidth part determined in the previous step along with the corresponding preferred subband L-bit label.

When RI>1, an additional 3-bit subband spatial differential CQI value for codeword 1 offset level
Codeword 1 offset level=subband CQI index for codeword 0–subband CQI index for codeword 1.

Assuming the use of the precoding matrix corresponding to the selected second PMI and the most recently reported first PMI and transmission on the selected subband within the applicable bandwidth part.

The mapping from the 3-bit subband spatial differential CQI value to the offset level is shown in Table 7.2-2.

A second PMI of the preferred precoding matrix selected from the codebook subset assuming transmission only over the selected subband within the applicable bandwidth part determined in the previous step.

If the UE is configured with CRI reporting,

If a UE is configured in transmission mode 10 with a 'RI-reference CSI process' for a CSI process, and the most recent type 6 report for the CSI process is dropped, and a type 6 report for the 'RI-reference CSI process' with PTI=1 is reported in the most recent RI reporting instance for the CSI process, The subband second PMI values for the CSI process are calculated conditioned on the reported periodic RI for the configured 'RI-reference CSI process' in the most recent RI reporting instance for the CSI process and the last reported wideband first PMI for the CSI process and the last reported periodic CRI for the CSI process.

The subband selection and CQI values are calculated conditioned on the selected precoding matrix for the CSI process and the reported periodic RI for the configured 'RI-reference CSI process' in the most recent RI reporting instance for the CSI process and the last reported periodic CRI for the CSI process.

Otherwise, with the last reported PTI=1

The subband second PMI values are calculated conditioned on the last reported periodic RI and the wideband first PMI and the last reported periodic CRI.

The subband selection and CQI values are calculated conditioned on the selected precoding matrix and the last reported periodic RI and the last reported periodic CRI.

otherwise,

If a UE is configured in transmission mode 10 with a 'RI-reference CSI process' for a CSI process, and the most recent type 6 report for the CSI process is dropped, and a type 6 report for the 'RI-reference CSI process' with PTI=1 is reported in the most recent RI reporting instance for the CSI process, The subband second PMI values for the CSI process are calculated conditioned on the reported periodic RI for the configured 'RI-reference CSI process' in the most recent RI reporting instance for the CSI process and the last reported wideband first PMI for the CSI process.

The subband selection and CQI values are calculated conditioned on the selected precoding matrix for the CSI process and the reported periodic RI for the configured 'RI-reference CSI process' in the most recent RI reporting instance for the CSI process.

Otherwise, with the last reported PTI=1

The subband second PMI values are calculated conditioned on the last reported periodic RI and the wideband first PMI.

The subband selection and CQI values are calculated conditioned on the selected precoding matrix and the last reported periodic RI.

If the last reported first PMI was computed under an RI assumption that differs from the last reported periodic RI, or in the absence of a last reported first PMI, the conditioning of the second PMI value is not specified.

Table 7.2.2-2 of 3GPP 36.213 v13.1.1, Entitled "Subband Size (k) and Bandwidth Parts (J) Vs. Downlink System Bandwidth", is Reproduced as FIG. 18

< . . . >

Table 7.2.2-3 of 3GPP 36.213 v13.1.1, Entitled "PUCCH Reporting Type Payload Size Per PUCCH Reporting Mode and Mode State", is Reproduced as FIGS. 19A-19D 7.2.3 Channel Quality Indicator (CQI) Definition The CQI indices and their interpretations are given in Table 7.2.3-1 for reporting CQI based on QPSK, 16QAM and 64QAM. The CQI indices and their interpretations are given in Table 7.2.3-2 for reporting CQI based on QPSK, 16QAM, 64QAM and 256QAM. The CQI indices and their interpretations are given in Table 7.2.3-3 for reporting CQI based on QPSK and 16QAM.

For a non-BL/CE UE, based on an unrestricted observation interval in time unless specified otherwise in this subclause, and an unrestricted observation interval in frequency, the UE shall derive for each CQI value reported in uplink subframe n the highest CQI index between 1 and 15 in Table 7.2.3-1 or Table 7.2.3-2 which satisfies the following condition, or CQI index 0 if CQI index 1 does not satisfy the condition:

A single PDSCH transport block with a combination of modulation scheme and transport block size corresponding to the CQI index, and occupying a group of downlink physical resource blocks termed the CSI reference resource, could be received with a transport block error probability not exceeding 0.1.

For a BL/CE UE, based on an unrestricted observation interval in time and frequency, the UE shall derive for each CQI value the highest CQI index between 1 and 10 in Table 7.2.3-3 which satisfies the following condition, or CQI index 0 if CQI index 1 does not satisfy the condition:

A single PDSCH transport block with a combination of modulation scheme and transport block size corresponding to the CQI index, and occupying a group of downlink physical resource blocks termed the CSI reference resource, could be received with a transport block error probability not exceeding 0.1.

If CSI subframe sets $c_{CSI,0}$ and $c_{CSI,1}$ are configured by higher layers, each CSI reference resource belongs to either $c_{CSI,0}$ or $c_{CSI,1}$ but not to both. When CSI subframe sets $c_{CSI,0}$ and $c_{CSI,1}$ are configured by higher layers a UE is not expected to receive a trigger for which the CSI reference resource is in subframe that does not belong to either subframe set. For a UE in transmission mode 10 and periodic CSI reporting, the CSI subframe set for the CSI reference resource is configured by higher layers for each CSI process.

For a UE in transmission mode 9 when parameter pmi-RI-Report is configured by higher layers and parameter eMIMO-Type is not configured by higher layers, the UE shall derive the channel measurements for computing the CQI value reported in uplink subframe n based on only the Channel-State Information (CSI) reference signals (CSI-RS) defined in [3] for which the UE is configured to assume non-zero power for the CSI-RS. For a non-BL/CE UE in transmission mode 9 when the parameter pmi-RI-Report is not configured by higher layers or in transmission modes 1-8 the UE shall derive the channel measurements for computing CQI based on CRS. For a BL/CE UE the UE shall derive the channel measurements for computing CQI based on CRS.

For a UE in transmission mode 10, when parameter eMIMO-Type is not configured by higher layers, the UE shall derive the channel measurements for computing the CQI value reported in uplink subframe n and corresponding to a CSI process, based on only the non-zero power CSI-RS (defined in [3]) within a configured CSI-RS resource associated with the CSI process.

For a UE in transmission mode 9 and the UE configured with parameter eMIMO-Type by higher layers, the term 'CSI process' in this clause refers to the CSI configured for the UE.

For a UE in transmission mode 9 or 10 and for a CSI process, if the UE is configured with parameter eMIMO-Type by higher layers, and eMIMO-Type is set to 'CLASS A', and one CSI-RS resource configured, or the UE is configured with parameter eMIMO-Type by higher layers, and eMIMO-Type is set to 'CLASS B', and parameter channelMeasRestriction is not configured by higher layers, the UE shall derive the channel measurements for computing the CQI value reported in uplink subframe n and corresponding to the CSI process, based on only the non-zero power CSI-RS (defined in [3]) within a configured CSI-RS resource associated with the CSI process. If the UE is configured with parameter CSI-Reporting-Type by higher layers, and CSI-Reporting-Type is set to 'CLASS B' and the number of configured CSI-RS resources is K>1, and parameter channelMeasRestriction is not configured by higher layers, the UE shall derive the channel measurements for computing the CQI value using only the configured CSI-RS resource indicated by the CRI.

For a UE in transmission mode 9 or 10 and for a CSI process, if the UE is configured with parameter eMIMO-Type by higher layers, and eMIMO-Type is set to 'CLASS B', and parameter channelMeasRestriction is configured by higher layers, the UE shall derive the channel measurements for computing the CQI value reported in uplink subframe n and corresponding to the CSI process, based on only the most recent, no later than the CSI reference resource, non-zero power CSI-RS (defined in [3]) within a configured CSI-RS resource associated with the CSI process. If the UE is configured with parameter CSI-Reporting-Type by higher layers, and CSI-Reporting-Type is set to 'CLASS B' and the number of configured CSI-RS resources is K>1, and parameter channelMeasRestriction is configured by higher layers, the UE shall derive the channel measurements for computing the CQI value using only the most recent, no later than the CSI reference resource, non-zero power CSI-RS within the configured CSI-RS resource indicated by the CRI.

For a UE in transmission mode 10, when parameter eMIMO-Type is not configured by higher layers, the UE shall derive the interference measurements for computing the CQI value reported in uplink subframe n and corresponding to a CSI process, based on only the configured CSI-IM resource associated with the CSI process.

For a UE in transmission mode 10 and for a CSI process, when parameters eMIMO-Type and interferenceMeasRestriction is configured by higher layers, the UE shall derive the interference measurements for computing the CQI value reported in uplink subframe n and corresponding to the CSI process, based on only the most recent, no later than the CSI reference resource, configured CSI-IM resource associated with the CSI process. If the UE is configured with parameter CSI-Reporting-Type by higher layers, and CSI-Reporting-Type is set to 'CLASS B' and the number of configured CSI-RS resources is K>1, and interferenceMeasRestriction is configured, the UE shall derive interference measurement for computing the CQI value based on only the most recent, no later than the CSI reference resource, the configured CSI-IM resource associated with the CSI-RS resource indicated by the CRI. If interferenceMeasRestriction is not configured, the UE shall derive the interference measurement for computing the CQI value based on the CSI-IM associated with the CSI-RS resource indicated by the CRI.

If the UE in transmission mode 10 is configured by higher layers for CSI subframe sets $c_{CSI,0}$ and $c_{CSI,1}$ for the CSI process, the configured CSI-IM resource within the subframe subset belonging to the CSI reference resource is used to derive the interference measurement.

For a UE configured with the parameter EIMTA-MainConfigServCell-r12 for a serving cell, configured CSI-IM resource(s) within only downlink subframe(s) of a radio frame that are indicated by UL/DL configuration of the serving cell can be used to derive the interference measurement for the serving cell.

For a LAA Scell,
  for channel measurements, if the UE averages CRS/CSI-RS measurements from multiple subframes
    the UE should not average CSI-RS measurement in subframe n1 with CSI-RS measurement in a later subframe n2, if any OFDM symbol of subframe n1 or any subframe from subframe n1+1 to subframe n2, is not occupied.
    the UE should not average CRS measurement in subframe n1 with CRS measurement in a later subframe n2, if any OFDM symbol of the second slot of subframe n1 or any OFDM symbol of any subframe from subframe n1+1 to subframe n2-1, or any of the first 3 OFDM symbols in subframe n2, is not occupied.
  for interference measurements, the UE shall derive the interference measurements for computing the CQI value based on only measurements in subframes with occupied OFDM symbols.

A combination of modulation scheme and transport block size corresponds to a CQI index if:
  the combination could be signalled for transmission on the PDSCH in the CSI reference resource according to the relevant Transport Block Size table, and
  the modulation scheme is indicated by the CQI index, and
  the combination of transport block size and modulation scheme when applied to the reference resource results in the effective channel code rate which is the closest possible to the code rate indicated by the CQI index. If more than one combination of transport block size and modulation scheme results in an effective channel code rate equally close to the code rate indicated by the CQI index, only the combination with the smallest of such transport block sizes is relevant.

The CSI reference resource for a serving cell is defined as follows:
  For a non-BL/CE UE, in the frequency domain, the CSI reference resource is defined by the group of downlink physical resource blocks corresponding to the band to which the derived CQI value relates. For a BL/CE UE, in the frequency domain, the CSI reference resource includes all downlink physical resource blocks for any of the narrowband to which the derived CQI value relates.

In the time domain and for a non-BL/CE UE,
  for a UE configured in transmission mode 1-9 or transmission mode 10 with a single configured CSI process for the serving cell, the CSI reference resource is defined by a single downlink or special subframe $n-n_{CQI\_ref}$,
    where for periodic CSI reporting $n_{CQI\_ref}$ is the smallest value greater than or equal to 4, such that it corresponds to a valid downlink or valid special subframe,
    where for aperiodic CSI reporting, if the UE is not configured with the higher layer parameter csi-SubframePatternConfig-r12.
      $n_{CQI\_ref}$ is such that the reference resource is in the same valid downlink or valid special subframe as the corresponding CSI request in an uplink DCI format.
      $n_{CQI\_ref}$ is equal to 4 and subframe $n-n_{CQI\_ref}$ corresponds to a valid downlink or valid special subframe, where subframe $n-n_{CQI\_ref}$ is received after the subframe with the corresponding CSI request in a Random Access Response Grant.
    where for aperiodic CSI reporting, and the UE configured with the higher layer parameter csi-SubframePatternConfig-r12,
      for the UE configured in transmission mode 1-9,
        $n_{CQI\_ref}$ is the smallest value greater than or equal to 4 and subframe $n-n_{CQI\_ref}$ corresponds to a valid downlink or valid special subframe, where subframe $n-n_{CQI\_ref}$ is received on or after the subframe with the corresponding CSI request in an uplink DCI format;
        $n_{CQI\_ref}$ is the smallest value greater than or equal to 4, and subframe $n-n_{CQI\_ref}$ corresponds to a valid downlink or valid special subframe, where subframe $n-n_{CQI\_ref}$ is received after the subframe with the corresponding CSI request in an Random Access Response Grant;
        if there is no valid value for $n_{CQI\_ref}$ based on the above conditions, then $n_{CQI\_ref}$ is the smallest value such that the reference resource is in a valid downlink or valid special subframe $n-n_{CQI\_ref}$ prior to the subframe with the corresponding CSI request, where subframe $n-n_{CQI\_ref}$ is the lowest indexed valid downlink or valid special subframe within a radio frame;
      for the UE configured in transmission mode 10,
        $n_{CQI\_ref}$ is the smallest value greater than or equal to 4, such that it corresponds to a valid downlink or valid special subframe, and the corresponding CSI request is in an uplink DCI format;
        $n_{CQI\_ref}$ is the smallest value greater than or equal to 4, and subframe $n-n_{CQI\_ref}$ corresponds to a valid downlink or valid special subframe, where subframe $n-n_{CQI\_ref}$ is received after the subframe with the corresponding CSI request in a Random Access Response Grant;
  for a UE configured in transmission mode 10 with multiple configured CSI processes for the serving cell, the CSI reference resource for a given CSI process is defined by a single downlink or special subframe $n-n_{CQI\_ref}$,
    where for FDD serving cell and periodic or aperiodic CSI reporting $n_{CQI\_ref}$ is the smallest value greater than or equal to 5, such that it corresponds to a valid downlink or valid special subframe, and for aperiodic CSI reporting the corresponding CSI request is in an uplink DCI format;

where for FDD serving cell and aperiodic CSI reporting $n_{CQI\_ref}$ is equal to 5 and subframe $n-n_{CQI\_ref}$ corresponds to a valid downlink or valid special subframe, where subframe $n-n_{CQI\_ref}$ is received after the subframe with the corresponding CSI request in a Random Access Response Grant.

where for TDD serving cell, and 2 or 3 configured CSI processes, and periodic or aperiodic CSI reporting, $n_{CQI\_ref}$ is the smallest value greater than or equal to 4, such that it corresponds to a valid downlink or valid special subframe, and for aperiodic CSI reporting the corresponding CSI request is in an uplink DCI format;

where for TDD serving cell, and 2 or 3 configured CSI processes, and aperiodic CSI reporting, $n_{CQI\_ref}$ is equal to 4 and subframe $n-n_{CQI\_ref}$ corresponds to a valid downlink or valid special subframe, where subframe $n-n_{CQI\_ref}$ is received after the subframe with the corresponding CSI request in a Random Access Response Grant;

where for TDD serving cell, and 4 configured CSI processes, and periodic or aperiodic CSI reporting, $n_{CQI\_ref}$ is the smallest value greater than or equal to 5, such that it corresponds to a valid downlink or valid special subframe, and for aperiodic CSI reporting the corresponding CSI request is in an uplink DCI format;

where for TDD serving cell, and 4 configured CSI processes, and aperiodic CSI reporting, $n_{CQI\_ref}$ is equal to 5 and subframe $n-n_{CQI\_ref}$ corresponds to a valid downlink or valid special subframe, where subframe $n-n_{CQI\_ref}$ is received after the subframe with the corresponding CSI request in a Random Access Response Grant.

In the time domain and for a BL/CE UE, the CSI reference resource is defined by a set of $R^{CSI}$ BL/CE consecutive downlink or special subframes where the last subframe is subframe $n-n_{CQI\_ref}$.

where for periodic CSI reporting $n_{CQI\_ref}$ is $\geq 4$;

where for aperiodic CSI reporting $n_{CQI\_ref}$ is $\geq 4$;

where each subframe in the CSI reference resource is a valid downlink or valid special subframe;

where $R^{CSI}$ is given by the higher layer parameter csi-NumRepetitionCE.

A subframe in a serving cell shall be considered to be a valid downlink or a valid special subframe if:

it is configured as a downlink subframe or a special subframe for that UE, and in case multiple cells with different uplink-downlink configurations are aggregated and the UE is not capable of simultaneous reception and transmission in the aggregated cells, the subframe in the primary cell is a downlink subframe or a special subframe with the length of DwPTS more than $7680 \cdot T_s$, and except for a non-BL/CE UE in transmission mode 9 or 10, it is not an MBSFN subframe, and it does not contain a DwPTS field in case the length of DwPTS is $7680 \cdot T_s$ and less, and it does not fall within a configured measurement gap for that UE, and for periodic CSI reporting, it is an element of the CSI subframe set linked to the periodic CSI report when that UE is configured with CSI subframe sets, and for a UE configured in transmission mode 10 with multiple configured CSI processes, and aperiodic CSI reporting for a CSI process, it is an element of the CSI subframe set linked to the downlink or special subframe with the corresponding CSI request in an uplink DCI format, when that UE is configured with CSI subframe sets for the CSI process and UE is not configured with the higher layer parameter csi-SubframePatternConfig-r12, and for a UE configured in transmission mode 1-9, and aperiodic CSI reporting, it is an element of the CSI subframe set associated with the corresponding CSI request in an uplink DCI format, when that UE is configured with CSI subframe sets by the higher layer parameter csi-SubframePatternConfig-r12, and for a UE configured in transmission mode 10, and aperiodic CSI reporting for a CSI process, it is an element of the CSI subframe set associated with the corresponding CSI request in an uplink DCI format, when that UE is configured with CSI subframe sets by the higher layer parameter csi-SubframePatternConfig-r12 for the CSI process.

except if the serving cell is a LAA Scell, and at least one OFDM symbol in the subframe is not occupied.

except if the serving cell is a LAA Scell, and $n'_s \neq n_s$ as described in sub clause 6.10.1.1 in [3].

except if the serving cell is a LAA Scell, and for a UE configured in transmission mode 9 or 10, the configured CSI-RS resource associated with the CSI process is not in the subframe.

For a non-BL/CE UE, if there is no valid downlink or no valid special subframe for the CSI reference resource in a serving cell, CSI reporting is omitted for the serving cell in uplink subframe n.

In the layer domain, the CSI reference resource is defined by any RI and PMI on which the CQI is conditioned.

In the CSI reference resource, the UE shall assume the following for the purpose of deriving the CQI index, and if also configured, PMI and RI:

The first 3 OFDM symbols are occupied by control signalling

No resource elements used by primary or secondary synchronization signals or PBCH or EPDCCH CP length of the non-MBSFN subframes Redundancy Version 0

If CSI-RS is used for channel measurements, the ratio of PDSCH EPRE to CSI-RS EPRE is as given in subclause 7.2.5.

For transmission mode 9 CSI reporting of a non-BL/CE UE:

CRS REs are as in non-MBSFN subframes;

If the UE is configured for PMI/RI reporting or without PMI reporting, the UE-specific reference signal overhead is consistent with the most recent reported rank if more than one CSI-RS port is configured, and is consistent with rank 1 transmission if only one CSI-RS port is configured; and PDSCH signals on antenna ports $\{7 \ldots 6+\upsilon\}$ for $\upsilon$ layers would result in signals equivalent to corresponding symbols transmitted on antenna ports $\{15 \ldots 14+P\}$, as given by $$\begin{bmatrix} y^{(15)}(i) \\ \vdots \\ y^{(14+P)}(i) \end{bmatrix} = W(i) \begin{bmatrix} x^{(0)}(i) \\ \vdots \\ x^{(\upsilon-1)}(i) \end{bmatrix},$$

where $x(i)=[x^{(0)}(i) \ldots x^{(\upsilon-1)}(i)]^T$ is a vector of symbols from the layer mapping in subclause 6.3.3.2 of [3], $P \in \{1,2,4,8, 12,16\}$ is the number of CSI-RS ports configured, and if only one CSI-RS port is configured, W(i) is 1, otherwise for UE configured for PMI/RI reporting W(i) is the precoding matrix corresponding to the reported PMI applicable to x(i) and for UE configured without PMI reporting W(i) is the selected precoding matrix corresponding to the reported CQI applicable to x(i). The corresponding PDSCH signals transmitted on antenna ports {15 . . . 14+P} would have a ratio of EPRE to CSI-RS EPRE equal to the ratio given in subclause 7.2.5.

For transmission mode 10 CSI reporting, if a CSI process is configured without PMI/RI reporting:

If the number of antenna ports of the associated CSI-RS resource is one, a PDSCH transmission is on single-antenna port, port 7. The channel on antenna port {7} is inferred from the channel on antenna port {15} of the associated CSI-RS resource.

CRS REs are as in non-MBSFN subframes. The CRS overhead is assumed to be the same as the CRS overhead corresponding to the number of CRS antenna ports of the serving cell;

The UE-specific reference signal overhead is 12 REs per PRB pair.

Otherwise,

If the number of antenna ports of the associated CSI-RS resource is 2, the PDSCH transmission scheme assumes the transmit diversity scheme defined in subclause 7.1.2 on antenna ports {0,1} except that the channels on antenna ports {0,1} are inferred from the channels on antenna port {15, 16} of the associated CSI resource respectively.

If the number of antenna ports of the associated CSI-RS resource is 4, the PDSCH transmission scheme assumes the transmit diversity scheme defined in subclause 7.1.2 on antenna ports {0,1, 2,3} except that the channels on antenna ports {0,1,2,3} are inferred from the channels on antenna ports {15, 16, 17, 18} of the associated CSI-RS resource respectively.

The UE is not expected to be configured with more than 4 antenna ports for the CSI-RS resource associated with the CSI process configured without PMI/RI reporting.

The overhead of CRS REs is assuming the same number of antenna ports as that of the associated CSI-RS resource.

UE-specific reference signal overhead is zero.

For transmission mode 10 CSI reporting, if a CSI process is configured with PMI/RI reporting or without PMI reporting:

CRS REs are as in non-MBSFN subframes. The CRS overhead is assumed to be the same as the CRS overhead corresponding to the number of CRS antenna ports of the serving cell;

The UE-specific reference signal overhead is consistent with the most recent reported rank for the CSI process if more than one CSI-RS port is configured, and is consistent with rank 1 transmission if only one CSI-RS port is configured; and PDSCH signals on antenna ports {7 . . . 6+υ} for υ layers would result in signals equivalent to corresponding symbols transmitted on antenna ports {15 . . . 14+P}, as given by $$\begin{bmatrix} y^{(15)}(i) \\ \vdots \\ y^{(14+P)}(i) \end{bmatrix} = W(i) \begin{bmatrix} x^{(0)}(i) \\ \vdots \\ x^{(\upsilon-1)}(i) \end{bmatrix},$$

where $x(i)=[x^{(0)}(i) \ldots x^{(\upsilon-1)}(i)]^T$ is a vector of symbols from the layer mapping in subclause 6.3.3.2 of [3], $P \in \{1,2,4,8,12,16\}$ is the number of antenna ports of the associated CSI-RS resource, and if P=1, W(i) is 1, otherwise for UE configured for PMI/RI reporting W(i) is the precoding matrix corresponding to the reported PMI applicable to x(i) and for UE configured without PMI reporting W(i) is the selected precoding matrix corresponding to the reported CQI applicable to x(i).

The corresponding PDSCH signals transmitted on antenna ports {15 . . . 14+P} would have a ratio of EPRE to CSI-RS EPRE equal to the ratio given in subclause 7.2.5

Assume no REs allocated for CSI-RS and zero-power CSI-RS

Assume no REs allocated for PRS

The PDSCH transmission scheme given by Table 7.2.3-0 depending on the transmission mode currently configured for the UE (which may be the default mode).

If CRS is used for channel measurements, the ratio of PDSCH EPRE to cell-specific RS EPRE is as given in subclause 5.2 with the exception of $\rho_A$ which shall be assumed to be $\rho_A = P_A + \Delta_{offset} + 10 \log_{10}(2)$ [dB] for any modulation scheme, if the UE is configured with transmission mode 2 with 4 cell-specific antenna ports, or transmission mode 3 with 4 cell-specific antenna ports and the associated RI is equal to one;

$\rho_A = P_A + \Delta_{offset}$ [dB] for any modulation scheme and any number of layers, otherwise.

The shift $\Delta_{offset}$ is given by the parameter nomPDSCH-RS-EPRE-Offset which is configured by higher-layer signalling.

Table 7.2.3-0 of 3GPP TS 36.213 v13.1.1, Entitled "PDSCH Transmission Scheme Assumed for CSI Reference Resource", is Reproduced as FIG. 20

Table 7.2.3-1 of 3GPP TS 36.213 v13.1.1, Entitled "4-Bit CQI Table", is Reproduced as FIG. 21

< . . . >

7.2.4 Precoding Matrix Indicator (PMI) Definition

For transmission modes 4, 5 and 6, precoding feedback is used for channel dependent codebook based precoding and relies on UEs reporting precoding matrix indicator (PMI). For transmission mode 8, the UE shall report PMI if configured with PMI/RI reporting. For transmission modes 9 and 10, the non-BL/CE UE shall report PMI if configured with PMI/RI reporting and the number of CSI-RS ports is larger than 1. A UE shall report PMI based on the feedback modes described in 7.2.1 and 7.2.2. For other transmission modes, PMI reporting is not supported.

For 2 antenna ports, except with UE configured with higher layer parameter eMIMO-Type, and eMIMO-Type is set to 'CLASS B', and one CSI-RS resource configured, and higher layer parameter alternativeCodebookEnabledCLASSB_K1=TRUE, each PMI value corresponds to a codebook index given in Table 6.3.4.2.3-1 of [3] as follows:

- For 2 antenna ports {0,1} or {15,16} and an associated RI value of 1, a PMI value of n∈{0,1,2,3} corresponds to the codebook index n given in Table 6.3.4.2.3-1 of [3] with $\upsilon=1$.
- For 2 antenna ports {0,1} or {15,16} and an associated RI value of 2, a PMI value of n∈{0,1} corresponds to the codebook index n+1 given in Table 6.3.4.2.3-1 of [3] with $\upsilon=2$.

For 4 antenna ports {0,1,2,3} or {15,16,17,18}, except with UE configured with higher layer parameter eMIMO-Type, and eMIMO-Type is set to 'CLASS B', and one CSI-RS resource configured, and higher layer parameter alternativeCodebookEnabledCLASSB_K1=TRUE configured, each PMI value corresponds to a codebook index given in Table 6.3.4.2.3-2 of [3] or a pair of codebook indices given in Table 7.2.4-0A, 7.2.4-0B, 7.2.4-0C, or 7.2.4-0D as follows:

- A PMI value of n∈{0, 1, ..., 15} corresponds to the codebook index n given in Table 6.3.4.2.3-2 of [3] with $\upsilon$ equal to the associated RI value except with alternativeCodeBookEnabledFor4TX-r12=TRUE configured.
- If alternativeCodeBookEnabledFor4TX-r12=TRUE is configured, each PMI value corresponds to a pair of codebook indices given in Table 7.2.4-0A, 7.2.4-0B, 7.2.4-0C, or 7.2.4-0D, where the quantities $\omega_n$, $\omega'_n$ and $v'_m$ in Table 7.2.4-0A and Table 7.2.4-0B are given by $$\varphi_n = e^{j\pi n/2}$$

$$\varphi'_n = e^{j2\pi n/32}$$

$$v'_m = [1\ e^{j2\pi n/32}]^T$$

- A first PMI value of $i_1 \in \{0,1,\ldots,f(\upsilon)-1\}$ and a second PMI value of $i_2 \in \{0, 1, \ldots, g(\upsilon)-1\}$ correspond to the codebook indices $i_1$ and $i_2$ respectively given in Table 7.2.4-0j with $\upsilon$ equal to the associated RI value and where j={A,B,C,D} respectively when $\upsilon=f(\upsilon)=\{16,16,1,1\}$ and $g(\upsilon)=\{16,16,16,16\}$.
- The quantity $W_n^{\{s\}}$ in Table 7.2.4-0C and Table 7.2.4-0D denotes the matrix defined by the columns given by the set {s} from the expression $W_n = I - 2u_n u_n^H / u_n^H u_n$ where I is the 4×4 identity matrix and the vector $u_n$ is given by Table 6.3.4.2.3-2 in [3] and n=$i_2$.
- In some cases codebook subsampling is supported. The sub-sampled codebook for PUCCH mode 1-1 submode 2 is defined in Table 7.2.2-1G for first and second precoding matrix indicators $i_1$ and $i_2$. Joint encoding of rank and first precoding matrix indicator $i_1$ for PUCCH mode 1-1 submode 1 is defined in Table 7.2.2-1H. The sub-sampled codebook for PUCCH mode 2-1 is defined in Table 7.2.2-1I for PUCCH Reporting Type 1a.

< ... >

7.2.5 Channel-State Information—Reference Signal (CSI-RS) Definition

For a serving cell and UE configured in transmission mode 9 and not configured with higher layer parameter eMIMO-Type, the UE can be configured with one CSI-RS resource configuration.

For a serving cell and UE configured in transmission mode 9 and configured with higher layer parameter eMIMO-Type, and eMIMO-Type is set to 'CLASS A', the UE can be configured with one CSI-RS resource configuration.

For a serving cell and UE configured in transmission mode 9 and configured with higher layer parameter eMIMO-Type, and eMIMO-Type is set to 'CLASS B', the UE can be configured with one or more CSI-RS resource configuration(s).

For a serving cell and UE configured in transmission mode 10, the UE can be configured with one or more CSI-RS resource configuration(s). The following parameters for which the UE shall assume non-zero transmission power for CSI-RS are configured via higher layer signaling for each CSI-RS resource configuration:

- CSI-RS resource configuration identity, if the UE is configured in transmission mode 10,
- Number of CSI-RS ports. The allowable values and port mapping are given in subclause 6.10.5 of [3].
- CSI RS Configuration (see Table 6.10.5.2-1 and Table 6.10.5.2-2 in [3])
- CSI RS subframe configuration $I_{CSI-RS}$. The allowable values are given in subclause 6.10.5.3 of [3].
- UE assumption on reference PDSCH transmitted power for CSI feedback $P_c$, if the UE is configured in transmission mode 9.
- UE assumption on reference PDSCH transmitted power for CSI feedback $P_c$ for each CSI process, if the UE is configured in transmission mode 10. If CSI subframe sets $c_{CSI,0}$ and $c_{CSI,1}$ are configured by higher layers for a CSI process, $P_c$ is configured for each CSI subframe set of the CSI process.
- Pseudo-random sequence generator parameter, $n_{ID}$. The allowable values are given in [11].
- CDM type parameter, if the UE is configured with higher layer parameter eMIMO-Type, and eMIMO-Type is set to 'CLASS A' for a CSI process. The allowable values are given in subclause 6.10.5.3 of [3].
- Higher layer parameter qcl-CRS-Info-r11 for Quasi co-location type B UE assumption of CRS antenna ports and CSI-RS antenna ports with the following parameters, if the UE is configured in transmission mode 10:
  qcl-ScramblingIdentity-r11.
  crs-PortsCount-r11.
  mbsfn-SubframeConfigList-r11.

$P_c$ is the assumed ratio of PDSCH EPRE to CSI-RS EPRE when UE derives CSI feedback and takes values in the range of [−8, 15] dB with 1 dB step size, where the PDSCH EPRE corresponds to the symbols for which the ratio of the PDSCH EPRE to the cell-specific RS EPRE is denoted by $\rho_A$, as specified in Table 5.2-2 and Table 5.2-3.

A UE should not expect the configuration of CSI-RS and PMCH in the same subframe of a serving cell.

For frame structure type 2 serving cell and 4 CRS ports, the UE is not expected to receive a CSI RS Configuration index (see Table 6.10.5.2-1 and Table 6.10.5.2-2 in [3]) belonging to the set [20-31] for the normal CP case or the set [16-27] for the extended CP case.

A UE may assume the CSI-RS antenna ports of a CSI-RS resource configuration are quasi co-located (as defined in [3]) with respect to delay spread, Doppler spread, Doppler shift, average gain, and average delay.

A UE configured in transmission mode 10 and with quasi co-location type B, may assume the antenna ports 0-3 associated with qcl-CRS-Info-r11 corresponding to a CSI-RS resource configuration and antenna ports 15-30 corresponding to the CSI-RS resource configuration are quasi co-located (as defined in [3]) with respect to Doppler shift, and Doppler spread.

A UE configured in transmission mode 10, and configured with higher layer parameter eMIMO-Type, and eMIMO-Type is set to 'CLASS B', and the number of configured CSI-RS resources is more than one for a CSI process, and with quasi co-location type B, is not expected to receive CSI-RS resource configurations for the CSI process that have different values of the higher layer parameter qcl-CRS-Info-r11.

A BL/CE UE configured with CEModeA or CEModeB is not expected to be configured with non-zero transmission power CSI-RS.

7.2.6 Channel-State Information—Interference Measurement (CSI-IM) Resource Definition For a serving cell and UE configured in transmission mode 10, the UE can be configured with one or more CSI-IM resource configuration(s). The following parameters are configured via higher layer signaling for each CSI-IM resource configuration:

Zero-power CSI RS Configuration (see Table 6.10.5.2-1 and Table 6.10.5.2-2 in [3])

Zero-power CSI RS subframe configuration $I_{CSI-RS}$. The allowable values are given in subclause 6.10.5.3 of [3].

For a serving cell, if a UE is not configured with the higher layer parameter csi-SubframePatternConfig-r12, the UE is not expected to receive CSI-IM resource configuration(s) that are not all completely overlapping with one zero-power CSI-RS resource configuration which can be configured for the UE.

A UE is not expected to receive a CSI-IM resource configuration that is not completely overlapping with one of the zero-power CSI-RS resource configurations defined in subclause 7.2.7.

For a serving cell, if a UE is not configured with CSI subframe sets $c_{CSI,0}$ and $C_{CSI,1}$ for any CSI process, and the UE is configured with four CSI-IM resources, then the UE is not expected to be configured with CSI processes that are associated with all of the four CSI-IM resources.

A UE should not expect the configuration of CSI-IM resource and PMCH in the same subframe of a serving cell.

7.2.7 Zero Power CSI-RS Resource Definition

For a serving cell and UE configured in transmission mode 1-9 and UE not configured with csi-SubframePattern-Config-r12 for the serving cell, the UE can be configured with one zero-power CSI-RS resource configuration. For a serving cell and UE configured in transmission mode 1-9 and UE configured with csi-SubframePatternConfig-r12 for the serving cell, the UE can be configured with up to two zero-power CSI-RS resource configurations. For a serving cell and UE configured in transmission mode 10, the UE can be configured with one or more zero-power CSI-RS resource configuration(s).

For a serving cell, the UE can be configured with up to 5 additional zero-power CSI-RS resource configurations according to the higher layer parameter ds-ZeroTxPower-CSI-RS-r12.

The following parameters are configured via higher layer signaling for each zero-power CSI-RS resource configuration:

Zero-power CSI RS Configuration list (16-bit bitmap ZeroPowerCSI-RS in [3])

Zero-power CSI RS subframe configuration $I_{CSI-RS}$. The allowable values are given in subclause 6.10.5.3 of [3].

A UE should not expect the configuration of zero-power CSI-RS and PMCH in the same subframe of a serving cell.

For frame structure type 1 serving cell, the UE is not expected to receive the 16-bit bitmap ZeroPowerCSI-RS with any one of the 6 LSB bits set to 1 for the normal CP case, or with any one of the 8 LSB bits set to 1 for the extended CP case.

For frame structure type 2 serving cell and 4 CRS ports, the UE is not expected to receive the 16-bit bitmap Zero-PowerCSI-RS with any one of the 6 LSB bits set to 1 for the normal CP case, or with any one of the 8 LSB bits set to 1 for the extended CP case.

A BL/CE UE configured with CEModeA or CEModeB is not expected to be configured with zero-power CSI-RS.

As discussed above, LTE system supports a plurality of transmission mode (with desired transmission schemes). A UE can be configured with a transmission mode, and further configured with a proper CSI reporting mode associated with the configured transmission mode. Though the associated reporting mode may reveal more information applicable for the configured transmission mode, it may not provide suitable information for other transmission mode. Since with beam operation, a base station has more choices of ways to transmit data to the UE, e.g., with which beam(s) or which TRP(s) and the choice can be made depending on multiple factors, such as channel condition, traffic of air interface, availability of given beam, scheduler decision, etc. Therefore, reporting CSI based on a given assumption may not give the base station proper information when the assumption does not hold, e.g., the way of transmission data is changed. For example, if the CSI is derived based on a single beam, while the actual data is transmitted on multiple beams, the CSI would underestimate the amount of data that can be transmitted with proper error rate. Also, with the introduction of multiple beams, how to derive CSI based on a single beam or based on multiple beams and how to report them properly needs to be considered.

A UE may be served by multiple beams, which could come from a single TRP or multiple TRPs. To obtain CQI for each beam, signal CSI-RS (Channel State Information-Reference Signals) on each beam which can be differentiated is at least required to measure signal for each beam. Note in the following discussion, the beams may refer to a subset of beams generated by a TRP or a base station (e.g., refer to the beams that can be detected for a given UE, or refer to the beams with certain quality level, i.e., beams that are too weak may be neglected).

Alternative 1: Beam-Awareness Measurement—

The general concept of this alternative is that a UE is configured with N distinct CSI-RS resources (in time/frequency/code domain) and the UE could generate any result of CSI with taking some of the N CSI-RS resources as signal. In one embodiment, the UE could consider some of the N CSI-RS resources as interference when generating the result. N could be the number of potential serving beams (beam 1~beam N), and each beam could associated with one CSI-RS resource. For example, beam 1 could be associated with CSI-RS resource 1, beam 2 could be associated with CSI-RS resource 2, and beam N associated with CSI-RS resource N. Therefore, in the following discussion, a combination can be described as a combination of beams, or as a combination of CSI-RE resources. For example, CQI for Beam 1+Beam 2 can be understood as CQI for CSI-RS resource 1+CSI-RS resource 2. The UE could then generate different CQI combinations based on measuring the N CSI-RS resources.

If the potential serving beams is considered as signaling (e.g. channel) measurement, there would be $2^N-1$ combinations. Furthermore, if the potential serving beams are considered as signaling measurement as well as interference measurement, there would be $3^N-2^N$ combinations. As an example, if N=3 (Beam 1-Beam 3) and if the potential serving beams are considered as signaling measurement, the following 7 combinations may be generated: CQI for beam 1, CQI for Beam 2, CQI for Beam 3, CQI for Beam 1+Beam 2, CQI for Beam 2+Beam 3, CQI for Beam 1+Beam 3, and CQI for Beam 1+Beam 2+Beam 3.

If the potential serving beams are considered as signaling measurement as well as interference measurement, the following 19 combinations may be generated: CQI for beam 1, CQI for Beam 2, CQI for Beam 3, CQI for Beam 1+Beam 2, CQI for Beam 2+Beam 3, CQI for Beam 1+Beam 3, CQI for Beam 1+Beam 2+Beam 3, CQI for Beam 1 with Beam 2 considered as interference, CQI for Beam 1 with Beam 3 considered as interference, CQI for Beam 2 with Beam 1 considered as interference, CQI for Beam 2 with Beam 3 considered as interference, CQI for Beam 3 with Beam 1 considered as interference, CQI for Beam 3 with Beam 2 considered as interference, CQI for Beam 1+Beam 2 with Beam 3 considered as interference, CQI for Beam 1+Beam 3 with Beam 2 considered as interference, CQI for Beam 2+Beam 3 with Beam 1 considered as interference, CQI for Beam 1 with Beam 2+Beam 3 considered as interference, CQI for Beam 2 with Beam 1+Beam 3 considered as interference, and CQI for Beam 3 with Beam 1+Beam 2 considered as interference.

Figure 23:
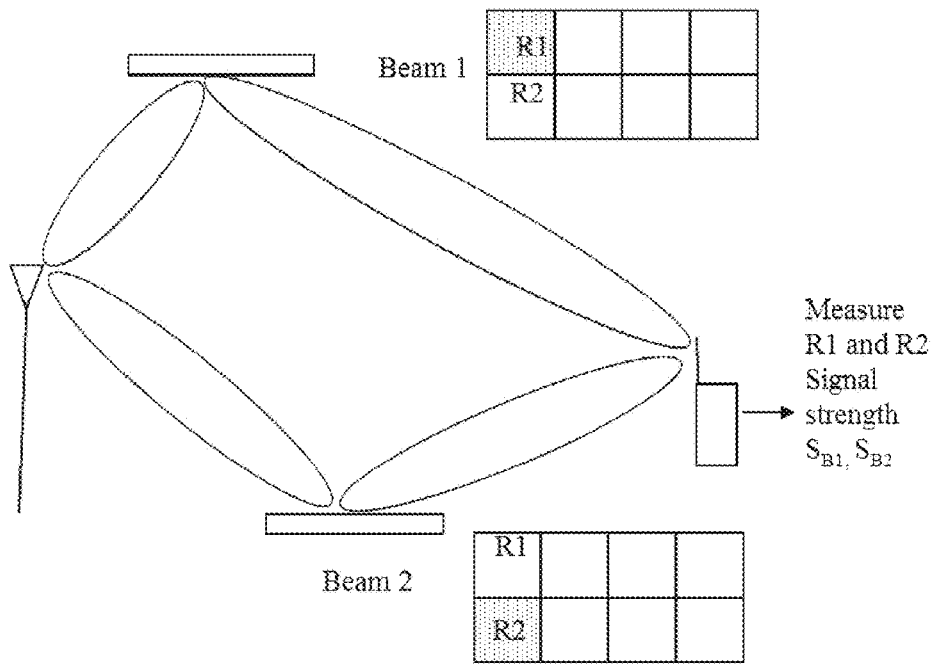
FIG. 23 is a diagram according to one exemplary embodiment of beam-awareness measurement.

An simplified example for N=2 is generally illustrated in FIG. 23. An example of deriving a CQI for Beam 1+Beam 2 can be given below:

Assuming CSI-RS resource 1 is configured for Beam 1 and CSI-RS resource 2 is configured for Beam 2. UE can measure signal quality of Beam 1 (e.g., $S_1$ based on measurement on CSI-RS resource 1) and measure signal quality of Beam 2 (e.g., $S_2$ based on measurement on CSI-RS resource 2). The SINR of Beam 1+Beam 2 can be derived by $$\frac{S_1 + S_2}{I + N},$$

where I is the measured interference (I may be 0) and N is the measure noise. Based on the derived SINR $$\frac{S_1 + S_2}{I + N},$$

a CQI index for Beam 1+Beam 2 can be selected under proper assumption (e.g., error rate).

In some embodiments, a UE does not know which beam(s) is measured. However, the UE knows it should combine the measurements of which CSI-RS resources. Accordingly, the UE combines the measurements from CSI-RS resource 1 and CSI-RS resource 2 and derives $$\frac{S_1 + S_2}{I + N}.$$

An example of deriving a CQI for Beam 1+Beam 2 with Beam 3 considered as interference can be given below:

Assuming CSI-RS resource 1 is configured for Beam 1, CSI-RS resource 2 is configured for Beam 2 and CSI-RS resource 3 is configured for Beam 3, the UE can measure signal quality of Beam 1 (e.g., $S_1$ based on measurement on CSI-RS resource 1), measure signal quality of Beam 2 (e.g., $S_2$ based on measurement on CSI-RS resource 2), and measure signal quality of Beam 3 (e.g., $S_3$ based on measurement on CSI-RS resource 3). The SINR of Beam 1+Beam 2 with Beam 3 considered as interference can be derived by $$\frac{S_1 + S_2}{S_3 + I + N},$$

where I is the measured interference other than those on beam 3 (under such case I may be 0 and fall back to $$\frac{S_1 + S_2}{S_3 + N})$$

and N is the measured noise. Based on the derived SINR $$\frac{S_1 + S_2}{S_3 + I + N},$$

a CQI index for Beam 1+Beam 2 with Beam 3 considered as interference can be selected under proper assumption (e.g., error rate).

In some embodiments, a UE does not know which beam(s) is measured for signal or interference. However, the UE knows it should combine the measurements of which CSI-RS resources and knows how to combine them. Accordingly, the UE combines the measurements from CSI-RS resource 1 and CSI-RS resource 2 as signal part and combine the measurement from CSI-RS resource 3 as interference part and derives $$\frac{S_1 + S_2}{S_3 + I + N}.$$

With the report of all combinations, a base station could schedule the UE with proper modulation and coding scheme. For example, if the base station schedules the UE on beam 1, beam 2 and beam 3 with the same data, the base station could choose the modulation and coding scheme for transmission on beam 1 beam 2 and beam 3 based on CQI for Beam1+Beam 2+Beam 3. If the base station schedules the UE on beam 1 and beam 2 with different data, and there is no interference from Beam 3 (e.g., base station does not perform transmission on the same resource on beam3), base station could choose the modulation and coding scheme for transmission on Beam 1 based on CQI for Beam 1 and the modulation and coding scheme for transmission on Beam 2 based on CQI for Beam 2 respectively. If the base station schedules the UE on Beam 1 and Beam 2 with different data, and there is interference from Beam 3 (e.g., the base station performs transmission to another UE on the same resource on beam3), the base station could choose the modulation and coding scheme for transmission on Beam 1 based on CQI for Beam 1 with Beam 3 considered as interference, and the modulation and coding scheme for the transmission on Beam 2 based on CQI for Beam 2 with Beam 3 considered as interference respectively. In general, full combinations may require large overhead which may not fit in a single occasion, especially for periodic reporting.

In one embodiment, a base station may further restrict which combination is reported. Among full combinations, some of them are reported and some of them are not reported. The base station and a UE need to have the same understanding regarding which combination is reported. More specifically, the base station and the UE negotiate which combinations are reported. As a consequence, the rest of combinations are not reported. The UE may choose not to derive the CQI or even not perform measurement on certain CSI-RS resource if some combinations are not reported.

In one embodiment, the base station signals the combination(s) which is to be reported to the UE. The signal may be transmitted via RRC configuration, MAC control element, physical layer control information, or any combinations of them. In one embodiment, each combination is associated with an index and the base station signals the indices corresponding to the combination(s) to be reported. The association may be fixed, predefined, or configured by RRC. In one embodiment, the base station signals the combination(s) directly. The combination could specify which beam(s) should be considered as signal and optionally which beam should be considered as interference. The combination could also specify which CSI-RS resource(s) is considered as signal and optionally which CSI-RS resource(s) is considered as interference.

Full combinations may not be reported at once. In one embodiment, for an aperiodic report, a base station signals which combination(s) are reported in a trigger of the aperiodic report (e.g., a physical layer control signaling or an UL grant). The signaling can be an indices or explicit combinations as mentioned above. In another embodiment, for a periodic report, for a given transmission occasion of the periodic report, a UE would report CQI for certain combination(s), and the UE and the base station would have the same understanding.

Different combinations may be reported in different transmission occasions. Different combinations may have different transmission periodicity. In one embodiment, one combination is configured with a periodicity and transmission timing offset. The periodicity and transmission timing offset for different combinations can be different. Alternatively, a single timing offset is configured and each combination would take its turn to be reported. More specifically, each combination has an equal periodicity to be reported. Alternatively, some combination(s) has more occasions to be reported than other combinations. In any of above embodiments, reporting more than one combination in one occasion is also possible.

In one embodiment, a UE may select which combination(s) is reported and report CQI for the selected combination(s). More specifically, an indication of selected combination(s) is transmitted together with the CQI for the selected combination(s).

In one embodiment, a base station and a UE may have the same understanding of how many combinations is reported. A number of combinations to be reported (e.g., X) may be configured by RRC, or indicated in physical control information. The UE may select X combinations according to certain criteria. In one embodiment, the best X CQI are reported. In another embodiment, the X CQI is selected according to a type of combination. Examples of combination types include single beam as signal, multiple beams as signal, single beams as signal and single beam as interference, multiple beams as signal and single beam as interference, multiple beams as signal and multiple beams as interference, and single beams as signal and multiple beam as interference.

The combination types may be further split according to number of beams (e.g., 2 beams as signals and 3 beams as signals that can be considered as different type). More specifically, a UE could select X CQI, where each CQI is the best CQI among a combination type and X CQI combination type is reported. Alternatively, more than one CQI (e.g., 2 or 3 CQI) may be selected for some combinations types. Furthermore, combinations with the best two or best three CQI could be selected (e.g., X is larger than total number of combination type). In still another embodiment, different types of report may have different priority. A UE would include a combination type with higher priority in a report; and if there is still room to put CQI for more combination(s) in the report, a combination belonging to combination type with lower priority would be included in the report. More specifically, CQI with a single beam may be prioritized. In one embodiment, a base station would indicate to the UE how to select the X CQI. Alternatively the criteria to select X CQI could be fixed.

Some examples are provided below:
N single beam CQIs+1 best combined CQI (with respective combination index)
1 single beam CQI+1 best combined CQI with two beams (with respective combination index)
1 single beam CQI+best combined CQI+1 best combined CQI with one serving beam as interference (with respective combination index)

In any of above embodiments or examples, the worst X CQI can be reported instead of best X CQI.

Note that for single beam/resource CQI, beam index or resource index can be considered as a special case for combination index.

Alternative 2: Beam-Agnostic Measurement—

A UE is configured with M distinct CSI-RS resources (time/frequency/code domain) corresponding to a reporting occasion, wherein M is an upper bound of the number of combinations a base station prefers to get in one reporting occasion. Note that the exact report the base station gets may be smaller than M.

The base station controls one CSI-RS corresponding to a single beam or a specific combination of beams, and the UE just measures the CSI-RS and reports the result. In one embodiment, the M CSI-RS resources are used to perform signal measurement. Furthermore, the UE would be configured with L distinct CSI-RS resources (e.g., time/frequency/code domain) corresponding to a reporting occasion for interference measurement. Some of the M CSI-RS and some of the L CSI-RS may overlap, i.e., uses the same resources.

The base station controls one CSI-RS corresponding to a single beam or a specific combination of beams, and the UE just measures the CSI-RS for interference measurement. In one embodiment, L is equal to M. More specifically, each CSI-RS resource for signal measurement is associated with a CSI-RS resource, and the UE could generate a CSI result (e.g., CQI) based on a pair of CSI-RS for signal measurement and CSI-RS for interference measurement (M combinations in total). Alternatively, each CSI-RS resource for signal measurement can be associated with any of the M CSI-RS resources for interference measurement, and the UE could generate a CSI result (e.g., CQI) based on a pair of CSI-RS for signal measurement and CSI-RS for interference measurement (M*M combinations in total). In another embodiment, L is not equal to M. More specifically, each CSI-RS resource for signal measurement can be associated with any of the L CSI-RS resources for interference measurement, and the UE could generate a CSI result (e.g., CQI)

based on a pair of CSI-RS for signal measurement and CSI-RS for interference measurement (M*L combinations in total).

In any of above embodiments, a CSI result with CSI-RS for signal measure and no CSI-RS for interference measurement can be considered as well. Under such case, there would be additional M combinations. In any of above embodiments, it is also possible that for some CSI-RS for signal measure there is no corresponding CSI-RS for interference measurement, e.g. some of the combination is not valid.

For example, if 3 CSI-RS are configured for signal measurement and 2 CSI-RS are configured for interference measurement, the combination the following pairs of (signal, interference) may be generated: (CSI-RS S1, CSI-RS I1), (CSI-RS S1, CSI-RS I2), (CSI-RS S2, CSI-RS I1), (CSI-RS S2, CSI-RS I2), (CSI-RS S3, CSI-RS I1), and (CSI-RS S3, CSI-RS I2). If there is a CSI result with CSI-RS for signal measure and no CSI-RS for interference measurement can be considered as well, there would be following pairs: (CSI-RS S1, CSI-RS I1), (CSI-RS S1, CSI-RS I2), (CSI-RS S2, CSI-RS I1), (CSI-RS S2, CSI-RS I2), (CSI-RS S3, CSI-RS I1), (CSI-RS S3, CSI-RS I2), (CSI-RS S1, N/A), (CSI-RS S2, N/A), and (CSI-RS S3, N/A).

In one embodiment, each of the M configured CSI-RS can be used to perform signal or interference measurement. The UE could generate a CSI result (e.g., CQI) based on a pair of CSI-RS for signal measurement and CSI-RS for interference measurement (M*M-M combinations in total as using the same CSI-RS to perform signal measurement and interference measurement to generate a result is not considered as valid combination). For example, if 3 CSI-RS are configured, the following pairs of (signal, interference) may be generated: (CSI-RS 1, CSI-RS2), (CSI-RS 1, CSI-RS3), (CSI-RS 2, CSI-RS1), (CSI-RS 2, CSI-RS3), (CSI-RS 3, CSI-RS1), and (CSI-RS 3, CSI-RS2). If there is a CSI result with CSI-RS for signal measure and no CSI-RS for interference measurement can be considered, there would be following pairs: (CSI-RS 1, CSI-RS2), (CSI-RS 1, CSI-RS3), (CSI-RS 2, CSI-RS1), (CSI-RS 2, CSI-RS3), (CSI-RS 3, CSI-RS1), (CSI-RS 3, CSI-RS2), (CSI-RS S1, N/A), (CSI-RS S2, N/A), and (CSI-RS S3, N/A).

Some constraints may be applied so that valid combinations may be less than what is described above. An example of an invalid combination is that two different CSI-RS corresponding to two different beam combinations are used as signal measurement and interference measurement respectively, while the two beam combinations have at least one specific beam in common.

Figure 24:
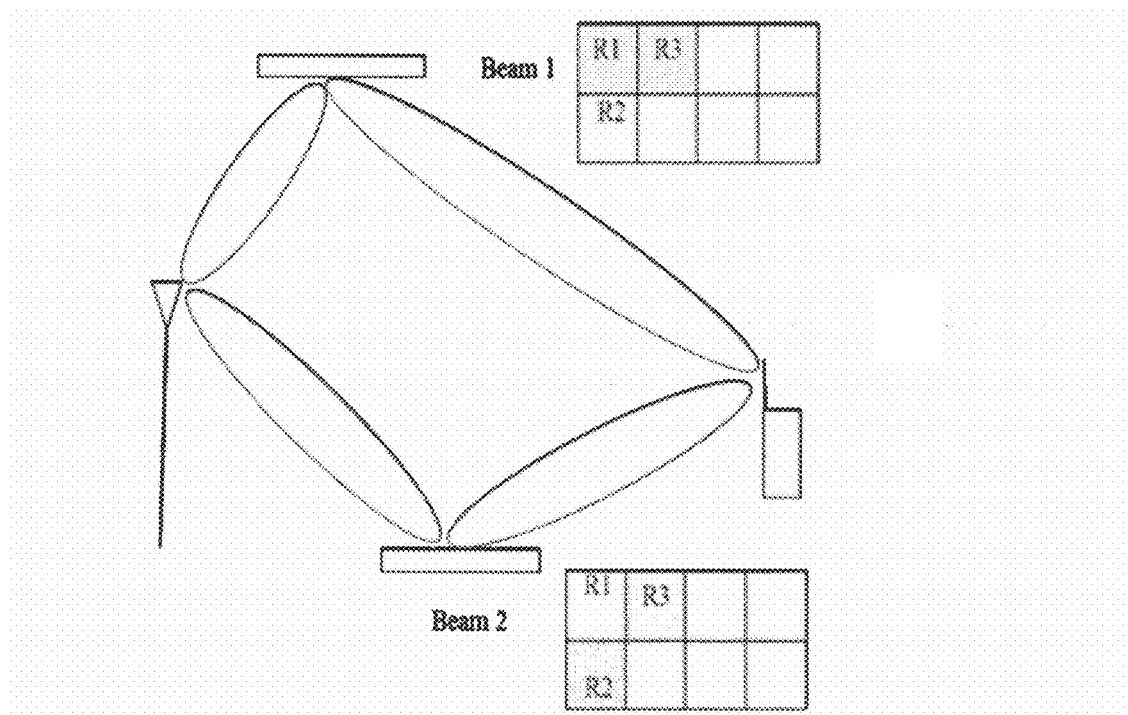
FIG. 24 is a diagram according to one exemplary embodiment of beam-agnostic measurement.

An example of M=L=3 is illustrated in FIG. 24. As shown in FIG. 24, a base station signals CSI-RS 1 on R1 on beam 1, signals CSI-RS 2 on R2 on beam 2, and signals CSI-RS 3 on R3 on beam 1 and beam 2. Accordingly, the total number of combinations considering CSI result with CSI-RS for signal measure and no CSI-RS for interference measurement is 3*3-3+3=9. Note that there are 4 combinations which may be invalid thus removed from the combinations, including: (1) Signal measurement on R1 and interference measurement on R3, (2) Signal measurement on R2 and interference measurement on R3, (3) Signal measurement on R3 and interference measurement on R1, and (4) Signal measurement on R3 and interference measurement on R2.

An example of deriving a CQI for a pair of (signal, interference) of (CSI-RS 1, CSI-RS 2) is provided below:

A UE measures CSI-RS 1 to get the signal quality $S_1$ and measures CSI-RS 2 to get the signal quality $S_2$. The SINR of (CSI-RS 1, CSI-RS 2) can be derived by $$\frac{S_1}{S_2+I+N},$$

where 1 is the measured interference other than those on CSI-RS2 (under such case I may be 0 and fall back to $$\frac{S_1}{S_2+N})$$

and N is the measured noise. Based on the derived SINR $$\frac{S_1}{S_2+I+N},$$

a CQI index for (CSI-RS 1, CSI-RS 2) can be selected under proper assumption (e.g., error rate).

An example of deriving a CQI for a pair of (signal, interference) of (CSI-RS 1, N/A) is provided below:

A UE measures CSI-RS 1 to get the signal quality $S_1$. The SINR of (CSI-RS 1, N/A) can be derived by $$\frac{S_1}{I+N},$$

where r is the measured interference(I may be 0) and N is the measured noise. Based on the derived SINR $$\frac{S_1}{I+N},$$

a CQI index for (CSI-RS 1, CSI-RS 2) can be selected under proper assumption (e.g., error rate).

In one embodiment, all the combinations are reported. In one embodiment, the base station may further restrict which combinations are reported. The way to restrict the combinations in Alternative 1 (discussed above) can be equally applicable here. Some combinations are reported, and some combinations are not reported. The base station and the UE need to have the same understanding regarding which combinations are reported. More specifically, the base station and the UE negotiate which combinations are reported. As a consequence, the rest of combinations are not reported. The UE may choose not to derive the CQI or even not perform measurement on certain CSI-RS resource if some combinations are not reported.

In one embodiment, the base station signals the combination(s) which is to be reported to the UE. The signal may be transmitted via RRC (Radio Resource Control) configuration, MAC (Medium Access Control) control element, physical layer control information, or any combinations of them. In one embodiment, a combination is associated with an index and the base station signals the indices corresponding to the combination(s) to be reported. The association may be fixed, predefined, or configured by RRC.

In one embodiment, the base station signals the combination(s) directly. More specifically, a combination could indicate which beam(s) should be considered as signal and optionally which beam should be considered as interference. Furthermore, a combination could indicate which CSI-RS resource(s) should be considered as signal and optionally which CSI-RS resource(s) should be considered as interference.

In one embodiment, full combinations may not be reported at once. The way to determine reported combination(s) in Alternative 1 (discussed above) can be equally applicable here. In one embodiment, for an aperiodic report, the base station signals which combination(s) are reported in a trigger of the aperiodic report, e.g., a physical layer control signaling or an UL grant. The signaling can be an indices or explicit combinations as mentioned above.

In another embodiment, for an periodic report, for a given transmission occasion of the periodic report, the UE would report CQI for certain combination(s), and the UE and the base station would have the same understanding.

Different combinations may be reported in different transmission occasions. Different combinations may have different transmission periodicity. In one embodiment, one combination is configured with a periodicity and transmission timing offset. The periodicity and transmission timing offset for different combinations can be different. Alternatively, a single timing offset is configured, and each combination would take its turn to be reported. More specifically, each combination would have an equal periodicity to be reported. Alternatively, some combination(s) has more occasions to be reported than other combinations. In any of above embodiment, reporting more than one combination in one occasion is also possible.

In one embodiment, a UE may select which combination(s) is reported and report CQI for the selected combination(s). The way to select combination in Alternative 1 (discussed above) can be equally applicable here with proper modification. More specifically, an indication of selected combination(s) is transmitted together with the CQI for the selected combination(s). In one embodiment, a base station and the UE have the same understanding of how many combinations are reported. A number of combinations to be reported (e.g., X) may be configured by RRC, or indicated in physical control information. The UE may select X combinations according to certain criteria. In one embodiment, best X CQI are reported. In another embodiment, different CSI-RS resource may have different priority.

In one embodiment, the X CQI is selected according to a type of combination. Example of combination types includes whether or not a CSI-RS is configured for interference measurement for a combination, i.e., (CSI-RS x, CSI-RS) and (CSI-RS x, N/A) belong to different combination type. More specifically, the UE selects X CQI, where each CQI is the best CQI among a combination type and X CQI combination type is reported. In one embodiment, more than one CQI, (e.g., 2 or 3) may be selected for some combinations types and combinations with best two or best 3 CQI are selected (e.g., X is larger than total number of combination type).

In one embodiment, different types of report have different priority. A UE could include combination type with higher priority in a report; and if there is still room to put CQI for more combination(s) in the report, a combination belonging to combination type with lower priority could be included in the report. More specifically, CQI with a single beam may be prioritized.

In one embodiment, different CSI-RS resources may have different priority, and CSI-RS with higher priority may be reported with higher priority. More specifically, the priority for performing signal measurement and the priority of performing interference measurement are the same. Alternatively, the priority for performing signal measurement and the priority of performing interference measurement are different. In one embodiment, a base station signals the priority of CSI-RS resource to the UE. Furthermore, the base station would indicate to the UE how to select the X CQI. Alternatively the criteria to select X CQI could be fixed.

In any of the above embodiments, the UE could perform UE beamforming when measuring channel/interference quality. In one embodiment, the UE could autonomously choose proper beam to perform CSI measurement. In another embodiment, the base station would indicate to the UE which UE beam is used to perform CSI measurement. In another embodiment, the UE uses different UE beam to perform CSI measurement in different timing occasion. In another embodiment, the UE uses a predefined UE beam to perform CSI measurement. In another embodiment, the UE chooses a UE beam to perform CSI measurement according to which base station beam is measured. In another embodiment, the UE chooses a UE beam to perform CSI measurement according to which CSI-RS resource is measured. In another embodiment, the UE chooses a UE beam to perform CSI measurement according to the UE beam used to receive/demodulate the corresponding CSI report trigger. In another embodiment, the UE chooses a UE beam to perform CSI measurement according to a recent beam mapping update from a beam tracking procedure.

Figure 25:
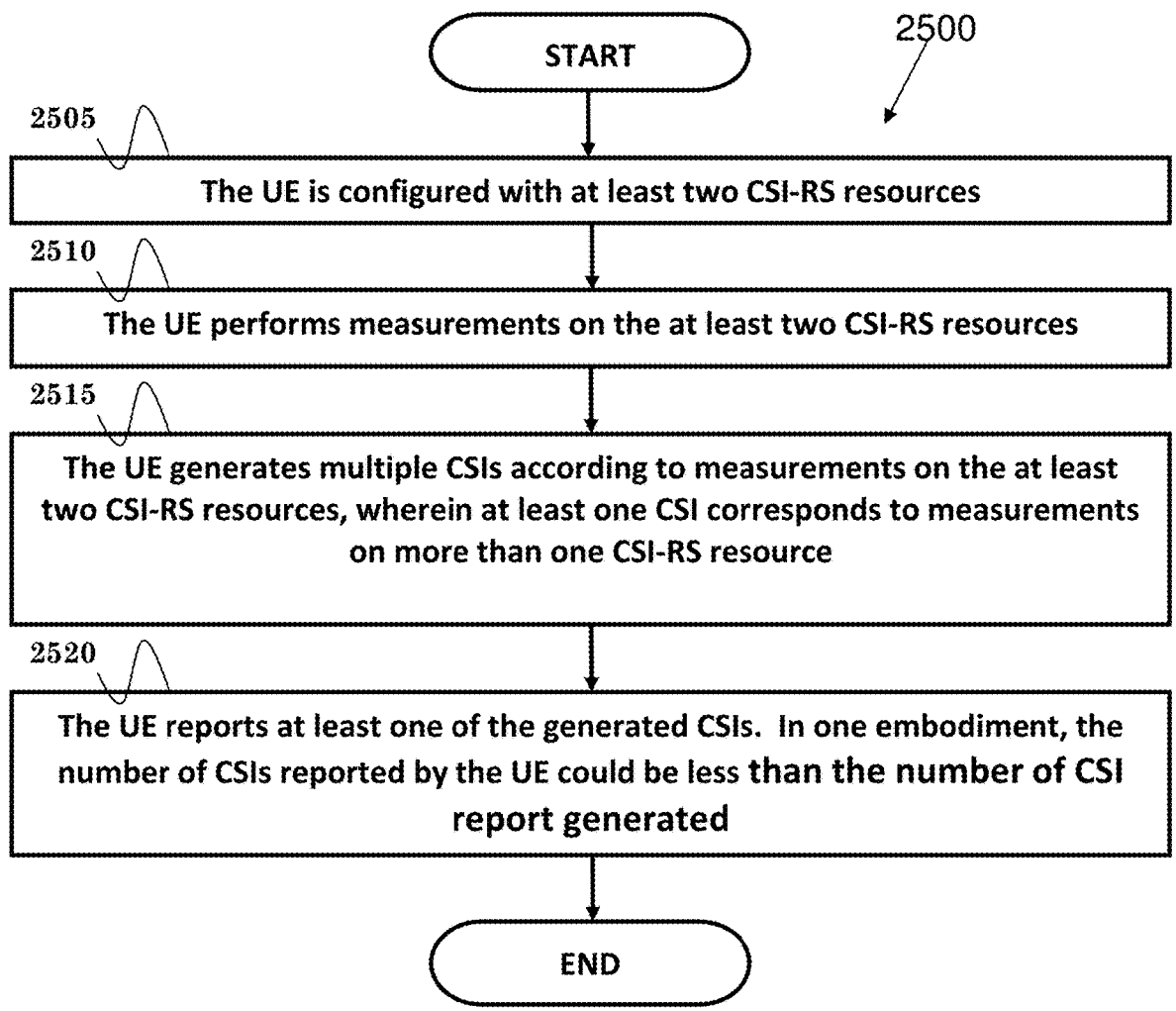
FIG. 25 is a flow chart according to one exemplary embodiment from the perspective of a UE.

FIG. 25 is a flow chart 2500 according to one exemplary embodiment from the perspective of a UE. In step 2505, a UE is configured with at least two CSI-RS (Channel State Information-Reference Signal) resources.

In one embodiment, each CSI-RS resource is associated with a specific beam. Furthermore, the number of CSI-RS resources could be equal to the number of beam which may serve the UE. In addition, the CSI-RS resources could be used to perform signal measurement. The CSI-RS resources could also be used to perform interference measurement.

In step 2510, the UE performs measurements on the at least two CSI-RS resources. In step 2515, the UE generates multiple CSIs according to measurements on the at least two CSI-RS resources, wherein at least one CSI corresponds to measurements on more than one CSI-RS resource.

In one embodiment, if a CSI corresponds to measurements on multiple CSI-RS resources, signal strengths of multiple CSI-RS resources are summed together to derive the CSI. Furthermore, the UE could generate at least one CSI corresponding to signal measurement on at least one CSI-RS resource and interference measurement on at least another CSI-RS resource. Furthermore, the UE could generate at least one CSI corresponding to measurement on a single CSI-RS resource.

In one embodiment, a given CSI-RS resource considered in a combination would be taken as either interference or signal. Furthermore, the UE could be configured with n CSI-RS resources, and the number of CSIs generated is $2^n-1$. Alternatively, the UE could be configured with n CSI-RS resources, and the number of CSIs generated is $3^n-2^n$.

In step 2520, the UE reports at least one of the generated CSIs. In one embodiment, the number of CSIs reported by the UE could be less than the number of CSI report generated. Furthermore, the base station could restrict which CSI is reported. Alternatively, the UE could select which CSI is reported.

Referring back to FIGS. 3 and 4, in one exemplary embodiment of a UE, the device 300 includes a program code 312 stored in the memory 310. The CPU 308 could execute program code 312 to enable the UE (i) to be configured with at least two CSI-RS (Channel State Information-Reference Signal) resources, (ii) to perform measurements on the at least two CSI-RS resources, (iii) to generate multiple CSIs according to measurements on the at least two CSI-RS resources, wherein at least one CSI corresponds to measurements on more than one CSI-RS resource, and (iv) to reports at least one of the generated CSIs. Furthermore, the CPU 308 can execute the program code 312 to perform all of the above-described actions and steps or others described herein.

Figure 26:
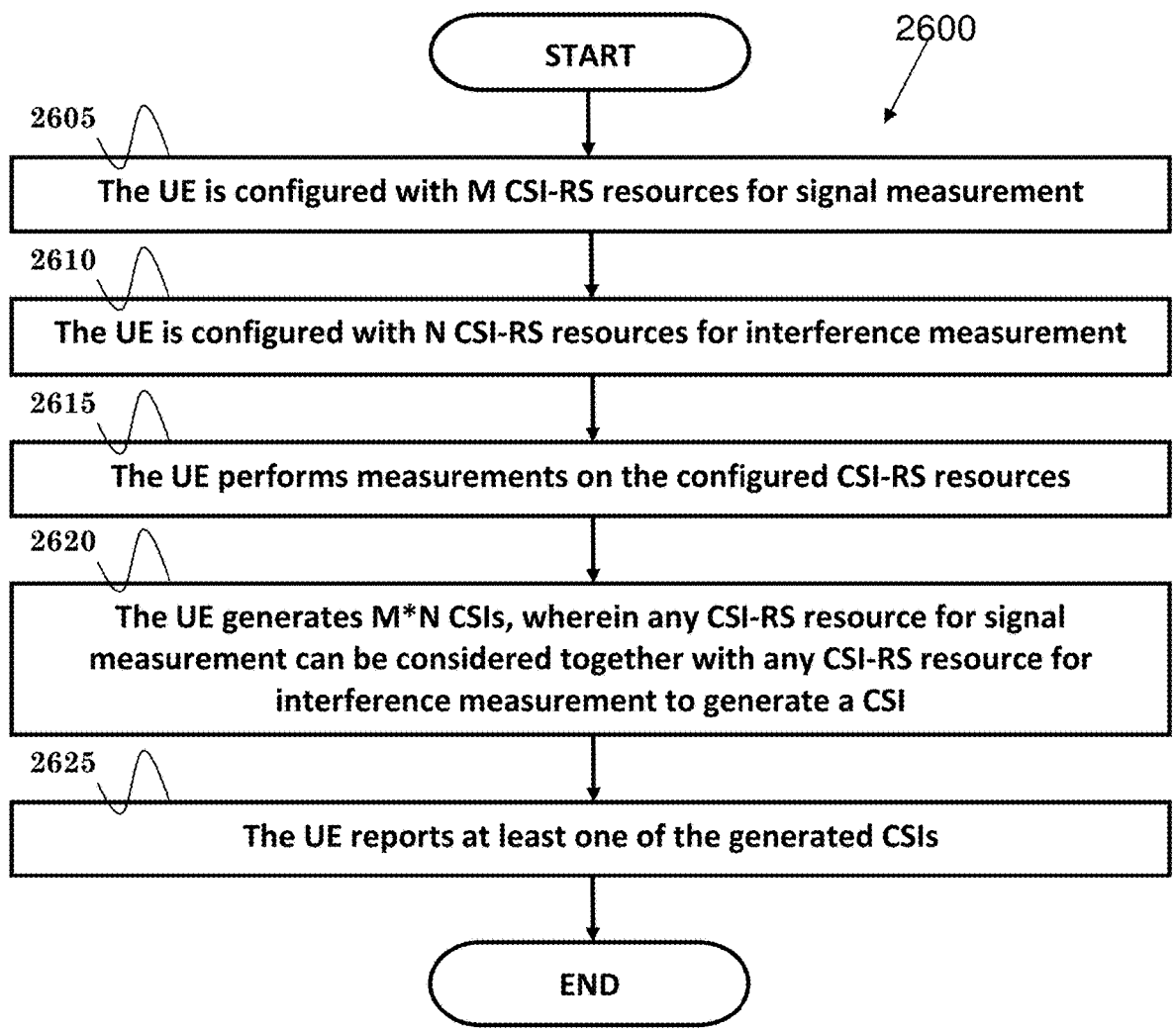
FIG. 26 is a flow chart according to one exemplary embodiment from the perspective of a UE.

FIG. 26 is a flow chart 2600 according to one exemplary embodiment from the perspective of a UE. In step 2605, the UE is configured with M CSI-RS resources for signal measurement. In step 2610, the UE is configured with N CSI-RS resources for interference measurement. In step 2615, the UE performs measurements on the configured CSI-RS resources. In step 2620, the UE generates M*N CSIs, wherein any CSI-RS resource for signal measurement can be considered together with any CSI-RS resource for interference measurement to generate a CSI. In step 2625, the UE reports at least one of the generated CSIs.

In one embodiment, each CSI-RS resource is associated with a specific beam or beam combinations. Furthermore, a beam combination means that the CSI-RS is transmitted on multiple beams. In addition, a given CSI-RS resource considered in a combination would be taken as either interference or signal.

In one embodiment, M could be equal to N. However, some combinations within the M*N combinations could be invalid. Furthermore, the number of CSIs reported by the UE could be less than the number of CSI reports generated. In addition, each CSI could be generated by measuring signal on one CSI-RS and measuring interference on another CSI-RS.

In one embodiment, the base station could restrict which CSI is reported. Alternatively, the UE could select which CSI is reported.

Referring back to FIGS. 3 and 4, in one exemplary embodiment of a UE, the device 300 includes a program code 312 stored in the memory 310. The CPU 308 could execute program code 312 to enable the UE (i) to be configured with M CSI-RS resources for signal measurement, (ii) to be configured with N CSI-RS resources for interference measurement, (iii) to perform measurements on the configured CSI-RS resources, (iv) to generate M*N CSIs, wherein any CSI-RS resource for signal measurement can be considered together with any CSI-RS resource for interference measurement to generate a CSI, and (v) to report at least one of the generated CSI. Furthermore, the CPU 308 can execute the program code 312 to perform all of the above-described actions and steps or others described herein.

Figure 27:
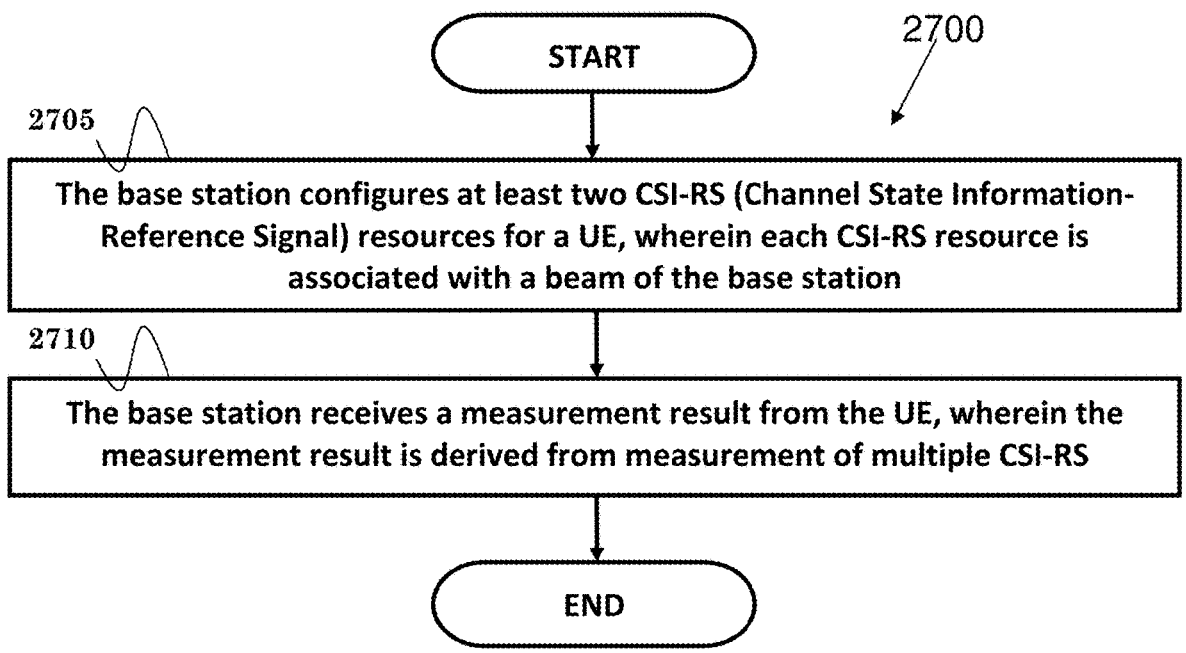
FIG. 27 is a flow chart according to one exemplary embodiment from the perspective of a base station.

FIG. 27 is a flow chart 2700 according to one exemplary embodiment from the perspective of a base station. In step 2705, the base station configures at least two CSI-RS (Channel State Information-Reference Signal) resources for a UE, wherein each CSI-RS resource is associated with a beam of the base station.

In one embodiment, the CSI-RS resources could be used to perform signal measurement. The CSI-RS resources could also be used to perform interference measurement.

In one embodiment, the UE could be configured with n CSI-RS resource and the number of CSIs generated is $2^n-1$. Alternatively, the UE could be configured with n CSI-RS resources, and the number of CSIs generated is $3^n-2^n$.

In step 2710, the base station receives a measurement result from the UE, wherein the measurement result is derived from measurements on multiple CSI-RS resources. In one embodiment, deriving a measurement result from measurement of multiple CSI-RS resources means signal strengths of multiple CSI-RS resources are summed together to derive the measurement result.

In one embodiment, the UE could generate at least one CSI corresponding to signal measurement on at least one CSI-RS resource and interference measurement on at least another CSI-RS resource. Furthermore, a given CSI-RS resource considered in a combination would be taken as either interference or signal.

In one embodiment, the number of CSIs reported by UE could be less than the number of CSI reports generated. Furthermore, the base station could restrict which CSI is reported. Alternatively, the UE could select which CSI is reported.

Referring back to FIGS. 3 and 4, in one exemplary embodiment of a base station, the device 300 includes a program code 312 stored in the memory 310. The CPU 308 could execute program code 312 to enable the UE (i) to configure at least two CSI-RS (Channel State Information-Reference Signal) resources for a UE, wherein each CSI-RS resource is associate with a beam of the base station, and (ii) to receive a measurement result from the UE, wherein the measurement result is derived from measurements on multiple CSI-RS resources. Furthermore, the CPU 308 can execute the program code 312 to perform all of the above-described actions and steps or others described herein.

Figure 28:
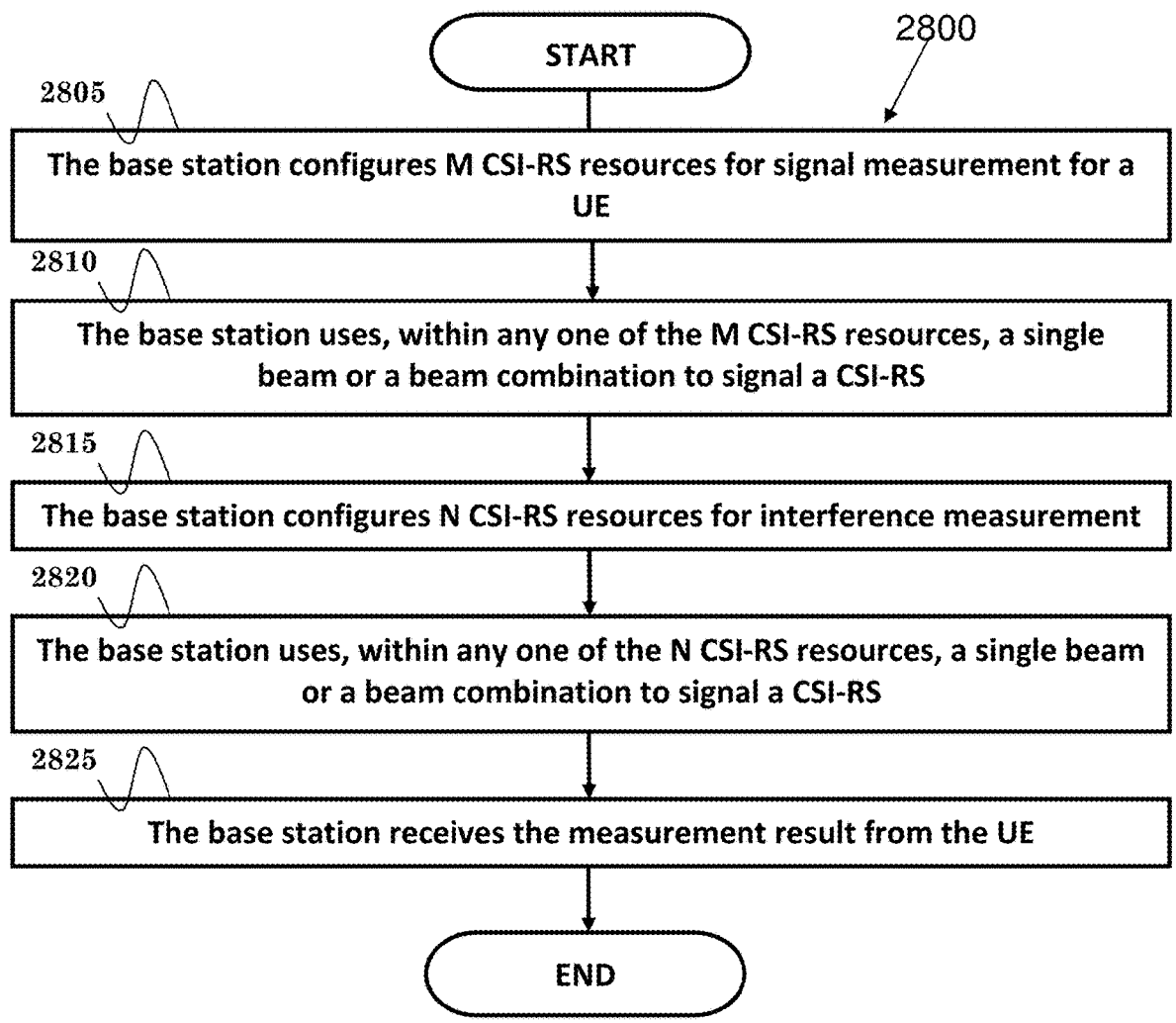
FIG. 28 is a flow chart according to one exemplary embodiment from the perspective of a base station.

FIG. 28 is a flow chart 2800 according to one exemplary embodiment from the perspective of a base station. In step 2805, the base station configures M CSI-RS resources for signal measurement for a UE. In step 2810, the base station uses, within any one of the M CSI-RS resources, a single beam or a beam combination to signal a CSI-RS. In step 2815, the base station configures N CSI-RS resources for interference measurement. In step 2820, the base station uses, within any one of the N CSI-RS resources, a single beam or a beam combination to signal a CSI-RS. In step 2825, the base station receives the measurement result from the UE.

In one embodiment, each CSI-RS is associated with a specific beam or beam combinations. Furthermore, a beam combination means the CSI-RS is transmitted on multiple beams. In addition, a given CSI-RS resource considered in a combination would be taken as either interference or signal.

In one embodiment, M could equal to N. However, some combinations within the M*N combinations could be invalid.

In one embodiment, the number of CSI reported by the UE could less than the number of CSI report generated. Furthermore, the base station could restrict which CSI is reported. Alternatively, the UE could select which CSI is reported.

In one embodiment, each CSI could be generated by measuring signal on one CSI-RS and measuring interference on another CSI-RS. In addition, the base station could schedule the UE for a given beam or a given beam combination according to a CSI of the beam/beam combination.

Referring back to FIGS. 3 and 4, in one exemplary embodiment of a base station, the device 300 includes a program code 312 stored in the memory 310. The CPU 308 could execute program code 312 to enable the base station (i) to configure M CSI-RS resources for signal measurement for a UE, (ii) to uses, within any one of the M CSI-RS resources, a single beam or a beam combination to signal a CSI-RS, (iii) to configure N CSI-RS resources for interference measurement, (iv) to use, within any one of the N CSI-RS resources, a single beam or a beam combination to signal a CSI-RS, and (v) to receive the measurement result from the UE. Furthermore, the CPU 308 can execute the program code 312 to perform all of the above-described actions and steps or others described herein.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

The invention claimed is:

1. A method of reporting channel state information (CSI) in a user equipment (UE), comprising:
   receiving, by the UE, a configuration of at least two CSI-RS (Channel State Information-Reference Signal) resources from a base station, wherein the at least two CSI-RS resources are indexed and the at least two CSI-RS resources comprise a first CSI-RS resource associated with a first beam of the base station and a second CSI-RS resource associated with a second beam of the base station;
   performing, by the UE, measurements on the at least two CSI-RS resources;
   generating, by the UE, multiple CSIs according to measurements on the at least two CSI-RS resources, wherein each of the multiple CSIs is a channel quality indicator corresponding to a combination of modulation scheme and transport block size, wherein the generating comprises:
      taking, by the UE, a first CSI-RS, in the first CSI-RS resource with a first index associated with the first beam of the base station, as signal to generate at least a first CSI of the multiple CSIs; and
      taking, by the UE, the same first CSI-RS, in the first CSI-RS resource with the first index associated with the first beam of the base station, as interference to generate at least a second CSI of the multiple CSIs; and
   reporting, by the UE, to the base station at least one of the multiple CSIs.

2. The method of claim 1, wherein the performing measurements is based on the configuration received from the base station.

3. The method of claim 1, wherein the UE generates at least one CSI corresponding to at least one measurement on a single CSI-RS resource.

4. The method of claim 1, wherein if a CSI corresponds to measurements on multiple CSI-RS resources, signal strengths of multiple CSI-RS resources are summed together to derive the CSI.

5. The method of claim 1, further comprising:
   performing, by the UE, signal measurement on the at least two CSI-RS resources.

6. The method of claim 1, further comprising:
   performing, by the UE, interference measurement on the at least two CSI-RS resources.

7. The method of claim 1, further comprising:
   receiving, by the UE, a signal from the base station which comprises an index indicating a combination of (i) CSI-RS(s) in which CSI-RS resource(s) is considered as signal and (ii) CSI-RS(s) in which CSI-RS resource(s) is considered as interference, wherein the index is associated with the combination via RRC (Radio Resource Control) configuration.

8. The method of claim 7, wherein the signal from the base station is a trigger of an aperiodic report.

9. The method of claim 1, wherein the at least two CSI-RS resources are associated with different beams of a base station.

10. The method of claim 1, wherein the generating multiple CSIs comprises generating a CSI result based on a pair of CSI-RS comprising a second CSI-RS for signal measurement and a third CSI-RS for interference measurement.

11. A method of receiving channel state information (CSI) in a base station, comprising:
   transmitting, by the base station, a configuration of at least two CSI-RS (Channel State Information-Reference Signal) resources to a user equipment (UE), wherein the at least two CSI-RS resources are indexed and the at least two CSI-RS resources comprise a first CSI-RS resource associated with a first beam of the base station and a second CSI-RS resource associated with a second beam of the base station;
   receiving, by the base station, at least one CSI from the UE, wherein:
      a first CSI-RS in the first CSI-RS resource with a first index associated with the first beam of the base station is taken by the UE as signal to generate at least a first CSI received from the UE; and
      the same first CSI-RS in the first CSI-RS resource with the first index associated with the first beam of the base station is taken by the UE as interference to generate at least a second CSI; and
   scheduling, by the base station, the UE with proper modulation and coding scheme based on the at least one CSI received from the UE, wherein the at least one CSI is a channel quality indicator corresponding to a combination of modulation scheme and transport block size.

12. The method of claim 11, wherein the at least two CSI-RS resources are configured to the UE for signal measurement.

13. The method of claim 11, wherein the at least two CSI-RS resources are configured to the UE for interference measurement.

14. The method of claim 11, further comprising:
   signaling, by the base station to the UE, an index indicating a combination of (i) CSI-RS(s) in which CSI-RS resource(s) is considered as signal and (ii) CSI-RS(s) in which CSI-RS resource(s) is considered as interference, wherein the index is associated with the combination via RRC (Radio Resource Control) configuration.

15. The method of claim 14, wherein the index is carried on a trigger of an aperiodic report.

16. A User Equipment (UE), comprising:
   a control circuit;
   a processor installed in the control circuit; and
   a memory installed in the control circuit and operatively coupled to the processor;
   wherein the processor is configured to execute a program code stored in the memory to:
      receive a configuration of at least two CSI-RS (Channel State Information-Reference Signal) resources from a base station, wherein the at least two CSI-RS resources are indexed and the at least two CSI-RS resources comprise a first CSI-RS resource associated with a first beam of the base station and a second CSI-RS resource associated with a second beam of the base station;
      perform measurements on the at least two CSI-RS resources;
      generate multiple CSIs according to measurements on the at least two CSI-RS resources, wherein each of the multiple CSIs is a channel quality indicator corresponding to a combination of modulation scheme and transport block size, wherein the generating comprises:
         taking a first CSI-RS, in the first CSI-RS resource with a first index associated with the first beam of the base station, as signal to generate at least a first CSI of the multiple CSIs; and taking the same first CSI-RS, in the first CSI-RS resource with the first index associated with the first beam of the base station, as interference to generate at least a second CSI of the multiple CSIs; and report at least one of the multiple CSIs to the base station.

17. The UE of claim 16, wherein the performing measurements is based on the configuration received from the base station.

18. The UE of claim 16, wherein the UE generates at least one CSI corresponding to at least one measurement on a single CSI-RS resource.

19. A base station, comprising:
a control circuit;
a processor installed in the control circuit; and
a memory installed in the control circuit and operatively coupled to the processor;
wherein the processor is configured to execute a program code stored in the memory to:
transmit a configuration of at least two CSI-RS (Channel State Information-Reference Signal) resources to a user equipment (UE), wherein the at least two CSI-RS resources are indexed and the at least two CSI-RS resources comprise a first CSI-RS resource associated with a first beam of the base station and a second CSI-RS resource associated with a second beam of the base station;

receive at least one CSI from the UE, wherein:
a first CSI-RS in the first CSI-RS resource with a first index associated with the first beam of the base station is taken by the UE as signal to generate at least a first CSI received from the UE; and the same first CSI-RS in the first CSI-RS resource with the first index associated with the first beam of the base station is taken by the UE as interference to generate at least a second CSI; and schedule the UE with proper modulation and coding scheme based on the at least one CSI received from the UE, wherein the at least one CSI is a channel quality indicator corresponding to a combination of modulation scheme and transport block size.

20. The base station of claim 19, wherein deriving a measurement result from measurement of multiple CSI-RS resources means signal strengths of multiple CSI-RS resources are summed together to derive the measurement result.

* * * * *